US011348177B2

(12) United States Patent
Toffey et al.

(10) Patent No.: US 11,348,177 B2
(45) Date of Patent: May 31, 2022

(54) SYSTEM AND METHOD FOR SELECTING A FINANCIAL INSTRUMENT TO TRADE BASED ON A MATCH BETWEEN A PREFERRED MEASURE OF EXPECTED RETURN OF A USER IN COMPUTER PLATFORMS CONFIGURED FOR IMPROVED ELECTRONIC EXECUTION OF ELECTRONIC TRANSACTIONS

(71) Applicant: Broadridge Fixed Income Liquidity Solutions, LLC, Newark, NJ (US)

(72) Inventors: James Toffey, Newark, NJ (US); Spenser Huston, Newark, NJ (US); Vijay Mayadas, Newark, NJ (US); William Gartland, Newark, NJ (US); Thomas Duignan, Newark, NJ (US); Rick Montgomery, Newark, NJ (US); Albert John Cass, Newark, NJ (US); Suneel Nallagonda, Newark, NJ (US); Bryan Moore, Newark, NJ (US)

(73) Assignee: Broadridge Fixed Income Liquidity Solutions, LLC, Newark, NJ (US)

( * ) Notice: Subject to any disclaimer, the term of this patent is extended or adjusted under 35 U.S.C. 154(b) by 0 days.

(21) Appl. No.: 17/511,330

(22) Filed: Oct. 26, 2021

(65) Prior Publication Data
US 2022/0044324 A1 Feb. 10, 2022

Related U.S. Application Data

(63) Continuation of application No. 17/175,417, filed on Feb. 12, 2021, which is a continuation-in-part of (Continued)

(51) Int. Cl.
G06Q 40/04 (2012.01)
G06Q 30/06 (2012.01)
G06N 20/00 (2019.01)

(52) U.S. Cl.
CPC ............ *G06Q 40/04* (2013.01); *G06N 20/00* (2019.01); *G06Q 30/0613* (2013.01)

(58) Field of Classification Search
CPC ..... G06Q 40/04; G06Q 30/0613; G06N 20/00
(Continued)

(56) References Cited

U.S. PATENT DOCUMENTS 7,546,268 B1   6/2009   Digiovanni et al.
7,734,518 B2   6/2010   Toffey
(Continued)

FOREIGN PATENT DOCUMENTS

WO   2018/232494 A1   12/2018

OTHER PUBLICATIONS

Cserna, et al., Counterparty Risk in Exchange-Traded Notes (ETNs), The Journal of Fixed Income, New York, Vo. 23, Iss. 1: 76-101, 4, Summer (Year: 2013).*
(Continued)

*Primary Examiner* — Frantzy Poinvil
(74) *Attorney, Agent, or Firm* — Greenberg Traurig, LLP

(57) ABSTRACT

Systems and methods of the present disclosure enable an electronic transaction platform that receives a request to begin the electronic communication session identifying a preferred instrument feature relating to the target financial instrument to be traded. The electronic transaction platform receive instrument feature data relating to characteristics of financial instruments available to trade, and clusters, using a clustering machine learning model, the financial instruments into instrument feature groups based on the characteristics. The target financial instrument is classified with the clus-
(Continued)

tering machine learning model into one of the instrument feature groups based on the preferred instrument feature to identify similar financial instruments. A dealer user is identified to act as an intermediate entity in a transaction with the similar financial instruments and a graphical user interface is presented to the user with active links to connect to the dealer user for each similar financial instrument.

18 Claims, 21 Drawing Sheets

Related U.S. Application Data application No. 16/879,327, filed on May 20, 2020, now Pat. No. 10,922,773, which is a continuation of application No. 16/805,401, filed on Feb. 28, 2020, now abandoned.

(60) Provisional application No. 62/812,602, filed on Mar. 1, 2019.

(58) Field of Classification Search
USPC .......................................................... 705/37
See application file for complete search history.

(56) References Cited

U.S. PATENT DOCUMENTS

| | | | | |
|---|---|---|---|---|
| 7,827,093 | B1* | 11/2010 | May | G06Q 40/00 705/37 |
| 7,840,480 | B2 | 11/2010 | Kim-E | |
| 8,364,574 | B1 | 1/2013 | May | |
| 8,595,118 | B2* | 11/2013 | McGarel | G06Q 40/06 705/36 R |
| 8,682,777 | B1 | 3/2014 | Epstein et al. | |
| 9,641,558 | B2 | 5/2017 | Olivier et al. | |
| 2005/0038723 | A1 | 2/2005 | Nishimaki | |
| 2006/0080217 | A1 | 4/2006 | Blackall et al. | |
| 2006/0190312 | A1 | 8/2006 | Onuma et al. | |
| 2007/0174102 | A1* | 7/2007 | Coulter | G06Q 40/06 705/36 R |
| 2008/0040254 | A1* | 2/2008 | Waelbroeck | G06Q 40/04 705/37 |
| 2009/0106140 | A1 | 4/2009 | De La Motte | |
| 2011/0270735 | A1 | 11/2011 | Hammer et al. | |
| 2012/0089502 | A1 | 4/2012 | Dix et al. | |
| 2012/0233167 | A1 | 9/2012 | Gates et al. | |
| 2012/0310857 | A1 | 12/2012 | Nassif et al. | |
| 2013/0066802 | A1* | 3/2013 | Sheldon | G06Q 40/06 705/36 R |
| 2014/0180895 | A1* | 6/2014 | Sweeting | G06Q 40/04 705/37 |
| 2015/0012408 | A1* | 1/2015 | Ram | G06Q 40/00 705/37 |
| 2016/0253754 | A1* | 9/2016 | Ben-Porat | G06Q 40/04 705/37 |
| 2019/0073484 | A1 | 3/2019 | Wilczynski et al. | |
| 2019/0080412 | A1 | 3/2019 | Farnstrom | |
| 2020/0211108 | A1 | 7/2020 | Pierce et al. | |
| 2020/0220936 | A1 | 7/2020 | Rai et al. | |
| 2020/0279342 | A1 | 9/2020 | Toffey et al. | |

OTHER PUBLICATIONS

International Search Report and Written Opinion from International Application No. PCT/US2021/020025 dated May 6, 2021.
International Search Report and Written Opinion from International Application No. PCT/US2020/020525 dated May 20, 2020.
Grody, "Revisiting electronic swaps trading", FOWeek, London, Euromoney Institutional Investor PLC, year (Tear 2015).
Logngo, "The Options Option: When and why should financial planners consider using options in client portfolios?", Financial Planning, New York, pp. 171-174 (Jun. 1) (Year: 2005).

* cited by examiner

| Source | | |
|---|---|---|
| Transaction Data | Security Master | Analytics (calculated based on Trade Time) |
| Customer Name (Block Trade) | Maturity Date | OAS |
| Trade Amount | Issue Date | OAS Duration |
| Trade Date | Industry 1 | OAS Convexity |
| TradeTime | Industry 2 | Option Value |
| Trade Price | Industry 3 | CR01 |
| | Industry 4 | |
| | Is_guaranteed | |
| | Is_factored | |
| | Is_put | |
| | Is_call | |
| | Amount Outstanding | |
| | Issue Amount | |
| | Debt Type Code | |

FIG. 3B

Requests

| Security | B/S | Size (000) | Allocated | % Allocated | Avg Sprd | Time | |
|---|---|---|---|---|---|---|---|
| BBBY 4.915 08/01/2024 | Sell | 10,000 | 10,000 | 100% | +428 | 01:23 | ... |
| GPS 5.950 04/12/2021 | Sell | 12,000 | 11,000 | 92% | +196 | 02:10 | ... |
| IP 7.300 11/15/2039 | Buy | 15,000 | 10,000 | 67% | +199 | 02:50 | ... |
| OC 7.000 12/01/2019 | Buy | 13,000 | 8,000 | 62% | +243 | 05:00 | ... |
| PRU 5.100 08/15/2043 | Sell | 10,000 | 6,000 | 60% | +120 | 10:15 | ... |
| F 6.625 10/01/2028 | Buy | 20,000 | 14,000 | 70% | +277 | 11:45 | ... |

Responses   Open Invites

| Security | B/S | Size (000) | Allocated | % Allocated | Avg Sprd | Time | |
|---|---|---|---|---|---|---|---|
| WMB 7.5000 01/15/2031 | Sell | 4,000 | 3,000 | 75% | +207 | 02:25 | ... |
| ALLY 4.250 04/15/2021 | Sell | 12,000 | 12,000 | 100% | +154 | 03:41 | ... |
| APC 7.950 06/15/2039 | Buy | 5,000 | 2,500 | 50% | +233 | 07:40 | ... |
| AA 6.750 01/15/2028 | Buy | 11,000 | 7,000 | 64% | +325 | 12:00 | ... |
| STX 4.750 06/01/2023 | Sell | 3,500 | 1,250 | 35% | +180 | 17:29 | ... |
| T 7.125 12/15/2031 | Buy | 10,000 | 1,000 | 10% | +242 | 18:16 | ... |

610 — 620

Staged Orders

| Cloud Score | Security | B/S | Size (000) | Sprd | LIQ | RFX |
|---|---|---|---|---|---|---|
| 7 | CAT 2.400 06/06/2022 | Sell | 17,000 | +36 | 9 | RFX ... |
| — | IBM 5.630 11/03/2039 | Sell | 12,150 | +103 | 5 | RFX ... |
| 8 | DE 3.900 06/09/2042 | Sell | 7,000 | +73 | 8 | RFX ... |
| — | OXY 4.290 03/15/2048 | Sell | 11,750 | +109 | 7 | RFX ... |
| 1 | OC 7.000 12/01/2036 | Sell | 11,200 | +243 | 4 | RFX ... |
| 6 | APL 2.900 09/12/2027 | Sell | 15,010 | +74 | 9 | RFX ... |
| 4 | VOYA 4.800 06/15/2045 | Sell | 10,275 | +167 | 7 | RFX ... |
| 2 | MSFT 3.300 02/06/2027 | Sell | 18,050 | +62 | 4 | RFX ... |
| 8 | PRU 6.625 12/01/2037 | Sell | 16,900 | +147 | 6 | RFX ... |
| 6 | RJF 5.625 04/01/2024 | Sell | 12,600 | +110 | 7 | RFX ... |
| — | GE 4.500 03/11/2044 | Sell | 15,500 | +179 | 5 | RFX ... |
| 7 | VZ 3.000 06/01/2022 | Sell | 25,000 | +93 | 9 | RFX ... |
| 5 | PEG 3.600 12/01/2047 | Sell | 14,000 | +90 | 8 | RFX ... |
| 4 | MRK 2.750 02/10/2025 | Sell | 11,000 | +53 | 7 | RFX ... |

631   633   635   637   639

630 — Import Orders

FIG. 6

YOUR SELL INTENTIONS 700

| Instrument | Direction | Size | Price/Spread | Liquidity Score | Cloud Score | RFX |
|---|---|---|---|---|---|---|
| VZ 8.000 06/01/2022 | Sell | 25m | +93 | 6 | 8 | RFX ... |
| BBBY 4.915 08/01/2034 | Sell | 1.5m | +80 to +85 | 4 | 7 | RFX ... |
| GPS 5.950 04/12/2021 | Sell | 5m | +90 to +100 | 5 | 4 | RFX ... |
| IP 7.300 11/15/2039 | Sell | 5m | +120 to +130 | 1 | 3 | RFX ... |
| MRK 2.750 02/10/2025 | Sell | 5-10m | +70 to +80 | 5 | 7 | RFX ... |
| CVX 1.961 03/03/2020 | Sell | 10m | +35 to +40 | 3 | 5 | RFX ... |
| WMT 4.000 04/11/2043 | Sell | 12m | +65 to +75 | 8 | 8 | RFX ... |
| CAT 2.400 06/06/2022 | Sell | 4.5m | +30 | 3 | 4 | RFX ... |
| ALL 5.750 08/15/2053 | Sell | 10-15M | +25 to +30 | 4 | 2 | RFX ... |
| DE 3.900 06/09/2042 | Sell | 1.5m | +55 to +65 | 4 | 1 | RFX ... |

Add a Security 710

YOUR BUY INTENTIONS 720

| Instrument | Direction | Size | Price/Spread | Liquidity Score | Cloud Score | RFX |
|---|---|---|---|---|---|---|
| PEG 3.600 12/01/2047 | Buy | 5m | +73 | 5 | 9 | RFX ... |
| OC 9.000 06/15/2019 | Buy | 0-1m | +120 to +130 | 3 | 5 | RFX ... |
| APL 2.900 09/12/2027 | Buy | 8-10m | +55 | 6 | 8 | RFX ... |
| GE 5.000 01/20/2066 | Buy | 10m | +45 | 7 | 7 | RFX ... |
| VOYA 4.700 01/23/2048 | Buy | 5-10m | +140 | 5 | 4 | RFX ... |
| MSFT 3.300 02/06/2027 | Buy | 11m | +66 | 5 | 9 | RFX ... |
| RJF 4.950 07/15/2046 | Buy | 2.8m | +84 | 4 | 7 | RFX ... |
| PRU 5.100 08/15/2043 | Buy | 5m | +91 | 2 | 4 | RFX ... |
| OXY 4.290 03/15/2048 | Buy | 6.5m | +123 | 3 | 6 | RFX ... |

Add a Security 711 713 715 717 719

AUTO BID

RFX Stack   ✕

20:00

XYZ DEALER

VZ 8.000 06/01/2022
64576AY0  Settlement Date: T+2

5Y UST 2.75 4/2023
*Set Spread Parameters*

Qty
$25,000,000
Min Fill: $250,000

Committed Level
+92bps

Buy Now Spread
+89bps  [Buy Now]

( You Bid ) Auto Bid

| Qty (000) | | Spread (bps) | Fill Type ⌄ |

[ Clear ]   [ Submit Bid ]

SYSTEM AND METHOD FOR SELECTING A FINANCIAL INSTRUMENT TO TRADE BASED ON A MATCH BETWEEN A PREFERRED MEASURE OF EXPECTED RETURN OF A USER IN COMPUTER PLATFORMS CONFIGURED FOR IMPROVED ELECTRONIC EXECUTION OF ELECTRONIC TRANSACTIONS

CROSS-REFERENCE TO RELATED APPLICATIONS

This application is a continuation of U.S. Non-Provisional patent application Ser. No. 17/175,417 filed Feb. 12, 2021, which is a continuation-in-part of U.S. Non-Provisional patent application Ser. No. 16/879,327 filed May 20, 2020 which issued as U.S. Pat. No. 10,922,773 on Feb. 16, 2021, which is a continuation of U.S. Non-Provisional patent application Ser. No. 16/805,401 filed Feb. 28, 2020, now abandoned which claims priority to U.S. Provisional patent application Ser. No. 62/812,602 filed on Mar. 1, 2019, each of which is incorporated herein by reference in its entirety.

TECHNICAL FIELD

The present disclosure is related to computer-implemented methods and computer systems for an electronic transaction platform and, more particularly, to an electronic transaction platform that enables the buying and/or selling of securities.

BACKGROUND

In the field of electronic trading, a user can buy and/or sell securities through use of a computer system implementing an electronic transaction platform. In such a platform, typically the user can enter an offer to buy or sell (a "bid" or "offer" respectively, which will be referred to herein as an "offer" for the sake of simplicity) a security, which is then shared with other user(s) for completing a transaction. Additionally, a user can review other users' offers for purchases or sales, which can be acted upon to complete a transaction. The implementation of such an electronic transaction platform relies upon the transfer of electronic communications over networks and between client devices. These communications are defined by protocols enabling the exchange of packets of information. In network communications amongst groups, these packets of information may be viewable by all parties, e.g., all information is available to all parties and all parties are typically allowed the same level of participation. For situations in which communications between limited groups of participants, networking and network communications technologies provide insufficient control of information access.

SUMMARY

In various implementations, the present disclosure is directed to a computer-implemented method of hosting an electronic communication session for trading a financial instrument between an initiating user and one or more invitee users. The method can include receiving, at a computing device having one or more processors, a request to begin the electronic communication session from an initiating user. The request can identify the financial instrument to be traded and various terms at which the initiating user is willing to trade the financial instrument. The method can include identifying, at the computing device, one or more dealer users capable of acting as an intermediate entity for trading the financial instrument based on the request. The method can further include providing, from the computing device and to the initiating user, a list of the one or more identified dealer users and receiving, at the computing device and from the initiating user, a selection of a particular dealer user based on the list of the one or more identified dealer users. The method can also include receiving, at the computing device and from the particular dealer user, a list of the one or more invitee users to participate in the electronic communication session. The method can include transmitting, from the computing device and to each of the one or more invitee users, an invitation to participate in the electronic communication session. Further, the method can include establishing, at the computing device, the electronic communication session. The electronic communication session can permit each of the one or more invitee users to submit an offer to trade the financial instrument with the initiating user. Each offer can comprise an identification of its associated invitee user and trade parameters including a price and a quantity of the financial instrument. The method can also include selectively sharing, from the computing device, information regarding offers received during the electronic communication session with each of the initiating user, the dealer user, and the one or more invitee users. The initiating user can receive the trade parameters for each received offer. The dealer user can receive the identification of the trade parameters for each received offer and its associated invitee user. Each particular invitee user can receive either: (i) the trade parameters for each received offer when the particular invitee user has submitted its own offer, or (ii) no information regarding the received offers when the particular invitee user has not yet submitted its own offer.

In some aspects, the identifying the one or more dealer users capable of acting as the intermediate entity for trading the financial instrument can comprise: determining a liquidity score for the financial instrument based on historical trading data for one or more other financial instruments related to the financial instrument; identifying historical dealers associated with the historical trading data.

In some aspects, determining the liquidity score for the financial instrument can be based on a machine learning model.

In some aspects, the machine learning model determines the liquidity score based on a number of historical transactions and a volume of historical transactions for the financial instrument to be traded.

In some aspects, the machine learning model determines the liquidity score based on a count ratio of the number of historical transactions for the financial instrument to be traded to a maximum number of historical transactions for any financial instrument observed.

In some aspects, the machine learning model determines the liquidity score based on a volume ratio of the volume of historical transactions for the financial instrument to be traded to a maximum volume of historical transactions for any financial instrument observed.

In some aspects, the machine learning model determines the liquidity score based on a combination of the count ratio and the volume ratio.

In some aspects, the machine learning model determines the liquidity score based on a volume ratio of the volume of historical transactions for the financial instrument to be traded to a maximum volume of historical transactions for any financial instrument observed.

In some aspects, the identifying the one or more dealer users capable of acting as the intermediate entity for trading the financial instrument comprises: determining a dealer specific liquidity score for the financial instrument based on historical trading data for one or more other financial instruments related to the financial instrument; identifying historical dealers associated with the historical trading data.

In some aspects, determining the dealer specific liquidity score for the financial instrument is based on a machine learning model.

In some aspects, the machine learning model determines the dealer specific liquidity score based on a number of historical transactions with a particular dealer and a volume of historical transactions for the financial instrument to be traded with the particular dealer.

In some aspects, the machine learning model determines the dealer specific liquidity score based on a dealer specific count ratio of the number of historical transactions for the financial instrument to be traded with the particular dealer to a maximum number of historical transactions for any financial instrument observed with the particular dealer.

In some aspects, the machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

In some aspects, the machine learning model determines the dealer specific liquidity score based on a combination of the dealer specific count ratio and the dealer specific volume ratio.

In some aspects, the machine learning model determines the dealer specific liquidity score based on a volume ratio of the volume of historical transactions for the financial instrument to be traded with the particular dealer to a maximum volume of historical transactions for any financial instrument observed with the particular dealer.

In some aspects, the machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.

In some aspects, the previous price at which the financial instrument was traded comprises an end of day price for the financial instrument.

In some aspects, the pricing deviation score is based on the equation:

$$\Delta LS(F(P_i)) = \frac{REFP_i - IP_i}{STD_i * 0.5}$$

where $\Delta LS(F(P_i))$ is the pricing deviation score for a financial instrument i; $REFP_i$ is the reference pricing of a recently completed trade for the financial instrument i; $STD_i$ is an average standard deviation of the reference pricing and trade price for the financial instrument i; and $IP_i$ is the desired price for the financial instrument i.

In some aspects, the identifying the one or more dealer users capable of acting as the intermediate entity for trading the financial instrument comprises: determining a customer specific liquidity score for the financial instrument based on historical trading data for one or more other financial instruments related to the financial instrument; identifying historical dealers associated with the historical trading data.

In some aspects, determining the customer specific liquidity score for the financial instrument is based on a machine learning model.

In some aspects, the machine learning model determines a customer value that is indicative of a probability that a specific customer will execute a trade for the security at the trade parameters, wherein the customer specific liquidity score for the financial instrument is based on the customer value.

In some aspects, the machine learning model determines the customer specific liquidity score based on $LSi=(LSmarket+10*(CACi/2), 10)$, where $LSi$ is the customer specific liquidity score for customer i; $LSmarket$ is a liquidity score for the financial instrument irrespective of customer; and $CACi$ is the customer value.

In some aspects, the identifying the one or more dealer users capable of acting as the intermediate entity for trading the financial instrument comprises: determining a cloud score for the financial instrument based on trading intentions of the one or more invitee users and the various terms, wherein the cloud score is representative of a likelihood that the financial instrument will be traded at the various terms; identifying at least one high likelihood invitee user of the one or more invitee users based on the cloud score, wherein the at least one high likelihood invitee user has expressed trading intentions compatible with successfully trading the financial instrument with the initiating user at the various terms; and identifying the one or more dealer users having a previous trading relationship with the at least one high likelihood invitee user.

In some aspects, determining the cloud score for the financial instrument is based on a machine learning model.

In some aspects, the machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In some aspects, the method can further comprise: determining, at the computing device, a cloud score for the financial instrument based on trading intentions of a group of potential invitee users and the various terms, wherein the cloud score is representative of a likelihood that the financial instrument will be traded at the various terms; ranking, at the computing device, the group of potential invitee users into a ranked list based on the cloud score to identify one or more high likelihood potential invitee users that have expressed trading intentions compatible with successfully trading the financial instrument with the initiating user at the various terms; and providing, from the computing device and to the particular dealer user, the ranked list. The particular dealer user can select the list of the one or more invitee users to participate in the electronic communication session from the ranked list.

In some aspects, the ranked list is limited to a predetermined number of potential invitee users.

In some aspects, determining the cloud score for the financial instrument is based on a machine learning model.

In some aspects, the machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In various implementations, the present disclosure is directed to a computer-implemented method of determining a likelihood of successfully trading a particular financial instrument between an initiating user and one or more invitee users and at various terms during an electronic communication session. The method can include receiving, at a computing device having one or more processors, historical trading data associated with previously executed trade transactions for a plurality of financial instruments. Each of the plurality of financial instruments can have associated characteristics, the associated characteristics including at least an expected return, and the trade transactions identify at least a price and quantity traded. The method can further include storing, at the computing device, the historical trading data, and identifying, at the computing device, one or more of the plurality of financial instruments having associated characteristics similar to the particular financial instrument. The method can also include determining, at the computing device and using a first machine learning model, a liquidity score for the particular financial instrument based on the historical trading data for the one or more of the plurality of financial instruments having associated characteristics similar to the particular financial instrument. The liquidity score can be representative of a likelihood of successfully trading the particular financial instrument at the various terms.

In some aspects, the first machine learning model determines the liquidity score based on a number of historical transactions and a volume of historical transactions for the financial instrument to be traded.

In some aspects, the first machine learning model determines the liquidity score based on a count ratio of the number of historical transactions for the financial instrument to be traded to a maximum number of historical transactions for any financial instrument observed.

In some aspects, the machine learning model determines the liquidity score based on a volume ratio of the volume of historical transactions for the financial instrument to be traded to a maximum volume of historical transactions for any financial instrument observed.

In some aspects, the machine learning model determines the liquidity score based on a combination of the count ratio and the volume ratio.

In some aspects, the machine learning model determines the liquidity score based on a volume ratio of the volume of historical transactions for the financial instrument to be traded to a maximum volume of historical transactions for any financial instrument observed.

In some aspects, the liquidity score is based on a dealer specific liquidity score.

In some aspects, the first machine learning model determines the dealer specific liquidity score based on a number of historical transactions with a particular dealer and a volume of historical transactions for the financial instrument to be traded with the particular dealer.

In some aspects, the first machine learning model determines the dealer specific liquidity score based on a dealer specific count ratio of the number of historical transactions for the financial instrument to be traded with the particular dealer to a maximum number of historical transactions for any financial instrument observed with the particular dealer.

In some aspects, the first machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

In some aspects, the first machine learning model determines the dealer specific liquidity score based on a combination of the dealer specific count ratio and the dealer specific volume ratio.

In some aspects, the first machine learning model determines the dealer specific liquidity score based on a volume ratio of the volume of historical transactions for the financial instrument to be traded with the particular dealer to a maximum volume of historical transactions for any financial instrument observed with the particular dealer.

In some aspects, the first machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.

In some aspects, the previous price at which the financial instrument was traded comprises an end of day price for the financial instrument.

In some aspects, the pricing deviation score is based on the equation:

$$\Delta LS(F(P_i)) = \frac{REFP_i - IP_i}{STD_i * 0.5}$$

where $\Delta LS(F(Pi))$ is the pricing deviation score for a financial instrument i; REFPi is the reference pricing of a recently completed trade for the financial instrument i; STDi is an average standard deviation of the reference pricing and trade price for the financial instrument i; and IPi is the desired price for the financial instrument i.

In some aspects, the liquidity score is based on a customer specific liquidity score.

In some aspects, the first machine learning model determines a customer value that is indicative of a probability that a specific customer will execute a trade for the security at the trade parameters, wherein the customer specific liquidity score for the financial instrument is based on the customer value.

In some aspects, the machine learning model determines the customer specific liquidity score based on $LSi=(LSmarket+10*(CACi/2), 10)$, where LSi is the customer specific liquidity score for customer i; LSmarket is a liquidity score for the financial instrument irrespective of customer; and CACi is the customer value.

In some aspects, the method can further comprise: receiving, at the computing device, trading intentions from the one or more invitee users, each trading intention representing a price and a quantity at which its associated invitee user would trade an associated financial instrument, each associated financial instrument having associated characteristics, the associated characteristics including at least an expected return; storing, at the computing device, the trading intentions; identifying, at the computing device, one or more associated financial instruments similar to the particular financial instrument; and determining, at the computing device and using a second machine learning model, a cloud score for the particular financial instrument based on the trading intentions for the one or more associated financial instrument similar to the particular financial instrument, the cloud score being representative of a likelihood of successfully trading the particular financial instrument at the various terms.

In some aspects, the second machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In some aspects, the method can further comprise outputting, from the computing device and to an initiating user computing device associated with the initiating user, the liquidity score and the cloud score in a graphical user interface.

In some aspects, outputting the liquidity score and the cloud score in the graphical user interface comprises outputting a single score representing a combination of the liquidity score and the cloud score.

In various implementations, the present disclosure is directed to a computer-implemented method of determining a likelihood of successfully trading a particular financial instrument between an initiating user and one or more invitee users and at various terms during an electronic communication session. The method can comprise receiving, at the computing device, trading intentions from the one or more invitee users. Each trading intention can represent a price and a quantity at which its associated invitee user would trade an associated financial instrument. Each associated financial instrument can have associated characteristics. The associated characteristics can include at least an expected return. The method can also include storing, at the computing device, the trading intentions and identifying, at the computing device, one or more associated financial instruments similar to the particular financial instrument. The method can further include determining, at the computing device and using a machine learning model, a cloud score for the particular financial instrument based on the trading intentions for the one or more associated financial instrument similar to the particular financial instrument, the cloud score being representative of a likelihood of successfully trading the particular financial instrument at the various terms.

In some aspects, the machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In some aspects, the method can further comprise outputting, from the computing device and to an initiating user computing device associated with the initiating user, the cloud score in a graphical user interface.

In various implementations, the present disclosure is directed to a computer-implemented method comprising hosting, by a computing device having one or more processors, an electronic communication session for trading a financial instrument between an initiating user and one or more invitee users. The hosting can include receiving, by the computing device, a request to begin the electronic communication session from an initiating user computing device associated with an initiating user, the request identifying the financial instrument to be traded and various terms at which the initiating user is willing to trade the financial instrument. The hosting can also comprise matching, by the computing device, the request with capabilities of a plurality of dealer users to identify one or more dealer users capable of acting as an intermediate entity for trading the financial instrument. A list of the one or more identified dealers can be provided, by the computing device, to the initiating user computing device associated with the initiating user. The hosting can further comprise receiving, by the computing device and from the initiating user computing device associated with the initiating user, a selection of a particular dealer user based on the list of the one or more identified dealer users. In response to receiving the selection of the particular dealer user, the computing device can establish the electronic communication session. The establishing of the electronic communication session can include receiving, by the computing device and from a dealer user computing device associated with the particular dealer user, a list of the one or more invitee users to participate in the electronic communication session. In response to receiving the list of the one or more invitee users, the computing device can transmit, to each invitee user computing device associated with each of the one or more invitee users, an invitation to participate in the electronic communication session. The hosting can also include coordinating, by the computing device, communications during the electronic communication session, wherein the electronic communication session permits each of the one or more invitee users to submit an offer to trade the financial instrument with the initiating user, each offer comprising an identification of its associated invitee user and trade parameters including a price and a quantity of the financial instrument. The coordination of communications during the electronic communication session can comprise selectively sharing, by the computing device, information regarding offers received during the electronic communication session with each of the initiating user, the dealer user, and the one or more invitee users, wherein the initiating user receives the trade parameters for each received offer, the dealer user receives the identification of the trade parameters for each received offer and its associated invitee user, and each particular invitee user receives: (i) the trade parameters for each received offer when the particular invitee user has submitted its own offer, and (ii) no information regarding the received offers when the particular invitee user has not yet submitted its own offer.

In some aspects, the identifying the one or more dealer users capable of acting as the intermediate entity for trading the financial instrument can comprise: determining a liquidity score for the financial instrument based on historical trading data for one or more other financial instruments related to the financial instrument; identifying historical dealers associated with the historical trading data.

In some aspects, determining the liquidity score for the financial instrument can be based on a liquidity score machine learning model.

In some aspects, the liquidity score machine learning model determines the liquidity score based on a number of historical transactions and a volume of historical transactions for the financial instrument to be traded.

In some aspects, the liquidity score machine learning model determines the liquidity score based on a count ratio of the number of historical transactions for the financial instrument to be traded to a maximum number of historical transactions for any financial instrument observed.

In some aspects, the liquidity score machine learning model determines the liquidity score based on a volume ratio of the volume of historical transactions for the financial instrument to be traded to a maximum volume of historical transactions for any financial instrument observed.

In some aspects, the liquidity score machine learning model determines the liquidity score based on a combination of the count ratio and the volume ratio.

In some aspects, the liquidity score machine learning model determines the liquidity score based on a volume ratio of the volume of historical transactions for the financial instrument to be traded to a maximum volume of historical transactions for any financial instrument observed.

In some aspects, the identifying the one or more dealer users capable of acting as the intermediate entity for trading the financial instrument comprises: determining a dealer specific liquidity score for the financial instrument based on historical trading data for one or more other financial instruments related to the financial instrument; identifying historical dealers associated with the historical trading data.

In some aspects, determining the dealer specific liquidity score for the financial instrument is based on a liquidity score machine learning model.

In some aspects, the liquidity score machine learning model determines the dealer specific liquidity score based on a number of historical transactions with a particular dealer and a volume of historical transactions for the financial instrument to be traded with the particular dealer.

In some aspects, the liquidity score machine learning model determines the dealer specific liquidity score based on a dealer specific count ratio of the number of historical transactions for the financial instrument to be traded with the particular dealer to a maximum number of historical transactions for any financial instrument observed with the particular dealer.

In some aspects, the liquidity score machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

In some aspects, the liquidity score machine learning model determines the dealer specific liquidity score based on a combination of the dealer specific count ratio and the dealer specific volume ratio.

In some aspects, the liquidity score machine learning model determines the dealer specific liquidity score based on a volume ratio of the volume of historical transactions for the financial instrument to be traded with the particular dealer to a maximum volume of historical transactions for any financial instrument observed with the particular dealer.

In some aspects, the liquidity score machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.

In some aspects, the previous price at which the financial instrument was traded comprises an end of day price for the financial instrument.

In some aspects, the pricing deviation score is based on the equation:

$$\Delta LS(F(P_i)) = \frac{REFP_i - IP_i}{STD_i * 0.5}$$

where $\Delta LS(F(P_i))$ is the pricing deviation score for a financial instrument i; $REFP_i$ is the reference pricing of a recently completed trade for the financial instrument i; $STD_i$ is an average standard deviation of the reference pricing and trade price for the financial instrument i; and $IP_i$ is the desired price for the financial instrument i.

In some aspects, the identifying the one or more dealer users capable of acting as the intermediate entity for trading the financial instrument comprises: determining a customer specific liquidity score for the financial instrument based on historical trading data for one or more other financial instruments related to the financial instrument; identifying historical dealers associated with the historical trading data.

In some aspects, determining the customer specific liquidity score for the financial instrument is based on a liquidity score machine learning model.

In some aspects, the liquidity score machine learning model determines a customer value that is indicative of a probability that a specific customer will execute a trade for the security at the trade parameters, wherein the customer specific liquidity score for the financial instrument is based on the customer value.

In some aspects, the liquidity score machine learning model determines the customer specific liquidity score based on $LS_i=(LS_{market}+10*(CAC_i/2), 10)$, where $LS_i$ is the customer specific liquidity score for customer i; $LS_{market}$ is a liquidity score for the financial instrument irrespective of customer; and $CAC_i$ is the customer value.

In some aspects, the identifying the one or more dealer users capable of acting as the intermediate entity for trading the financial instrument comprises: determining a cloud score for the financial instrument based on trading intentions of the one or more invitee users and the various terms, wherein the cloud score is representative of a likelihood that the financial instrument will be traded at the various terms; identifying at least one high likelihood invitee user of the one or more invitee users based on the cloud score, wherein the at least one high likelihood invitee user has expressed trading intentions compatible with successfully trading the financial instrument with the initiating user at the various terms; and identifying the one or more dealer users having a previous trading relationship with the at least one high likelihood invitee user.

In some aspects, determining the cloud score for the financial instrument is based on a cloud score machine learning model.

In some aspects, the cloud score machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In some aspects, the method can further comprise: determining, at the computing device, a cloud score for the financial instrument based on trading intentions of a group of potential invitee users and the various terms, wherein the cloud score is representative of a likelihood that the financial instrument will be traded at the various terms; ranking, at the computing device, the group of potential invitee users into a ranked list based on the cloud score to identify one or more high likelihood potential invitee users that have expressed trading intentions compatible with successfully trading the financial instrument with the initiating user at the various terms; and providing, from the computing device and to the particular dealer user, the ranked list. The particular dealer user can select the list of the one or more invitee users to participate in the electronic communication session from the ranked list.

In some aspects, the ranked list is limited to a predetermined number of potential invitee users.

In some aspects, determining the cloud score for the financial instrument is based on a cloud score machine learning model.

In some aspects, the cloud score machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In various implementations, the present disclosure is directed to a computer-implemented method comprising determining, by a computing device having one or more processors, a likelihood of executing a trade of a particular financial instrument between an initiating user and one or more invitee users and at various terms during an electronic communication session. The determining can include receiving, by the computing device, historical trading data associated with previously executed trade transactions for a plurality of financial instruments, wherein each of the plurality of financial instruments has associated instrument characteristics, the associated instrument characteristics including at least an expected return, and the trade transactions identify at least a price and quantity traded. The determining can also include performing, by the computing device, cluster analysis of the particular financial instrument and the plurality of financial instruments to identify one or more of the plurality of financial instruments having associated instrument characteristics that match instrument characteristics of the particular financial instrument. Further, the determining can include determining, by the computing device and using a liquidity score machine learning model, a liquidity score for the particular financial instrument based on the historical trading data for the one or more of the plurality of financial instruments having associated instrument characteristics that match the instrument characteristics of the particular financial instrument, the liquidity score being representative of a likelihood of executing a trade of the particular financial instrument at the various terms. The method can additionally include ranking, by the computing device, the particular financial instrument and other financial instruments into a ranked list based on the liquidity score and other liquidity scores associated with the other financial instruments and presenting, by the computing device, the ranked list in a graphical user interface of an initiating user computing device associated with the initiating user.

In some aspects, the liquidity score machine learning model determines the liquidity score based on a number of historical transactions and a volume of historical transactions for the particular financial instrument to be traded.

In some aspects, the liquidity score machine learning model determines the liquidity score based on a count ratio of the number of historical transactions for the particular financial instrument to be traded to a maximum number of historical transactions for any financial instrument observed.

In some aspects, the liquidity score machine learning model determines the liquidity score based on a volume ratio of the volume of historical transactions for the particular financial instrument to be traded to a maximum volume of historical transactions for any financial instrument observed.

In some aspects, the liquidity score machine learning model determines the liquidity score based on a combination of the count ratio and the volume ratio.

In some aspects, the liquidity score machine learning model determines the liquidity score based on a volume ratio of the volume of historical transactions for the particular financial instrument to be traded to a maximum volume of historical transactions for any financial instrument observed.

In some aspects, the liquidity score is based on a dealer specific liquidity score.

In some aspects, the liquidity score machine learning model determines the dealer specific liquidity score based on a number of historical transactions with a particular dealer and a volume of historical transactions for the particular financial instrument to be traded with the particular dealer.

In some aspects, the liquidity score machine learning model determines the dealer specific liquidity score based on a dealer specific count ratio of the number of historical transactions for the particular financial instrument to be traded with the particular dealer to a maximum number of historical transactions for any financial instrument observed with the particular dealer.

In some aspects, the liquidity score machine learning model determines the dealer specific liquidity score based on a dealer specific volume ratio of the volume of historical transactions for the particular financial instrument to be traded with the particular dealer to a maximum volume of historical transactions for any financial instrument observed with the particular dealer.

In some aspects, the liquidity score machine learning model determines the dealer specific liquidity score based on a combination of the dealer specific count ratio and the dealer specific volume ratio.

In some aspects, the liquidity score machine learning model determines the dealer specific liquidity score based on a volume ratio of the volume of historical transactions for the particular financial instrument to be traded with the particular dealer to a maximum volume of historical transactions for any financial instrument observed with the particular dealer.

In some aspects, the liquidity score machine learning model determines the liquidity score based on a pricing deviation score corresponding to a difference between a traded pricing and a desired pricing for the particular financial instrument to be traded, the traded pricing comprising a previous price at which the particular financial instrument was traded and the desired pricing comprising a desired price at which the initiating user is willing to trade the particular financial instrument.

In some aspects, the previous price at which the particular financial instrument was traded comprises an end of day price for the particular financial instrument.

In some aspects, the pricing deviation score is based on the equation:

$$\Delta LS(F(P_i)) = \frac{REFP_i - IP_i}{STD_i * 0.5}$$

where $\Delta LS(F(Pi))$ is the pricing deviation score for a financial instrument i; $REFP_i$ is the reference pricing of a recently completed trade for the financial instrument i; $STD_i$ is an average standard deviation of the reference pricing and trade price for the financial instrument i; and $IP_i$ is the desired price for the financial instrument i.

In some aspects, the liquidity score is based on a customer specific liquidity score.

In some aspects, the liquidity score machine learning model determines a customer value that is indicative of a probability that a specific customer will execute a trade for the particular financial instrument at the trade parameters, wherein the customer specific liquidity score for the particular financial instrument is based on the customer value.

In some aspects, the liquidity score machine learning model determines the customer specific liquidity score based on $LS_i = (LSmarket + 10*(CAC_i/2), 10)$, where $LS_i$ is the customer specific liquidity score for customer i; LSmarket is a liquidity score for the particular financial instrument irrespective of customer; and $CAC_i$ is the customer value.

In some aspects, the method can further comprise: receiving, at the computing device, trading intentions from one or more invitee user computing devices associated with the one or more invitee users, each trading intention representing a price and a quantity at which its associated invitee user would trade an associated financial instrument, each associated financial instrument having associated instrument characteristics, the associated instrument characteristics including at least an expected return; storing, at the computing device, the trading intentions; performing, by the computing device, cluster analysis of the particular financial instrument and the associated financial instruments to identify one or more associated financial instruments having associated instrument characteristics that match instrument characteristics of the particular financial instrument; determining, by the computing device and using a cloud score machine learning model, a cloud score for the particular financial instrument based on the trading intentions for the one or more associated financial instruments having associated instrument characteristics that match the instrument characteristics of the particular financial instrument, the cloud score being representative of a likelihood of executing the trade of the particular financial instrument at the various terms; and outputting, by the computing device and to the initiating user computing device associated with the initiating user, the liquidity score and the cloud score in the graphical user interface.

In some aspects, the cloud score machine learning model determines the cloud score based on a degree of matching between the trading intentions of the one or more invitee users and the various terms.

In some aspects, the degree of matching is based on a price matching score and a quantity matching score.

In some aspects, the price matching score corresponds to a price degree of matching between a trading price of the trading intentions of the one or more invitee users and a desired price of the various terms.

In some aspects, the quantity matching score corresponds to a quantity degree of matching between a trading quantity of the trading intentions of the one or more invitee users and a desired quantity of the various terms.

In some aspects, the quantity matching score corresponds to a quantity degree of matching between a trading quantity of the trading intentions of the one or more invitee users and a desired quantity of the various terms.

In some aspects, the degree of matching is expressed as a number between 0 and 1.

In some aspects, outputting the liquidity score and the cloud score in the graphical user interface comprises outputting a single score representing a combination of the liquidity score and the cloud score.

In various implementations, the present disclosure is directed to a computer-implemented method comprising determining, by a computing device having one or more processors, a likelihood of executing a trade of a particular financial instrument between an initiating user and one or more invitee users and at various terms during an electronic communication session. The determining can include receiving, by the computing device, trading intentions from one or more invitee user computing devices associated with the one or more invitee users, each trading intention representing a price and a quantity at which its associated invitee user would trade an associated financial instrument, each associated financial instrument having associated instrument characteristics, the associated instrument characteristics including at least an expected return. The determining can also include performing, by the computing device, cluster analysis of the particular financial instrument and the associated financial instruments to identify one or more associated financial instruments having associated instrument characteristics that match instrument characteristics of the particular financial instrument. Further, the determining can include determining, by the computing device and using a cloud score machine learning model, a cloud score for the particular financial instrument based on the trading intentions for the one or more associated financial instruments having associated instrument characteristics that match the instrument characteristics of the particular financial instrument, the cloud score being representative of a likelihood of executing the trade of the particular financial instrument at the various terms. The method can additionally comprise ranking, by the computing device, the particular financial instrument and other financial instruments into a ranked list based on the cloud score and other cloud scores associated with the other financial instruments and presenting, by the computing device, the ranked list in a graphical user interface of an initiating user computing device associated with the initiating user.

In some aspects, the cloud score machine learning model can determine the cloud score based on a degree of matching between the trading intentions of the one or more invitee users and the various terms.

In some aspects, the degree of matching can be based on a price matching score and a quantity matching score.

In some aspects, the price matching score can correspond to a price degree of matching between a trading price of the trading intentions of the one or more invitee users and a desired price of the various terms.

In some aspects, the quantity matching score can correspond to a quantity degree of matching between a trading quantity of the trading intentions of the one or more invitee users and a desired quantity of the various terms.

In some aspects, the quantity matching score can correspond to a quantity degree of matching between a trading quantity of the trading intentions of the one or more invitee users and a desired quantity of the various terms.

In some aspects, the degree of matching can be expressed as a number between 0 and 1.

In some aspects, the determining can further include receiving, by the computing device, historical trading data associated with previously executed trade transactions for a plurality of historically traded financial instruments, wherein each of the plurality of historically traded financial instruments has associated historically traded instrument characteristics, the associated historically traded instrument characteristics including at least an expected return, and the trade transactions identify at least a price and quantity traded; performing, by the computing device, cluster analysis of the particular financial instrument and the plurality of historically traded financial instruments to identify one or more of the plurality of historically traded financial instruments having associated historically traded instrument characteristics that match the instrument characteristics of the particular financial instrument; and determining, by the computing device and using a liquidity score machine learning model, a liquidity score for the particular financial instrument based on the historical trading data for the one or more of the plurality of historically traded financial instruments having associated historically traded instrument characteristics that match the instrument characteristics of the particular financial instrument, the liquidity score being representative of the likelihood of executing the trade of the particular financial instrument at the various terms, wherein the ranked list is further based on the liquidity score.

In some aspects, the liquidity score machine learning model can determine the liquidity score based on a number of historical transactions and a volume of historical transactions for the particular financial instrument to be traded.

In some aspects, the liquidity score machine learning model can determine the liquidity score based on a count ratio of the number of historical transactions for the particular financial instrument to be traded to a maximum number of historical transactions for any financial instrument observed.

In some aspects, the liquidity score machine learning model determines the liquidity score based on a volume ratio of the volume of historical transactions for the particular financial instrument to be traded to a maximum volume of historical transactions for any financial instrument observed.

In some aspects, the liquidity score machine learning model determines the liquidity score based on a combination of the count ratio and the volume ratio.

In some aspects, the liquidity score can be based on a dealer specific liquidity score.

In some aspects, the liquidity score machine learning model can determine the dealer specific liquidity score based on a number of historical transactions with a particular dealer and a volume of historical transactions for the particular financial instrument to be traded with the particular dealer.

In some aspects, the liquidity score machine learning model can determine the dealer specific liquidity score based on a dealer specific count ratio of the number of historical transactions for the particular financial instrument to be traded with the particular dealer to a maximum number of historical transactions for any financial instrument observed with the particular dealer.

In some aspects, the liquidity score machine learning model can determine the dealer specific liquidity score based on a dealer specific volume ratio of the volume of historical transactions for the particular financial instrument to be traded with the particular dealer to a maximum volume of historical transactions for any financial instrument observed with the particular dealer In some aspects, the liquidity score machine learning model can determine the dealer specific liquidity score based on a combination of the dealer specific count ratio and the dealer specific volume ratio.

In some aspects, the liquidity score machine learning model can determine the dealer specific liquidity score based on a volume ratio of the volume of historical transactions for the particular financial instrument to be traded with the particular dealer to a maximum volume of historical transactions for any financial instrument observed with the particular dealer.

In various implementations, the present disclosure is directed to a computing device for hosting an electronic communication session for trading a financial instrument between an initiating user and one or more invitee users. The computing device can comprise one or more processors, and a non-transitory computer-readable storage medium having a plurality of instructions stored thereon, which, when executed by the one or more processors, cause the one or more processors to perform operations. The operations can include any one or more of the operations of the computer-implemented method of hosting an electronic communication session for trading a financial instrument between an initiating user and one or more invitee users described above.

BRIEF DESCRIPTION OF THE DRAWINGS

The invention will be more fully understood by reference to the following drawings which are for illustrative purposes only:

FIG. 3B shows exemplary inputs into the exemplary inventive neural network of the present disclosure (e.g., as shown in FIG. 3A);

FIG. 6 is a screenshot of an exemplary inventive specialized GUI of the present disclosure in a form of dashboard showing a state of the exemplary inventive liquidity cloud at a particular time;

FIG. 7 is a screenshot of an exemplary inventive specialized GUI of the present disclosure in a form of dashboard showing pre-trade intentions of a particular user (e.g., initiating user) of the exemplary inventive electronic execution-mediating platform of the present disclosure in the exemplary inventive liquidity cloud at a particular time;

FIG. 8 is a screenshot of the exemplary inventive specialized GUI of FIG. 7 with a pop-up inventive specialized GUI showing historical data regarding a particular liquidity score;

FIG. 11 is a screenshot of an exemplary inventive specialized GUI of the present disclosure that a particular invitee can use to make submission(s) in to a particular electronic communication session;

Figure 13:
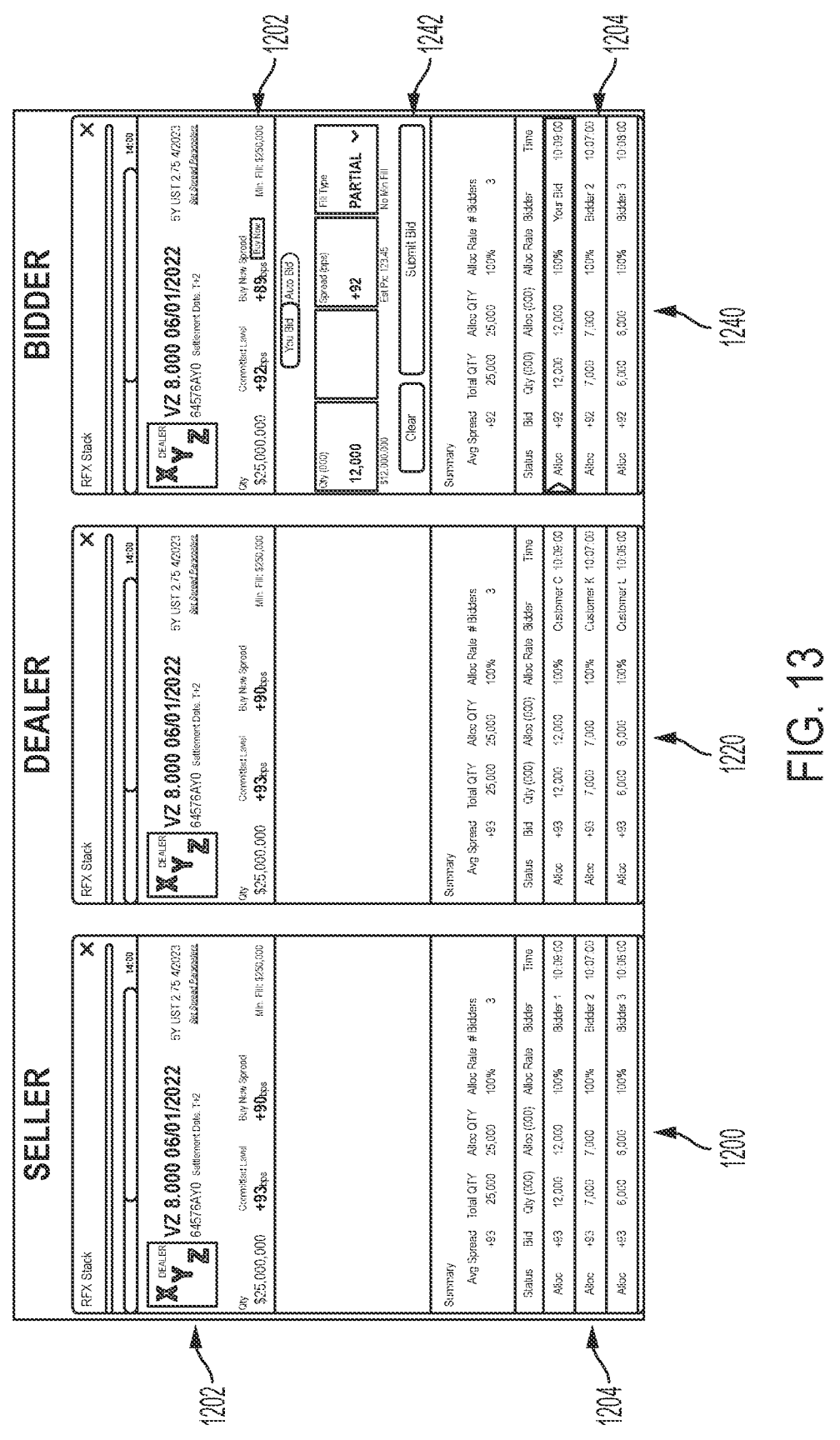

FIGS. 12-16 are screenshots of various states of exemplary inventive specialized stack GUIs of the present disclosure that are presented to the initiating user (Seller), the electronic communication dealer, and an invitee (Bidder) during a particular electronic communication session;

FIG. 17 illustrates an exemplary environment in which some embodiments of the exemplary inventive electronic execution-mediating platform of the present disclosure may operate; and.

DETAILED DESCRIPTION

Figure 1:
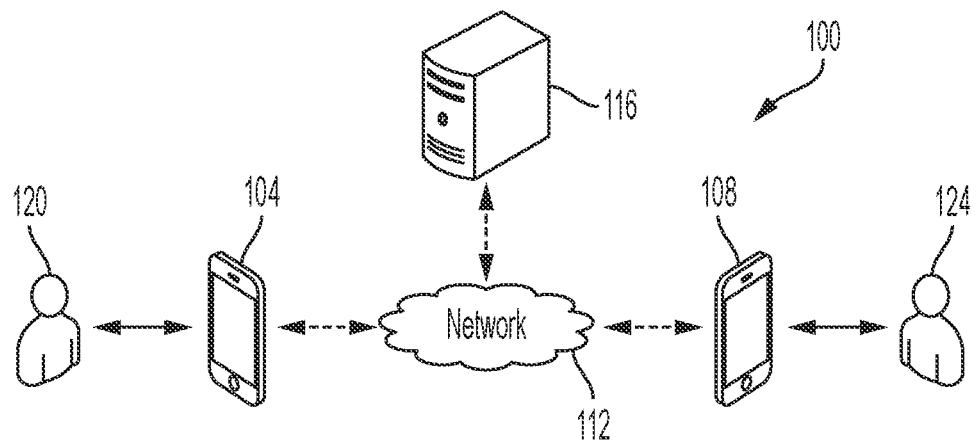
FIG. 1 is a diagram of an example computing environment including example user computing devices and an example server computing device according to some implementations of the present disclosure.

Embodiments of the present disclosure, briefly summarized above and discussed in greater detail below, can be understood by reference to the illustrative embodiments of the present disclosure depicted in the appended drawings. It is to be noted, however, that the appended drawings illustrate only typical embodiments of this present disclosure and are therefore not to be considered limiting of its scope, for the present disclosure may admit to other equally effective embodiments.

As briefly mentioned above, conventional electronic transaction platforms provide for various users to transmit electronic communications regarding the purchase/sale of securities. Such electronic transaction platforms typically operate in an "open" manner where information regarding an offer is provided as quickly and seamlessly as possible and to as many users as possible in order to effectuate a "free market" transaction. Examples of such an electronic transaction platform include any of the various stock selling/purchasing platforms available to consumers. These conventional electronic transaction platforms are suitable for the trading of securities (such as stocks) that are easily marketed and bought/sold, e.g., via a trading floor or other centralized location where trading takes place (auction market).

In an over-the-counter ("OTC") or similar market (such as the bond market), however, these conventional electronic transaction platforms may be unsuitable for use due to various considerations. For example only, at least partly due to relatively low number of users participating in an OTC market, there can be a risk of one user's intent to buy/sell a specific security—if widely known by other users—affecting the price at which the user is able to trade the security. Further, e.g., in the case of the bond market, the pricing of one specific security may more directly affect the price of another security if the two securities share the same/similar characteristics. A seller of a security that is similar to another security may be able to obtain a pricing advantage if the seller is aware of current offers for the other security. Thus, the behaviour of users may be tailored to avoid "information leakage" in excess of what is required/prudent to be shared in order to conduct a transaction. Theoretically, a user would prefer to only share information regarding an offer with other user(s) that are likely to accept the offer.

In order to address the above and other issues, the present disclosure is directed to improved computer-implemented methods and computer systems for an electronic transaction platform. Although not limited to such implementations, the disclosed techniques are particularly well suited for the trading of securities in an OTC or similar market in which the need for finding suitable trading partners is to be balanced against the widespread dissemination of information related to the pricing of the securities.

The present disclosure includes at least three features that differ from conventional electronic transaction platforms. The first feature is a trading platform referred to herein as the RFX platform. The RFX platform, among other aspects, provides users with a computer based market for the buying and selling of securities that mitigates the disadvantages of conventional electronic transaction platforms (e.g., information leakage). The second feature is a scoring functionality that provides a relative ranking of securities by their propensity to trade from historical trading data (liquidity score) and/or based on expressed trading intentions by other users (cloud score). The scoring functionality is based on a machine learning model that takes into account various features/factors. The third feature is a partner identification technique that permits a user to identify other users that have a relatively high likelihood of a successful trade for a specific security. Each of these, and other features, will be described more fully below. Additionally, although these features may be described separately from one another, one advantage of the disclosed techniques is the ability to combine some or all of these features in a single electronic transaction platform to provide a powerful research and trading tool for users interested in trading securities.

The RFX platform provides a user with the ability to initiate a potential trading transaction session with one or more others users through a dealer in a manner that limits information leakage. In a conventional transaction, such as in the bond market, a party wishing to trade a bond approaches a dealer with a potential transaction offer. The dealer then approaches other parties who may be interested in executing the trade on the opposite side. In order to protect against information leakage in such a conventional transaction, the original user may only contact a specific dealer that he or she is confident can execute a trade. Similarly, the selected dealer may have connections to a limited pool of other parties who may be interested in executing the trade on the opposite side. In such a scenario, the original party may miss the opportunity to trade the security with a different dealer that deals with a different pool of other users, e.g., due to the lack of information that the original party has regarding the actual demand for the security.

The RFX platform facilitates the matching of users with other users willing to execute a specific trade of a security. The RFX platform permits a party wishing to trade a security to initiate an RFX communication session. In one aspect, the initiating party may select a dealer for the RFX communication session and provides the relevant trading details. The dealer then has the opportunity to accept the selection, pass on the selection, or propose a modification of the trading details. Upon acceptance of the selection or modification (by the initiating user), the dealer can schedule the RFX communication session and invite a plurality of other users (invitees) in whom the dealer has confidence would be interested in the security. The selection of the invitees by the dealer will create a closed universe of potentially interested parties that are able to view the security trading details and participate (e.g., execute a trade of the security) in the RFX communication session. In some aspects, the dealer can be assisted in this invitation process by the partner identification techniques described below.

When the RFX communication session begins, each of the invitees shall have access to information regarding the initial pricing and quantity of the security being traded. The initiating user can choose the initial pricing and quantity at which the initiating user will trade the security, which will constitute a firm commitment to trade the security at those prices/quantity. In some implementations, an invitee may gain access to additional information after making an offer to trade the security. For example only, upon submission of an offer an invitee may be able to view all current offers submitted by other invitees. In some aspects, each invitee can be anonymized, such as by being given a pseudonym, such that other invitees and the initiating user are unaware of the actual parties. Each offer by an invitee is a firm commitment to trade the security at the offered rate for the given quantity. The RFX communication session can be "live" for a given period of time, e.g., as determined by the dealer or otherwise. At the end of the RFX communication session, and assuming that acceptable offers users have been made, the dealer can complete the transaction between the initiating user and invitee(s).

The scoring functionality mentioned above can permit a user to gauge interest in a specific trade before initiating an RFX communication session. The scoring functionality can be based on one or both of historical trading data (previously executed trades) and trading intentions of other users known by the platform (current demand). Historical trading data is published and can be ingested into the electronic transaction platform. Additionally, users can input their trading intentions into the electronic transaction platform. The trading intentions can include an identification of the security to be traded, a direction of trade intention (buy or sell), a trade quantity, and a trade price. A machine learning model can be trained to calculate the likelihood of a successful trade transaction based on the historical trading data and/or trading intentions and generate one or more scores to provide to a user with respect to a specific trading intention. The score(s) can assist users in pricing a security before providing information to other users, thereby avoiding information leakage.

As briefly mentioned above, the partner identification technique permits a user or dealer to identify the most likely users in their customer base to complete a successful trade for a specific security. In some aspects, a machine learning model is utilized to identify user(s) that have expressed interest in a specific security and/or other, similar securities, and/or have traded the same/similar security in the past. A certain number of users with the highest rankings for a given set of inputs (top-10, top-25, etc.) can be invited to participate in an RFX communication session as invitees if the user decides to initiate such a session. In this manner, a user can be more likely to be paired with an invitee that is willing to conduct a trade for a given offering, while also limiting the information leakage to parties with whom the user is unlikely to successfully trade.

It is understood that at least one aspect/functionality of various implementations described herein can be performed in real-time and/or dynamically. As used herein, the term "real-time" is directed to an event/action that can occur instantaneously or almost instantaneously in time when another event/action has occurred. For example, the terms "real-time processing," "real-time computation," and "real-time execution" all pertain to the performance of a computation during the actual time that the related physical process (e.g., a user interacting with an application on a mobile device) occurs, such that results of the computation can be used in guiding the physical process. For example, in some embodiments, an event occurs in real-time if a time difference between a first time when an exemplary order is received and a second time when a dealer's makes the exemplary offer for counterbidding is no more than 10 minutes. For example, in some embodiments, an event occurs in real-time if a time difference between a first time when an exemplary order is received and a second time when a dealer's makes the exemplary offer for counterbidding is no more than 1 second. For example, in some embodiments, an event occurs in real-time if a time difference between a first time when an exemplary order is received and a second time when a dealer's makes the exemplary offer for counterbidding is between less than 1 second and 10 minutes.

As used herein, the term "dynamically" means that events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc. As used herein, the terms "dynamically" and automatically are used interchangeably and have the same meaning.

As used herein, the term "runtime" corresponds to any behaviour that is dynamically determined during an execution of a software application or at least a portion of software application.

In some embodiments, the inventive specially programmed computing systems with associated devices are configured to operate in the distributed network environment, communicating over a suitable data communication network (e.g., the Internet, etc.) and utilizing at least one suitable data communication protocol (e.g., IPX/SPX, X.25, AX.25, AppleTalk™, TCP/IP (e.g., HTTP), etc.). Of note, the embodiments described herein may, of course, be implemented using any appropriate hardware and/or computing software languages. In this regard, those of ordinary skill in the art are well versed in the type of computer hardware that may be used, the type of computer programming techniques that may be used (e.g., object-oriented programming), and the type of computer programming languages that may be used (e.g., C++, Objective-C, Swift, Java, JavaScript). The aforementioned examples are, of course, illustrative and not restrictive.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

In another form, a non-transitory article, such as a non-transitory computer readable medium, may be used with any of the examples mentioned above or other examples except that it does not include a transitory signal per se. It does include those elements other than a signal per se that may hold data temporarily in a "transitory" fashion such as RAM and so forth.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor.

As used herein, the term "user" shall have a meaning of at least one user.

As used herein, the term "backstop" identifies a bid or offer (an electronic firm trading submission), depending on the direction of an exemplary inventive electronic communication session detailed that may be provided by the electronic communication dealer at the start of the electronic communication session, prior to invitees being able to place a bid/offer. For example, the price and/or size provided by the electronic communication dealer is firm and will result in a trade at the conclusion of the electronic communication, unless the electronic communication dealer's bid/offer is not allocated in the electronic communication due to more competitive bids/offers.

As used herein, the term "buyside" identifies market participants in securities which generally refer to investment firms that purchase securities, such as asset managers. For example, buyside market participants may include, but are not limited to, mutual funds, pension funds, family offices, hedge funds, and private equity funds.

As used herein, the term "committed level" identifies a firm price level set by the initiating user that the initiating user will trade (i.e., buy or sell depending on the side) the specific financial instrument (e.g., corporate bond).

As used herein, the term "dealer" identifies a market participant that acts as an intermediary in the securities markets by buying and/or selling securities on its own account before selling the securities to a customer and provides the sellers, buyers or both, access to the settlement system for the trades that are executed. In some embodiments, these are characterized as "riskless principal" trades.

As used herein, the term "intermediate entity" identifies a single dealer associated with the particular electronic communication session who accepted an invitation from the initiating user and/or from exemplary inventive electronic execution-mediating platform of the present disclosure to act as the dealer to host an electronic communication session. In some embodiments, the dealer may run electronic communication sessions where the dealer is both the initiating user and electronic communication dealer As used herein, the term "initiating user" identifies a user that desires to initiate an electronic inventive electronic communication session and who will either purchase or sell securities at the conclusion of the electronic communication session if the initiating user's pre-determined parameters are met. For example, an exemplary initiating user may be a member of the membership network of users that the exemplary inventive electronic execution-mediating platform of the present disclosure is configured to operate.

As used herein, the term "invitee" identifies a user/party that is invited to act as a invitee to an electronic inventive electronic communication session (opportunity to bid or offer, depending on the direction of the electronic communication session, on the security that is the subject of the electronic communication session) based at least in part on: i) selection by the electronic communication dealer; ii) expressed pre-trade intention; and/or iii) determination by the exemplary inventive electronic execution-mediating platform of the present disclosure base at least in part on data of the liquidity database.

As used herein, the term "pre-trade intention" identifies an expression of interest (electronically set preference and/or electronic submission) by a user in buying and/or selling a particular financial instrument/security (e.g., corporate bond) at a given price for a given size.

As used herein, the terms "liquidity monitor" and "liquidity dashboard" interchangeably identify one or more specialized inventive graphical user interfaces (GUIs) that display a liquidity score for each financial instrument/security (e.g., each corporate bond).

As used herein, the term "electronic communication dealer's liquidity score" identifies a calculated score assigned to each electronic communication dealer for each financial instrument (e.g., each corporate bond) and/or a calculated score based on data including, but not limited to, historical trading data of similar corporate bonds by each respective dealer, as determined by the exemplary inventive electronic execution-mediating platform of the present disclosure.

As used herein, the terms "financial instrument's liquidity score" or "corporate bond's liquidity score" identifies a calculated score assigned to each financial instrument (e.g., each corporate bond) based on data including, but not limited to, historical trading data of the particular corporate bond and/or similar corporate bond(s), as determined by the exemplary inventive electronic execution-mediating platform of the present disclosure.

As used herein, the terms "liquidity cloud" identifies a combination of specifically one or more programmed software/hardware modules in communication with one or more electronic distribute and/or centralized databases that may be programmed with suitable analytical logic detailed herein, and continuously updated with users' (e.g., members/users of the exemplary inventive electronic execution-mediating platform of the present disclosure) list of financial instruments (e.g., corporate bonds) that they have a specific interest in bidding/offering on (i.e., pre-trade intentions) in the event that another market participant initiates an electronic communication session. For example, members/users of the exemplary inventive electronic execution-mediating platform of the present disclosure are able to upload existing corporate bond positions that they want the exemplary inventive electronic execution-mediating platform of the present disclosure to provide analytics on to the liquidity cloud directly or from their Order Management System. For example, in some embodiments, once the corporate bond positions are added to the liquidity cloud, the liquidity cloud's analytics module may generate and present to a particular user a liquidity score, based on a number of factors, including but not limited to other market participants' pre-trade intentions uploaded to the liquidity cloud, that estimate the likelihood that there is contra interest in the individual corporate bond. For example, the user may be also provided with a liquidity score for each corporate bond position based on data including, but not limited to, TRACE data and user's historical data to determine how much liquidity there is in the market for that corporate bond. For example, in addition to uploading existing positions which they are interested in selling, clients can upload corporate bond positions that they would be interested in purchasing if they became available. In some embodiments, the availability of various liquidity scores allows the exemplary inventive electronic execution-mediating platform of the present disclosure to increase the speed of trade execution due to users' ability to make their decisions quicker (e.g., in real-time).

As used herein, the term "stack GUI(s)" identifies one or more specialized inventive GUIs that is/are configured to display the price and size that invitees have submitted for the financial instrument (e.g., a corporate bond) that is the subject of a particular inventive electronic communication session.

As used herein, the term "TRACE" identifies the Trade Reporting and Compliance Engine hosted by FINRA which provides a historical perspective of the trade in over-the-counter markets for U.S. corporate bonds, agency debentures, asset-backed and mortgage backed security markets.

As used herein, the term "post-trade" identifies a state at the conclusion of a particular electronic communication session when the exemplary inventive electronic execution-mediating platform of the present disclosure is configured to generate electronic notifications to all invitees that received an allocation in the electronic communication session.

The various systems and methods of the present disclosure will be described in reference to a computing environment 100 shown in FIG. 1. It should be appreciated, however, that the illustrated computing environment 100 is merely an example and the techniques of the present disclosure are equally applicable to other computing environments that include more or less elements.

Referring now to FIG. 1, a diagram of an example computing environment 100 is illustrated. The computing environment 100 can include a first user computing device 104 that can communicate with a second user computing device 108 via a network 112. While mobile phone configurations of the user computing devices 104, 108 are illustrated, it will be appreciated that the first and second user computing devices 104, 108 can be any suitable computing devices configured for communication via the network 112 (desktop computers, laptop computers, tablet computers, etc.). The network 112 can be a cellular network (2G, 3G, 4G long term evolution (LTE), etc.), a computing network (local area network, the Internet, etc.), or some combination thereof. A server computing device 116 can also communicate via the network 112. For example only, the server computing device 116 could facilitate, implement, coordinate, manage, etc. an electronic communication session between a first user 120 and a second user 124 associated with the first and second client computing devices 104, 108, respectively. In some aspects, the server computing device 116 can be associated with an intermediate entity (such as a dealer) that is not illustrated.

Figure 2:
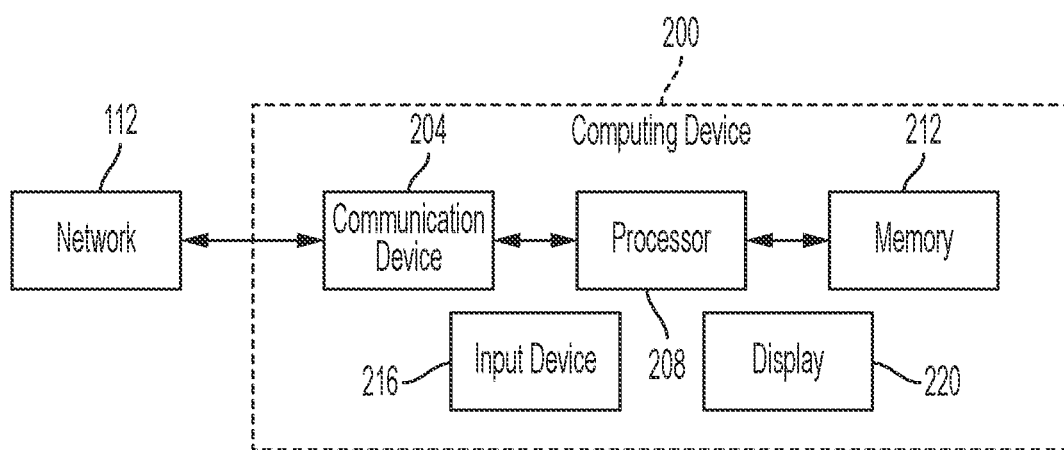
FIG. 2 is a functional block diagram of the example user computing devices of FIG. 1.

Referring now to FIG. 2, a functional block diagram of an example computing device 200 is illustrated. The computing device 200 can represent the configurations of the first and second computing devices 104, 108. It will be appreciated that the server computing device 116 could also have the same or similar configuration as the computing device 200. The computing device 200 can include a communication device 204 (e.g., a wireless transceiver) configured for communication via the network 112. A processor 208 can be configured to control operation of the computing device 200. The term "processor" as used herein can refer to both a single processor and two or more processors operating in a parallel or distributed architecture. A memory 212 can be any suitable storage medium (flash, hard disk, etc.) configured to store information at the computing device 200. In one implementation, the memory 212 can store instructions executable by the processor 208 to cause the computing device 200 to perform at least a portion of the disclosed techniques.

The computing device 200 can also include an input device 216 (such as a keyboard) and a display 220. The input device 216 can be any suitable hardware device (such as a keyboard) that permits a user to provide input to the computing device 200. While not shown, it will be appreciated that the computing device 200 can include other suitable components, such as a microphone, a speaker, physical buttons, a camera, and the like. As further described below, the example computing environment 100 can be configured to perform various techniques for hosting, supporting, participating, etc. in an electronic communication session.

In some embodiments, the exemplary inventive electronic execution-mediating platform of the present disclosure is configured to allow initiating users to decide on which dealer to request to be the electronic communication dealer based at least in part on which dealer(s) each respective initiating user has an existing trading relationship and/or the dealers' liquidity scores. In some embodiments, the exemplary inventive electronic execution-mediating platform of the present disclosure is configured to require the initiating user to select a number of parameters including, but not limited to, the firm price at which the initiating user will buy or sell the selected corporate bond, the minimum size that needs to be filled for the initiating user to agree to buy or sell the selected corporate bond, and the criteria for allowing invitees to see invitee's submissions at or the stack GUI itself (locked, unlocked, open). In some embodiments, the electronic communication dealer and the respective initiating user electronically can agree on a number of parameters including but not limited to, transaction fee paid to the electronic communication dealer, the maximum number of invitees that the electronic communication dealer can invite, and the length of time of the electronic communication session. In some embodiments, the exemplary inventive electronic execution-mediating platform of the present disclosure is configured to allow the electronic communication dealer to select an option to either i) fill the full quantity of corporate bonds at a pre-determined price or ii) provide a backstop. In some embodiments, a "Buy Now" option may be employed that allows invited participants, provided they accept the full transaction amount, to immediately agree to the transaction.

For example, if the electronic communication dealer does not agree to fill the full quantity of initiating user's electronic communication session, the electronic communication dealer will invite its selected invitees to participate in the electronic communication. In some embodiments, the electronic communication dealer's list of invitees may be informed by invitees' rankings generated by the exemplary inventive electronic execution-mediating platform of the present disclosure based on the information in the liquidity cloud (e.g., in an associated database) and/or the electronic communication dealer's own data. For example, additionally, unless the initiating user has requested otherwise, the exemplary inventive electronic execution-mediating platform of the present disclosure would also provide selected invitees that are able to be invitees in the particular electronic communication session based at least in part on their pre-trade intentions in specific financial instruments (e.g., corporate bonds).

In some embodiments, an electronic execution-mediating cloud platform may be configured to facilitate communication amongst parties with improved control over access to information and permission to participate compared to technology known to the field of electronic communication and networking. In some applications, it is beneficial to control which participants participate in a communication session and the types of actions those participants may take and the information they can view. Using improved technological mechanisms, the electronic communication session can be used to prevent information leakage using technological solutions including stack software object that controls the participation levels of the parties.

In some embodiments, an exemplary inventive electronic execution-mediating platform of the present disclosure is configured based at least in part on an exemplary inventive electronic communicating protocol that allows users of the exemplary inventive electronic execution-mediating platform to electronically trade various financial instruments such as, without limitation, corporate bonds. In some embodiments, the exemplary inventive electronic execution-mediating platform of the present disclosure is configured based at least in part on the exemplary inventive electronic communicating protocol that allows users to utilize one or more inventive specifically-programmed graphical user interfaces (specialized GUIs) to engage in an innovative electronic-based competitive bidding of the present disclosure (the inventive electronic request for execution process (electronic communication process)) for one or more particular trading offers involving one or more financial instruments such as corporate bonds. In some embodiments, the exemplary inventive electronic execution-mediating platform of the present disclosure is configured based at least in part on the exemplary inventive electronic communicating protocol that models the trading workflow to be operated through messages that follow the Financial Information Exchange Protocol (FIX) standard.

In some embodiments, the FIX standard includes an electronic communications protocol for international real-time exchange of information related to securities transactions and markets. FIX includes standards for message encodings and session protocols that may be adapted for use with the electronic communication session of the exemplary inventive electronic execution-mediating platform of the present disclosure.

In some embodiments, the FIX standard includes use of the FIX Adapted for Streaming (FAST) protocol. The FAST protocol facilitates one to compress data organized in accordance with FIX protocol ("the FIX data") to minimize the size of the transported FIX data.

FIGS. 1A and 1B show illustrative flow charts of an exemplary workflow associated with a lifecycle of an exemplary electronic communication session having the technological improvement including the stack software object.

In some embodiments, a user may initiate an electronic communication or exchange session on the electronic execution-mediating cloud platform to initiate communication amongst parties. The initiating user may initiate the communication session to exchange sensitive information and data. Thus, the electronic execution-mediating cloud platform may employ the stack software object to ensure that access to this sensitive information is restricted to a minimum number of parties, each having a restricted ability to participate in the communication session according to participation levels instituted by the stack software object.

In some embodiments, the user may initiate the electronic communication session by selecting an intermediate entity (such as a dealer) from a pool of potential intermediate entities. The intermediate entity is selected to mediate the electronic communication session. For example, in some embodiments, an initiating user (e.g., a buy-side initiating user) may be presented with a list of the intermediate entities with whom the initiating user has the necessary agreements for participation in the electronic communication session. Thus, in some embodiments, the electronic execution-mediating cloud platform may utilize an initiating user account and the intermediate entity account of each intermediate entity in the pool to identify matching intermediate entities. Thus, the electronic execution-mediating cloud platform ensures that the intermediate entity ultimately selected by the initiating user has legal or other responsibilities to the initiating user, thus preventing leakage of information regarding the initiated electronic communication session to unaffiliated intermediate entities in the pool of potential intermediate entities.

For example, the electronic execution-mediating cloud platform may only surface intermediate entities from the pool of potential intermediate entities that have matching agreement attributes to the initiating user, such as flags or data entries representing a legal agreement to engage with each other in, e.g., financial asset trading. For example, the electronic execution-mediating cloud platform may only surface intermediate entities that have legal agreements as dealers to the initiating user to allow trading through the electronic execution-mediating platform and network.

In some embodiments, the exemplary inventive electronic execution-mediating platform of the present disclosure may be configured, via the one or more exemplary specialized GUIs of the present disclosure, to allow the initiating user to electronically select a desired intermediate entity (e.g., a single dealer). In some embodiments, the exemplary inventive electronic execution-mediating platform of the present disclosure may be configured to dynamically select for the initiating user the intermediate entity (e.g., a single dealer) to be used. In some embodiments, the exemplary inventive electronic execution-mediating platform of the present disclosure may be configured to dynamically suggest, based at least in part on one or more specialized analytical techniques (e.g., machine learning algorithms) detailed herein, to the initiating user a list of candidate intermediate entities (e.g., dealers) so that the initiating user can choose a desired intermediate entity (e.g., a single dealer) to be used.

The initiating user may select a single intermediate entity to facilitate the session, which may trigger an electronic message to be sent to the selected intermediate entity. The selected intermediate entity may receive a notification through, e.g., an electronic execution-mediating application (e.g., the request to host an electronic communication session may appear as an "alert", in a dedicated alert window, e.g., to minimize the amount of screen space used).

In some embodiments, the electronic execution-mediating application may include, e.g., a software application, including front end design and back end processing, network communication, visualization generation and a graphical user interface for interacting with the electronic execution-mediating cloud platform. In some embodiments, the electronic execution-mediating application may include, e.g., an intermediate entity selection component enabling the initiating user to select an intermediate entity from the list of potential intermediate entities surfaced by the electronic execution-mediating cloud platform. Moreover, the electronic execution-mediating application may include, e.g., an intermediate entity component that enables a selected intermediate entity to accept, deny, and/or negotiate terms of the selection to mediate the electronic communication session. Additionally, the electronic execution-mediating application may include an activity monitor that enables the initiating user, the selected intermediate entity, or both to monitor activities occurring within the electronic communication session, such as, e.g., submissions, communications, transfers of information, and other data.

In some embodiments, the electronic message to the selected intermediate entity may send the electronic communication session data, including electronic communication session attributes to the selected intermediate entity. In some embodiments, the session attributes may include parameters of a financial transaction, such as, e.g., committed level, trade now level, electronic communication session length (e.g., in time), spot instructions, among other parameters for a trade negotiation for the trade of a quantity of a position in a financial instrument, such as, e.g., a bond, a stock, or other financial instrument. In some embodiments, the "trade now level" refers to, e.g., a pre-determined price for parties to the electronic communication session to purchase position in the financial instrument, or other minimum level of response in exchange for a transfer of data. Each of the attributes define aspects of what parties may participate in the electronic communication session and the rules concerning participation. The intermediate entity may have an interest in less strict rules to include more parties for greater confidence in, e.g., executing a trade or transfer during the session, while the initiating user may have an interest in more strict rules to prevent information leakage. Thus, the platform enables a negotiation for a balance between potential information leakage and potential mediation success. Thus, the electronic communication session may be customized in every instance.

In some embodiments, the intermediate entity, via the electronic execution-mediating application, may counter the session request to negotiate the attributes. For example, the intermediate entity may counter, e.g., to buy the subject of the transaction directly from the initiating user (e.g., buy the financial instrument, e.g., bonds), to negotiate the transaction spread, to negotiate the committed level, or other parameters of the transaction.

In some embodiments, the attributes may include, e.g., a backstop bid between the selected intermediate entity and the initiating user for a position in a financial instrument subject to the electronic communication session. The backstop bid is an element of the pre-trade initiation process between the intermediate entity and the client who selected him to host the electronic communication session. For example, where the initiation user is a seller that approaches an intermediate entity acting as a dealer to sell a financial instrument at a given price, the intermediate entity may commit to buy a lesser quantity of the financial instrument (e.g., a quantity of a bond below the quantity that the seller is seeking to sell) and work an order on the rest. Thus, the seller gains certainty that at least some of the seller's position in the financial instrument will be sold, while the intermediate entity's trade, e.g., once it prints on TRACE, may help other investors assess the current value of the bond. Thus, in an electronic communication session, the backstop is a commitment by the intermediate entity to step in and buy up to the amount specified at the committed level, if the full amount fails to trade. The existence or absence of a backstop bid does not impact the ability of other investors to bid whatever they choose. It may be implemented as an optional, one-time commitment from the intermediate entity to cover a portion of the trade if necessary.

In some embodiments, the exemplary inventive electronic execution-mediating platform of the present disclosure is configured, via the one or more exemplary specialized GUIs of the present disclosure, to allow the initiating user to set one or more attributes for which a particular participant or invitee to the electronic communication session would be able to see bids/offers placed during the exemplary electronic communication session by other invitees or invitees; thus, increasing transparency associated with electronic trade execution, and the likelihood of price improvement for the initiating user.

In some embodiments, the initiating user may respond to intermediate entity counter with updated parameters. For example, the initiating user may set new transactions spread as part of the new electronic communication session, or a new committed level or electronic communication session length, or any other parameter countered by the selected intermediate entity. However, where the counter by the selected intermediate entity includes an offer to buy the position in financial instrument directly, the initiating user may be presented with a trade confirm option, selectable by the initiating user to conduct the trade.

In some embodiments, once the attributes are agreed upon by the initiating user and the selected intermediate entity, the initiating user may be provided with an option to instruct the intermediate entity during the electronic communication session by sending electronic communications with a "Not to Trader" option. In some embodiments, the electronic execution-mediating application may also present the initiating user with an option to cancel or withdraw from the electronic communication session prior to launch of the electronic communication session.

In some embodiments, prior to launch of the electronic communication session, the electronic execution-mediating application may provide the selected intermediate entity with, e.g., an option to select invitees from a pool of potential invitees and then launch the electronic communication session. In some embodiments, to select the invitees, the intermediate entity selects the alert/activity monitor item, the "trade ticket" appears and the customer recommendation list appears in the ticket. At this point, the intermediate entity can select/deselect invitees in the list or set filters based on the customer liquidity scores (likelihood to trade) and/or limit the total number of invitations sent out, e.g., to address information leakage. In some embodiments, once the selections are made, the intermediate entity "submits" the ticket and similar notifications are sent to the selected invitees.

In some embodiments, the selected intermediate entity may be permitted to select invitees from all electronic execution-mediating-enabled counterparties. However, where the electronic execution-mediating platform includes larger quantities of potential invitees, the electronic execution-mediating application may be configured to allow the selected intermediate entity to set defaults for, e.g., the minimum liquidity score/maximum number of potential invitees to engage in the trade. Thus, in some embodiments, the electronic execution-mediating application may utilize invitee characteristics from potential invitee accounts. In some embodiments, the invitee account characteristics may include, e.g., the invitee's name, the invitees committed level, and a transfer history associated with the invitee's account.

In some embodiments, the liquidity score and invitee limit fields exist on the session request. Where the intermediate entity may set defaults on these limit fields, the intermediate entity may dynamically set and modify the limit fields to dynamically filter potential invitees. In some embodiments, in addition to the machine learning invitee suggestions described above, the liquidity cloud analytics module may also track "concurrent activity" for each potential invitee, where the concurrent activity indicates that a potential invitee is unavailable to participate in the electronic communication session. In some embodiments, the capacity to trade based on availability may vary based on invitee characteristics, such as, e.g., the size of a firm. This is because larger firms may automate much of electronic communication session trade process, allowing the large firms to handle a higher volume of requests. Smaller firms, on the other hand, may manually participate via the stack GUI and thus likely have more limited capacity to participate in concurrent electronic communication sessions. For example only, there may be situation in which a smaller firm is unable to participate in an electronic communication session due to its participation in other electronic communication or other trading sessions occurring at the same time.

Moreover, the intermediate entity may be provided with a list of suggested invitees of the potential invitees, e.g., based on the account characteristics associated with each potential invitee. For example, the liquidity cloud analytics module described below may predict a likelihood of each potential invitee to accept the parameters agreed upon by the initiating user and the selected intermediate entity, and to place a winning bid for the transaction. In some embodiments, the list includes the potential invitees that meet a liquidity threshold. In some embodiments, the liquidity threshold may include, e.g., a percentile threshold (e.g., the invitee must be a member of certain percentile of likelihood, such as, top 75 percentile, of the predicted likelihood of potential invitees to participate and/or win the transaction of the electronic communication session), a number of invitees threshold (e.g., a highest number of potential invitees according to predicted likelihood, such as the top 10 or 20 invitees), or a likelihood threshold include a minimum predicted likelihood score.

In some embodiments, the initiating user may monitor the electronic communication session via the activity monitor and take steps to improve chances of execution. For example, the initiating user may, e.g., add more invitees, edit committed level (for unlocked/open stacks), extend electronic communication session length, or modify other attributes to improve the likelihood of the execution of a trade. In some embodiments the activity monitor may provide a live or real-time update to the activity monitor for the initiating user to monitor the state of the electronic communication session. For example, the initiating user may monitor the bids and choose to trade early or receive trade confirmation if electronic communication exchanges are executed according to the attributes.

In some embodiments, the set of session invitees selected by the intermediate entity may be presented with the activity monitory according to the attributes of the electronic communication session agreed upon by the initiating user and the intermediate entity. In some embodiments, the attributes may define settings of the stack software object that establish participation levels of selected invitees. In some embodiments, the participation levels affect the user computing devices and the electronic execution-mediating cloud platform to restrict types of activities that the parties to the electronic communication session may engage in and view, e.g., via a stack graphical user interface (GUI). In some embodiments, the permissions of each session invitee to access communications during the electronic communication session, such as, e.g., an open, locked or unlocked permissions level of the stack GUI, as described above.

In some embodiments, the exemplary inventive electronic execution-mediating platform of the present disclosure is configured to allow each initiating user to set one or more attributes to establish the settings of the stack software object that controls the scope of what invitees could see at the stack GUI during an electronic communication session. For example, once the electronic communication dealer has invited a select number of invitees, the electronic communication dealer's invitees and, optionally, the liquidity database's invitees are able place bids or offers, depending on the direction of the particular electronic communication session, for the selected financial instrument/security For example, in some embodiments, invitees to the electronic communication session are able to see certain information at the stack GUI based, at least in part, on whether the stack software object setting for the electronic communication session is "locked", "unlocked," or "open." For example, in some embodiments, the initiating user and the electronic communication dealer can also see some or all information being posted to the stack GUI. For example, in some embodiments, all invitees are able to bid/offer or improve the level of their bid/offer for the selected corporate bond for the duration of the electronic communication session. For example, in some embodiments, responding with price levels is a competitive process for the duration of the electronic communication session and will be determined by price, then size, then time, unless the electronic communication session is fully allocated, at which point the submissions shown by the stack GUI will be ordered by price, then time.

In some embodiments, when the stack GUI is locked the stack GUI or invitees' submissions during the electronic communication session are visible only to those invitees that have placed a bid having certain predetermined parameter(s) (e.g., submissions at the committed level or better).

In some embodiments, when the stack GUI is unlocked the stack GUI or invitees' submissions during the electronic communication session are only visible to those invitees that have a placed a bid (e.g., submissions at any level). For "unlocked" stacks, the initiating user specifies predetermined parameters including, e.g., an indicative price (not firm). As with locked stacks, invitees need to submit levels at or better than the reserve level to gain access to the stack. The difference is that the initiating user has an option, not a firm commitment, to trade at the reserve level.

In some embodiments, when the stack GUI is Open: the stack GUI or invitees' submissions during the electronic communication session are visible to all invitees.

In some embodiments, the stack type options help an initiating user/trader manage the trade-off for the amount of information they need to share with counterparties to create a robust bidding environment.

For example, in any given month, it may be that less than, e.g., 20% of all US corporate bonds have at least one trade every business day. This episodic nature of bond trading makes it difficult for investors to calibrate the current price of a specific bond to the dynamic conditions in the market. In some embodiments, the electronic execution-mediating platform employs the locked, unlocked, and open stack software object participation levels to give trade initiating users tools to help them tailor the trading process across a range of market conditions.

In some embodiments, for liquid bonds from popular issuers, locked stacks are generally the most appropriate option. The locked stack participation level forces invitees to commit some degree of risk in order to see the prices submitted by those with whom they would be competing to trade the bond.

In some embodiments, an unlocked stack gives the initiating user the option to set a secondary level which if met by the bidders allows them to see the bids entered by others. The bidders' levels are treated as "firm" (i.e., must be honored), while the initiating user retains an option to proceed or walk away from the trade. The unlocked stack participation level lets potential counterparties interact in a manner that can get a conversation started.

The open stack participate level creates a forum for price discovery for "hard to trade" assets.

In some embodiments, session invitees are then able to submit their trade parameters (size and level) and view the "stack", which provides transparency into the activity of all participants. However, based on the participation levels, the session invitees may or may not be able to see identifiers (e.g., names) associated with each other session invitee participating the electronic communication session. For example, a locked stack GUI may anonymize each session invitee in the electronic communication session.

In some embodiments, the session invitees may also be presented with the option to submit one or more bids via the stack GUI. In some embodiments, a matching engine that processes inputs to an order book anonymizes the names of the participants in the electronic communication session. The system also maintains the anonymized name mapped to each participant. As the subscription manager routes updates about the order book to the stack GUI, it converts the anonymized name to the "My Bid" for display to the user. In some embodiments, communications to the electronic communication session may be routed via the FIX standards and converted in a similar fashion.

For example, in some embodiments, the electronic communication system employs the "liquidity cloud", e.g., the computing cloud 1705 of FIG. 17 described below. In order to participate in the liquidity cloud, one must be an intermediate entity on the platform or a client of at least one intermediate entity. The liquidity cloud allows participants to share their current interest with the electronic execution-mediating platform so that they have an ability to participate in trades, should the opportunity present itself. As mentioned above, information leakage may lead to a reluctance among market participants to advertise their intentions. Thus, the liquidity cloud collects these intentions by electronic communication session system, with the understanding that should the "other side of the trade" emerge, the electronic communication session system has the ability to reach liquidity throughout its entire network.

In some embodiments, the stack software object controlling an electronic communication session system implements the rules that controls access to content for all participants based upon their role in the trade. The initiating user only selects the intermediate entity. In some aspects, an initiating user may be permitted to communicate white list/black list rosters of other account managers that the initiating user wants to allow/block from invitation to the electronic communication session. Such an implementation can be a further means for controlling information leakage. For example only, it may be obvious to market participants that if a given bond is being sold in a large size that, it is likely that, e.g., a top 10 asset manager is the seller, which may influence the market.

In some embodiments, the attributes may only allow multiple bids, which may be scaled or independent, and bids, once placed, to only be allowed to improve on past bids. In some embodiments, the stack software object controlling the electronic communication session may enable a bidder to specify a minimum bid fill amount. In some embodiment, the electronic execution-mediating application may only allow for bids to be cancelled by the intermediate entity. Moreover, where if the bid is allocated, the bidder may be presented with a trade confirm at the end of the electronic communication session. However, if a bidder is outbid, the bidder may be presented with an alert. Furthermore, in some embodiments, a reset period may be established where a new bid that impacts existing allocations may trigger the reset period to facilitate resetting the allocations.

In some embodiments, the stack software object may enable the invitees to have the option to remain anonymous until the electronic communication session is completed and ready for booking (if the invitee bids but is not part of the final trade allocation, the intermediate entity will not know they were bidding). In some embodiments, if no agreement exists between a winning bidder from the liquidity cloud and the host intermediate entity, a "step-in intermediate entity" is assigned to settle the trade. Again, the invitee is in a position to participate at all because the invitee has a connection to at least one intermediate entity (but not necessarily the intermediate entity that was selected).

In some embodiments, the one or more exemplary specialized GUIs of the present disclosure may be configured to allow users to engage in the exemplary inventive electronic communication process by allowing a seller or buyer of financial instruments/securities (e.g., corporate bonds) to send an electronic request that would request, via a computer system, an intermediate party (e.g., a dealer) to host one or more competitive electronic executions via the electronic communication session (one or more particular electronic communication sessions for one or more particular financial instruments such as corporate bonds). For example, the exemplary inventive electronic execution-mediating platform of the present disclosure is configured to allow a single intermediate entity (e.g., a single dealer) to execute the exemplary electronic communication bidding on behalf of a seller or a buyer by electronically offering, via specialized electronic communication messaging, to a plurality of potential invitees an opportunity to fulfil the initiating user's submission based on one or more suitable matching condition(s) whose illustrative examples are provided herein.

In some embodiments, the exemplary inventive electronic execution-mediating platform of the present disclosure is configured to rank potential counterparties by their anticipated level of interest in a transaction. This empowers those sending out these communications to limit "information leakage", thereby preventing providing an adversary with information that can be used against a party (e.g., the initiating user or the invitees).

In some embodiments, the exemplary inventive electronic execution-mediating platform of the present disclosure is configured to allow the intermediate entity to electronically select invitees to whom electronic invitation will be electronically transmitted. In some embodiments, the exemplary inventive electronic execution-mediating platform of the present disclosure is configured to suggest, based at least in part on one or more specialized analytical techniques (e.g., machine learning algorithms) detailed herein, to the intermediate entity (e.g., the single dealer) a list of clients of such intermediate entity (potential invitees) who would be most likely to be interested in selling/buying one or more specific financial instruments (e.g., specific corporate bond(s)) that would be part of the exemplary sell or buy offer; consequently, allowing to electronically aggregate (and potentially increase) liquidity across multiple invitees.

In some embodiments, the exemplary inventive electronic execution-mediating platform of the present disclosure is configured to require, via the one or more exemplary specialized GUIs of the present disclosure, an initiating user to submit a firm buy/sell order having a minimum price that, if met, the initiating user will commit to buy or sell the specified financial instrument (e.g., corporate bond), depending on the direction of the exemplary inventive electronic communication. In some embodiments, the exemplary inventive electronic execution-mediating platform of the present disclosure is configured to require, via the one or more exemplary specialized GUIs of the present disclosure, not only a certain price but also certain size/quantity (e.g., a minimum size/quantity). In some embodiments, the exemplary inventive electronic execution-mediating platform of the present disclosure may be configured to vary value(s) for the required price, the required quantity, or both, based at least in part on one or more of a type of financial instrument, issuer of financial instrument (e.g., corporate bond), characteristic(s) of initiating user (e.g., historical transactional data), characteristic(s) of the selected intermediate entity (e.g., the single dealer), etc.

In some aspects, a matching engine in the computing environment can process inputs to anonymize the names of the participants in a trade. The system also maintains the anonymized name mapped to each participant. As the subscription manager routes updates about the order book to the UI, it converts the anonymized name to the "My Bid" for display to the user. In some embodiments, a similar conversion is made for messages routed via FIX. In some embodiments, the dealer sees explicit names for all participants because each is a client of dealer. However, the participants are prevented from view the names of other participants to prevent information leakage. In some embodiments, the anonymized names are randomly chosen for each transaction. As a result, a buyer might be "bidder 1" on one trade and "bidder 89" on the next one.

In some embodiments, the exemplary inventive electronic execution-mediating platform of the present disclosure is configured to utilize one or more suitable specialized analytical techniques (e.g., machine learning algorithms), as detailed herein, to identify most likely invitees to participate in the electronic communication session. For example, electronic execution-mediating platform may employ a cloud-based analytics module that identifies the most likely invitees of the pool of potential invites to transact with a particular financial instrument (e.g., corporate bond) based at least in part on continuously updatable database(s) (liquidity database(s)) which electronically aggregate(s), for example, without limitation, one or more of transactional data various market participants, their pre-trade intentions, and characteristic(s) of their desired counterparty(ies). In some embodiments, the exemplary inventive electronic execution-mediating platform of the present disclosure is configured to operate as a membership network of users who may be invited to participate in a particular electronic communication session based on their pre-trade intention and/or estimated trade likelihood even when they are not associated with the particular intermediate entity (e.g., the single dealer); thus providing additional source of liquidity for the inventive electronic execution of the present disclosure. In some embodiments, the exemplary inventive electronic execution-mediating platform of the present disclosure is configured to utilize one or more suitable specialized analytical techniques (e.g., machine learning algorithms), as detailed herein, to determine a liquidity score (a quantitative representation of a likelihood to find a successful matching) for a particular financial instrument (e.g., corporate bond) based at least in part on, without limitation, users' pre-trade intentions and/or their estimated trade likelihood.

In some embodiments, the exemplary liquidity cloud's analytics module may be configured to generate/utilize separate prediction models for each intermediate entity and/or financial instrument (e.g., corporate bond) based on one or more machine learning technique (such as, but not limited to, decision trees, boosting, support-vector machines, neural networks, nearest neighbor algorithms, Naive Bayes, bagging, boosting, random forests). In some embodiments and, optionally, in combination with any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
1) define Neural Network architecture/model,
2) transfer the input data to the exemplary neural network model,
3) transform the input data to a suitable numeric format (feature engineering),
4) train the exemplary model incrementally,
5) determine the accuracy for a specific number of timesteps,
6) save and apply the exemplary trained model to process the newly-received input data,
7) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node likely to be activated.

In some embodiments and, optionally, in combination of any embodiment described above or below, an exemplary connection data for each connection in the exemplary neural network may include at least one of a node pair or a connection weight. For example, if the exemplary neural network includes a connection from node N1 to node N2, then the exemplary connection data for that connection may include the node pair <N1, N2>. In some embodiments and, optionally, in combination of any embodiment described above or below, the connection weight may be a numerical quantity that influences if and/or how the output of N1 is modified before being input at N2. In the example of a recurrent network, a node may have a connection to itself (e.g., the connection data may include the node pair <N1, N1>).

In some embodiments and, optionally, in combination of any embodiment described above or below, the exemplary trained neural network model may also include a species identifier (ID) and fitness data. For example, each species ID may indicate which of a plurality of species (e.g., intermediate entities', initiating users', invitees' and/or corporate bonds' categories) a particular model is classified in. For example, the fitness data may indicate how well the exemplary trained neural network model models the input data set. For example, the fitness data may include a fitness value that is determined based on evaluating the fitness function with respect to the model. For example, the exemplary fitness function may be an objective function that is based on a frequency and/or magnitude of errors produced by testing the exemplary trained neural network model on the input data set. As a simple example, assume the input data set includes ten rows, that the input data set includes two columns denoted A and B, and that the exemplary trained neural network model outputs a predicted value of B given an input value of A. In this example, testing the exemplary trained neural network model may include inputting each of the ten values of A from the input data set, comparing the predicted values of B to the corresponding actual values of B from the input data set, and determining if and/or by how much the two predicted and actual values of B differ. To illustrate, if a particular neural network correctly predicted the value of B for nine of the ten rows, then the exemplary fitness function may assign the corresponding model a fitness value of 9/10=0.9. It is to be understood that the previous example is for illustration only and is not to be considered limiting. In some embodiments, the exemplary fitness function may be based on factors unrelated to error frequency or error rate, such as number of input nodes, node layers, hidden layers, connections, computational complexity, etc.

For example, a particular predictive model can be created by following at least the 3-step process of:
1) Data Extraction,
2) Data Enrichment, and
3) Modelling.

Data Extraction

In some embodiments, the data used in the model comes from a combination of information from private (non-public data of particular user (e.g., intermediate entity)) and public electronic sources, and may include one or more chosen from:
1) Transaction Data (e.g., the post-trade settlement process data), having at least one or more of the following parameters:
   a) Trade Time (dd/mm/yyyy hh:mm:ss)
   b) CUSIP
   c) Customer Account #
   d) Trade Amount
   e) Trade Price
   f) Direction (buy/sell)
2) Security/financial instrument (e.g., corporate bond) Master Data (e.g., structural and descriptive attributes are collected for each bond; for example, some of these attributes are used as direct model inputs; and others are used to generate expected performance and risk metrics that help the model calibrate the interactions between clients and tradable bonds), having at least one or more of the following parameters/fields:
   a) Maturity Date,
   b) Coupon Type,
   c) Coupon Rate,
   d) Coupon Payment Frequency,
   e) Day-count type,
   f) Call Schedule (if applicable),
   g) Put Schedule (if applicable),
   h) Floating Rate Coupon Formula (if applicable),
   i) Principal Redemption Schedule (if applicable),
   j) Issuer Name,
   k) Industry/Sector (multiple levels),
   l) Amount Outstanding,
   m) Original Issue Amount,
   n) Investment Grade/High Yield Flag,
   o) Credit Ratings,
   p) Spread data (e.g., to assess the market's view on the credit risk of an asset versus credit ratings),
   q) TRACE-eligibility flag,
      i) Supplied by FINRA to identify bonds whose transactions must be reported to the regulator.
3) Price Data (e.g., a minimum of three months history may be required to build/train each dealer's model; for example, the price history repository covers all TRACE-eligible bonds and the benchmark US Treasury notes/bonds that are a reference point for market participants), having at least one or more of the following parameters:
   a) Daily closing prices are collected for each bond,
   b) Intraday US Treasury prices are collected for each of the following benchmark maturities:
   c) 2-year, 3-yr, 5-yr, 7-yr, 10-yr, 30-yr,
   d) A LIBOR model is used to derive the benchmark levels for bonds with less than 13 months to maturity,
   e) Trade-by-trade data from FINRA TRACE.

In some embodiments, the exemplary inventive analytics module may utilize trader/salesperson identifier(s) in the trading data to segment larger asset managers into several distinct recommendation targets, based upon their sales coverage. For example, salesperson A may cover asset manager B for investment grade bonds but salesperson B may have the relationship for high yield.

In some embodiments, the exemplary inventive analytics module may utilize the account number to identify "block accounts", which are used for the initial booking of a trade and "real accounts" that hold assets for investors. Then, the exemplary inventive analytics module may identify groups of "real accounts" that share similar asset selection and trading tendencies, allowing to break down larger clients into more granular segments. For example, groups of real accounts can be identified based on, e.g., "passive investors" that seek to match the performance of an index, and "active investors" look to beat the index. The bonds passive investors and active investors trade and the timing of these trades have distinctive patterns according to the type of investor.

Data Enrichment

In some embodiments, the Data Enrichment step may involve a process of Trade Aggregation, performed by the analytics module. In some embodiments, the Trade Aggregation process is component of our historical Data Enrichment, where, e.g., analytics module extracts raw data from settlement systems and matches the trades to market events reported in FINRA's TRACE system. The analytics module provides a view of current market information, contributed by user firms (both buy-side & dealers). For example, since the post-trade data may include both the original block trade and records for the final allocations to the beneficial owners of the securities, the exemplary inventive analytics module may generate a prediction model that would focus on decision maker(s) in each trade (e.g., the block trade counterparty). For example, using a combination of the dealer transaction data and the FINRA TRACE data, the exemplary inventive analytics module may match the transactions from each dealer's records to the specific transaction in TRACE. For example, in cases where multiple transactions in the dealer records match a single TRACE trade, the exemplary inventive analytics module may first look for a record that exactly matches the trade size reported to FINRA. If such a trade is found, the exemplary inventive analytics module may associate the counterparty in that record as the executing counterparty. Furthermore, for example, the exemplary inventive analytics module may create a parent/child relationship between the executing counterparty and the other accounts that were associated with the trade.

In some embodiments, trade aggregation in the data enrichment step may include, e.g., three data aggregation/normalization steps. In some embodiments, a first step includes block trade aggregation from the transaction history files. The analytics module may create predictions that look to identify the entity that acted in the market to execute a trade. Institutional money managers may often trade on behalf of their clients or, in the case of mutual funds, the legal entity responsible for the fund. Moreover, a single trade in the market is often allocated to multiple accounts at the direction of the asset manager. As a result, the raw transaction records list the beneficial owner (buyer/seller) of the traded asset and may also contain a record reflecting the block trade recorded prior to the allocations. In some embodiments, the analytics module employs the main characteristics of the trades extracted from the dealer records and reconcile these trades to transactions reported in FINRA's TRACE feed. Matching is based upon exact matches on CUSIP, execution time, trade direction, price and counterparty types. In some embodiments, the analytics module may also look to match on total trade size, although this is not always possible due to FINRA's policy to cap the actual transaction amount reported for trades larger than $5 MM for investment grade bonds and $1 MM for high yield bonds.

At times, an asset manager executes a trade with a dealer on behalf of a single client. When this occurs, the asset manager's name may not appear in the trade record captured from the dealer. Instead, the record contains just the name of the beneficial owner. Accordingly, in some embodiments, a second step of trade aggregation may include mapping all the beneficial owner accounts to the corresponding asset manager (a candidate for inclusion in our recommendation model, by virtue of their trade decision making authority). This process employs, e.g., an iterative analysis of the counterparties reported by the dealer where the rate of co-occurrence among the counterparties identified in transactions with multiple reported participants is measured. In some embodiments, the block account (i.e., the decision-making counterparty) is the most frequently observed trade counterparty.

Finally, the trade aggregation employs a number of natural language processing (NLP) techniques to cleanse the dealer counterparty data. In some embodiments, the raw information comes from content sets that have grown organically, sometime over decades. Account names are created by administrators at each client and there appear to be no validation rules to enforce standardization. (This is name/address data that are not critical to the trade processing performed). In some embodiments, the analytics module may employ an official source for ID fields (Tax ID's, Legal Entity Identifiers (LEIS), or Market Place IDs (MPIDS)) as the target name for each entity in our process and use NLP pattern matching to associate the text strings found in our sources to the appropriate firm. As more users (e.g., dealers and buy-side users) are onboarded to the platform, the analytics module is able to capture this information directly from the dealers. In some embodiments, this mapping to ID fields allows identification of asset managers across the full spectrum of dealers on the platform.

In some embodiments, the first and second trade aggregation steps may be executed daily as new trade records are added in, e.g., a nightly model training process. Thus, the client mappings may be refined as new names and relationships are uncovered. However, other periods may be employed, such as, e.g., weekly or monthly updates, or in some embodiments, a continuous update or live update process may be used.

In some embodiments, during the Data Enrichment step, for each record in the dealer transaction table, the TRACE transaction table and the end-of-day price history table, the exemplary inventive analytics module may compute the following values:
1) Yield-to-worst (YTW) (e.g., Yield to the issuer's next logical redemption date),
2) Option-adjusted Spread (OAS),
3) Option-adjusted Duration,
4) Option-adjusted Convexity,
5) Spread to Benchmark Treasury.

In some embodiments, during the Data Enrichment step, the exemplary inventive analytics module may apply time series analysis to determine Baseline Liquidity Metric (liquidity score) based at least in part upon the relative trade volume and trade count for each bond over the most recent three months of trading. It should be appreciated that other periods of time may instead be used as this value can be configurable. Additionally or alternatively, the Baseline Liquidity Metric (liquidity score) can be based on multiple windows to time. In some embodiments, the Baseline Liquidity Metric are generated based on factors such as, e.g., the activity of the bond observable through TRACE. In some embodiments, for dealers, this is adjusted to account for his recent activity, as a percentage of TRACE activity overall and in the specific bond being analysed, and for clients, the adjustment is derived from the output of the neural network, which projects the client's expected level of interest in a particular trade opportunity. In some embodiments, Baseline Liquidity Metrics are a function of the desired trade price and the size of the trade. The user has no way to influence how this 3-dimensional surface is constructed, other than by executing trades. In some embodiments, however, a user may modify the price and/or size of a trade, and the analytics module may return the score for the corresponding point on this surface.

In some embodiments, during the Data Enrichment step, the exemplary inventive analytics module may utilize Price/Yield volatility, by using the end-of-day prices for each bond, to compute, for example, without limitation, 1-mo, 3-mo and 6-mo historical volatility for both the price and yield. For example, in some embodiments, such metrics may provide insight into the relative performance risk for bonds with similar structural characteristics. In some embodiments, during the Data Enrichment step, the exemplary inventive analytics module may utilize Total Return metrics, using end-of-day prices for each bond, compute 1-mo, 3-mo, and 6-mo realized returns for a unit investment. For example, these metrics present the models with critical performance attributes for the assessing users' trading preferences.

Modelling

In some embodiments, during the Modelling step, the exemplary inventive analytics module may employ an ensemble modelling approach. For example, in some embodiments, the exemplary inventive analytics module may employ Natural Language Processing to clean and normalize the set of eligible trading counterparties. For example, in some embodiments, the exemplary inventive analytics module may employ K-means clustering to create candidate groupings of "comparable bonds". For example, in some embodiments, the exemplary inventive analytics module may utilize results of these models as inputs to an exemplary neural network model (e.g., FIG. 3A) that would be trained to create an exemplary prediction model.

In some embodiments, cleansing and normalizing the set of eligible trading counterparties ensures that the characteristics of past trading behaviours being quantified reflect the actual participants in the market to provide value to the predictions in guiding future trades.

In some embodiments, K-means clustering is employed by the analytics module due to greater interpretability. For example, the cluster members may be exposed in a GUI visualization, e.g., by depicting the clustering. However, other classification and clustering models may be used, including random forest, k-nearest neighbours, portioning, etc.

For example, in some embodiments, the exemplary inventive analytics module may generate a user-related Master table/dataset/database. For example, the block-trade accounts identified in the trade aggregation process above may be mapped to a normalized account name using information collected from the dealer's customer table. For example, in some embodiments, the exemplary inventive analytics module may use a combination of natural language processing and clustering technique(s) to automate the creation of these mappings.

In some embodiments, for example, large asset managers manage funds using a variety of investment strategies. Some funds employ passive strategies, aiming to match the performance of some market benchmark index. Other funds employ active strategies that seek to beat the performance of these indices. In the end, invitations to participate in an electronic communication are delivered to human traders, who manage the accounts that have passive or active performance goals. Treating these large firms as single entities is likely to result in a sub-optimum model. For example only, at one extreme, an active manager's interest in bonds with premium prices may be negated by an equally large passive fund manager who only trades bonds that trade at a discount to par.

From a modelling perspective, it may be a challenge to create the partitioning of the accounts into the sub groups. The modelling process is not sensitive to the number of potential counterparties, provided there is sufficient data to adequately model each group.

For example, in some embodiments, the exemplary inventive analytics module may determine a Bond Similarity. For example, the exemplary inventive analytics module may employ a K-means clustering model to establish groupings based mainly on security master attributes. For example, each bond's assigned cluster number becomes an input feature for the exemplary neural network of FIG. 3A.

Figure 3A:
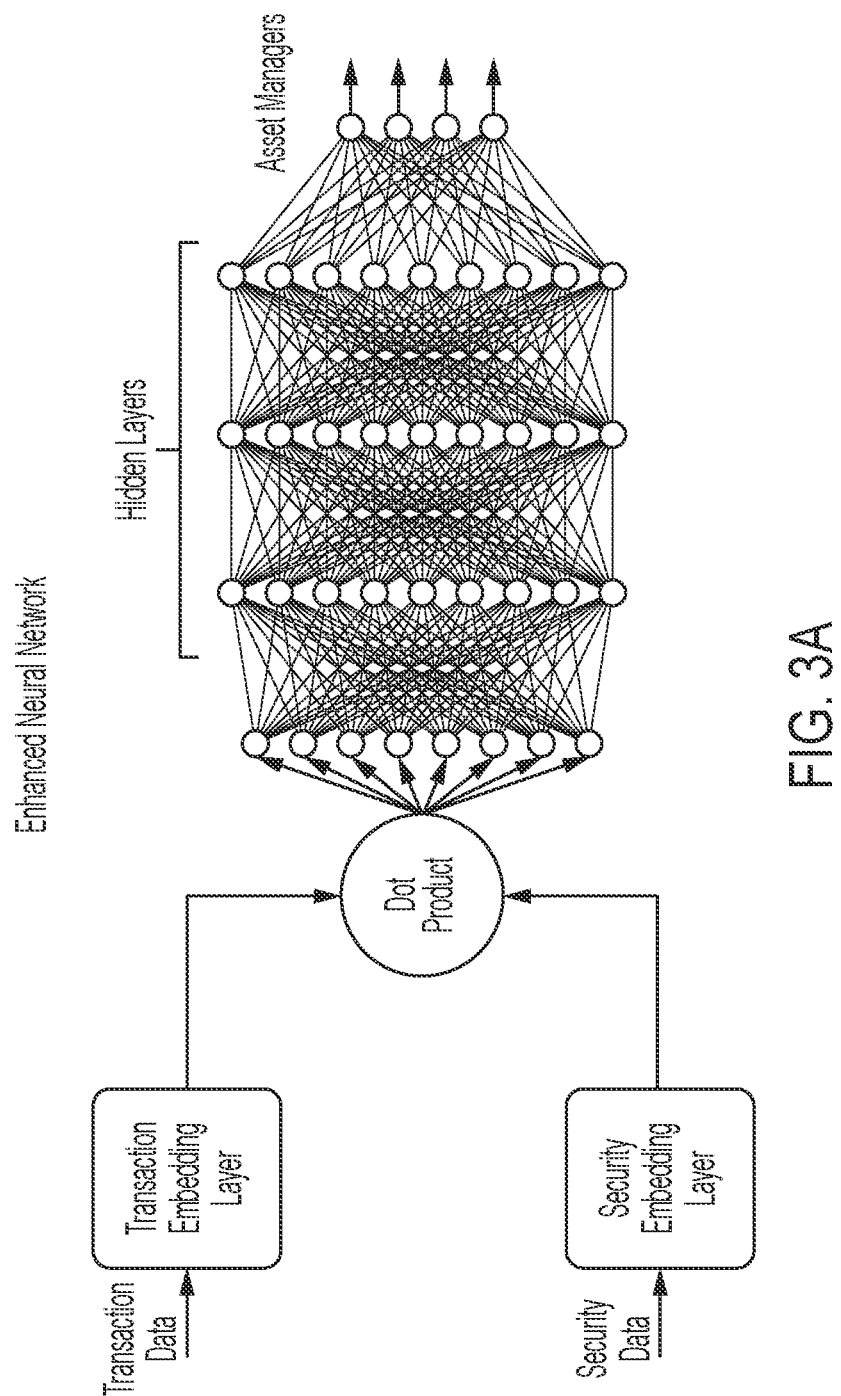
FIG. 3A is an exemplary neural network model that can be used with the techniques according to some implementations of the present disclosure.

For example, in some embodiments, as shown in FIG. 3A, the exemplary inventive analytics module may input a set of transaction data and security information, for example, collected over a minimum of three months, as input to the exemplary neural network. For example, such inputs would represent known information that resulted in trades with specific counterparties. For example, in some embodiments, the exemplary inventive analytics module may utilize the exemplary neural network to fit a series of weights that produce a solution that maximizes the number of instances where the input from trade X identifies the actual buyer in that trade.

For example, in some embodiments, the number of hidden layers depends on the non-linear complexity of particular relationship(s) to be discovered by the model. For example, in some embodiments, each hidden layer may have no more than ⅔ the number of nodes in the input layer. For example, in some embodiments, the exemplary inventive analytics module may utilize a "SoftMax" function (e.g., a function that takes as input a vector of K real numbers and normalizes it into a probability distribution consisting of K probabilities) as the "activation function" applied at each node to control the transfer of information through the network and to reach the output layer. For example, the model would assign the probability that each counterparty would be the buyer for the trade described by a particular input sample.

For example, in some embodiments, the exemplary inventive analytics module may utilize "Default_indicator" as a flag that indicates if a bond has failed to meet its interest and/or principal payment obligations and to help refine the categorization of securities for both the bond similarity and the neural network model generation/validation.

In some embodiments, an exemplary generated predictive model can be tested by utilizing market data as input data. For example, counterparties in the output layer may be sorted by their probability of execution (e.g., the value of the "SoftMax" activation function). For example, a positive outcome is defined as cases where the observed by was:
1) Present in the Top 10 most likely buyers, or,
2) one of the Top 10 buyers bought the bond in the trade or a substantially similar bond in the next 24 hours.

In some embodiments, the "substantially similar" test may be defined as a bond from the same cluster, using the K-means clustering model based on bond attributes.

In some embodiments, the output layer of the neural network assigns a value ranging from 0 to 1 to each candidate counterparty (names on a dealer's client list) ($CAC_i$) that can be interpreted as the probability that the counterparty will execute a trade with the specified attributes. The ranking is achieved by ordering the customers by this metric.

In some embodiments, the metric above may be combined with the market-level liquidity score derived from TRACE using the following formula: $LS_i=(LS_{market}+10*(CAC_i/2), 10)$ and presented to a user. For example, for bond X, $LS_{market}=7$ and $CAC_i=0.367$. Thus, $LS_i=(7+3.67/2, 10)=8.84$, which may be rounded to 9.

In some embodiments, the above described formula is calibrated to actual market outcomes using the data from the actual electronic communication process, e.g., through nightly, weekly, monthly, or real-time updating and training.

In some embodiments, exemplary inventive analytics module may facilitate the ability by an initiating user to access needed liquidity from more "natural" counterparties that an intermediate entity may select as invitees to a given electronic communication session. This, once again, reduces information leakage to potential adversaries in the market. In some embodiments, intermediate entities benefit from being able to provide better service to both the initiating user, who is triggering the event, and to the invitees who are asked to participate in the session. Intermediate entities struggle to provide adequate coverage to clients in the "long tail" of the customer list. The recommendations help highlight productive opportunities to engage these clients as invitees to electronic communication sessions. In some embodiments, invitees may benefit similar to the intermediate entities because the invitees are more often contacted for opportunities that matter to them, instead of calls meant to "keep them warm".

FIG. 3B shows exemplary inputs into the exemplary inventive neural network of the present disclosure (e.g., as shown in FIG. 3A).

Figure 4:
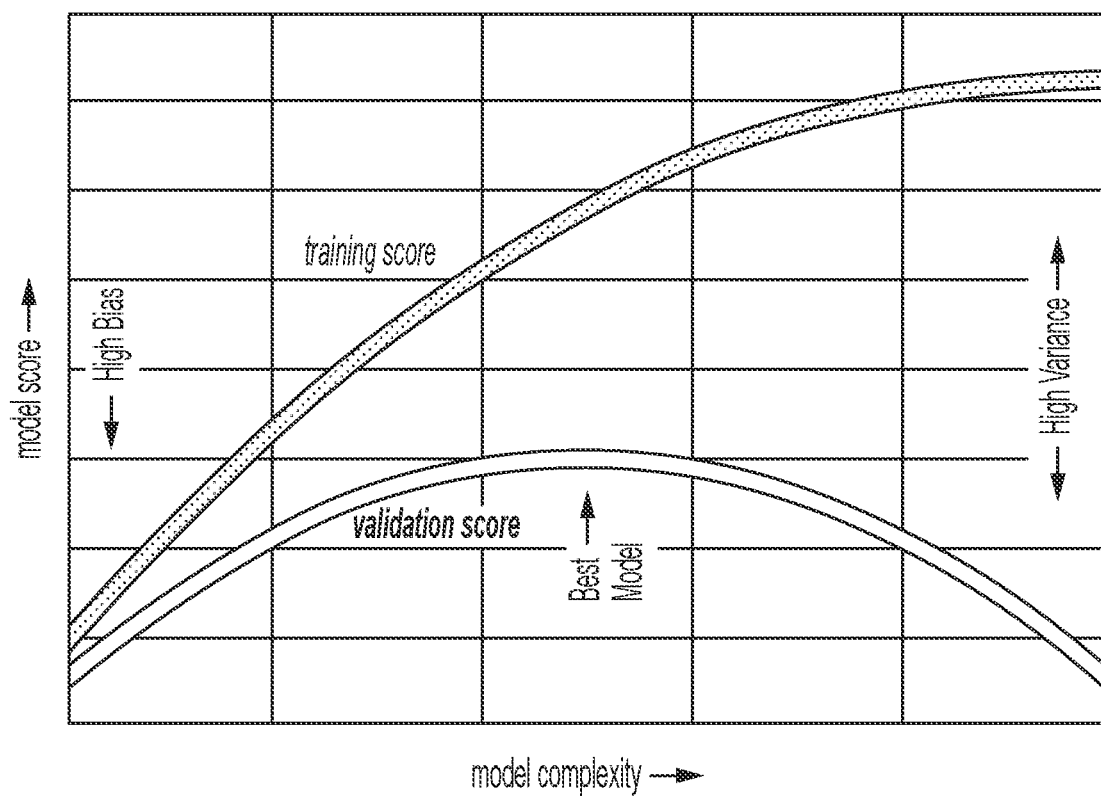
FIG. 4 shows exemplary testing of exemplary predictive models based on training and validation scores to determine when an optimal predictive model to be used by the exemplary inventive analytics module may exist for various analytics detailed herein.

FIG. 4 shows exemplary testing of exemplary predictive models based on training and validation scores to determine when an optimal predictive model to be used by the exemplary inventive analytics module may exist for various analytics detailed herein.

Figure 5A:
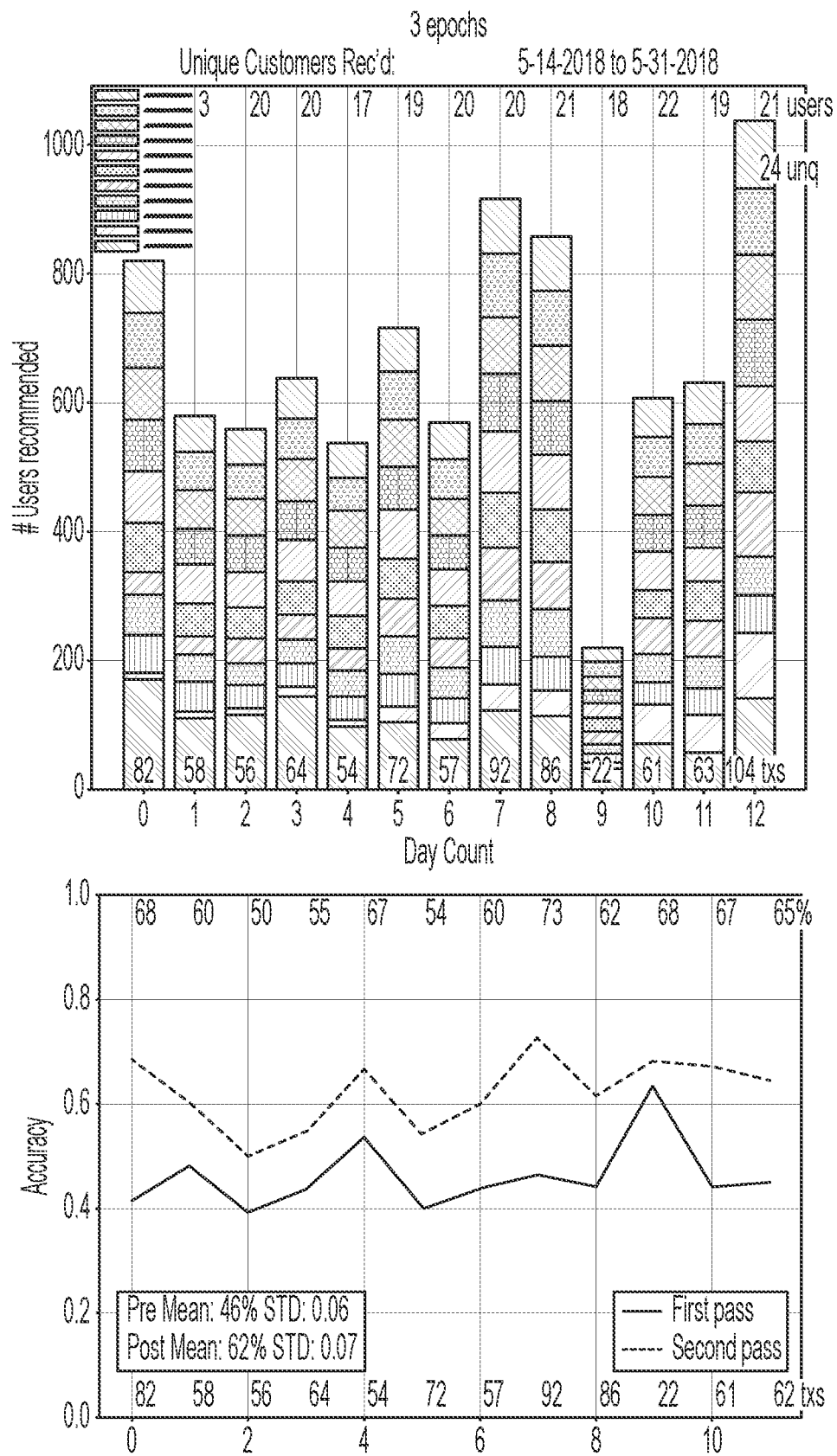
FIGS. 5A-5C shows exemplary statistics utilized for training exemplary predictive models.
Figure 5B:
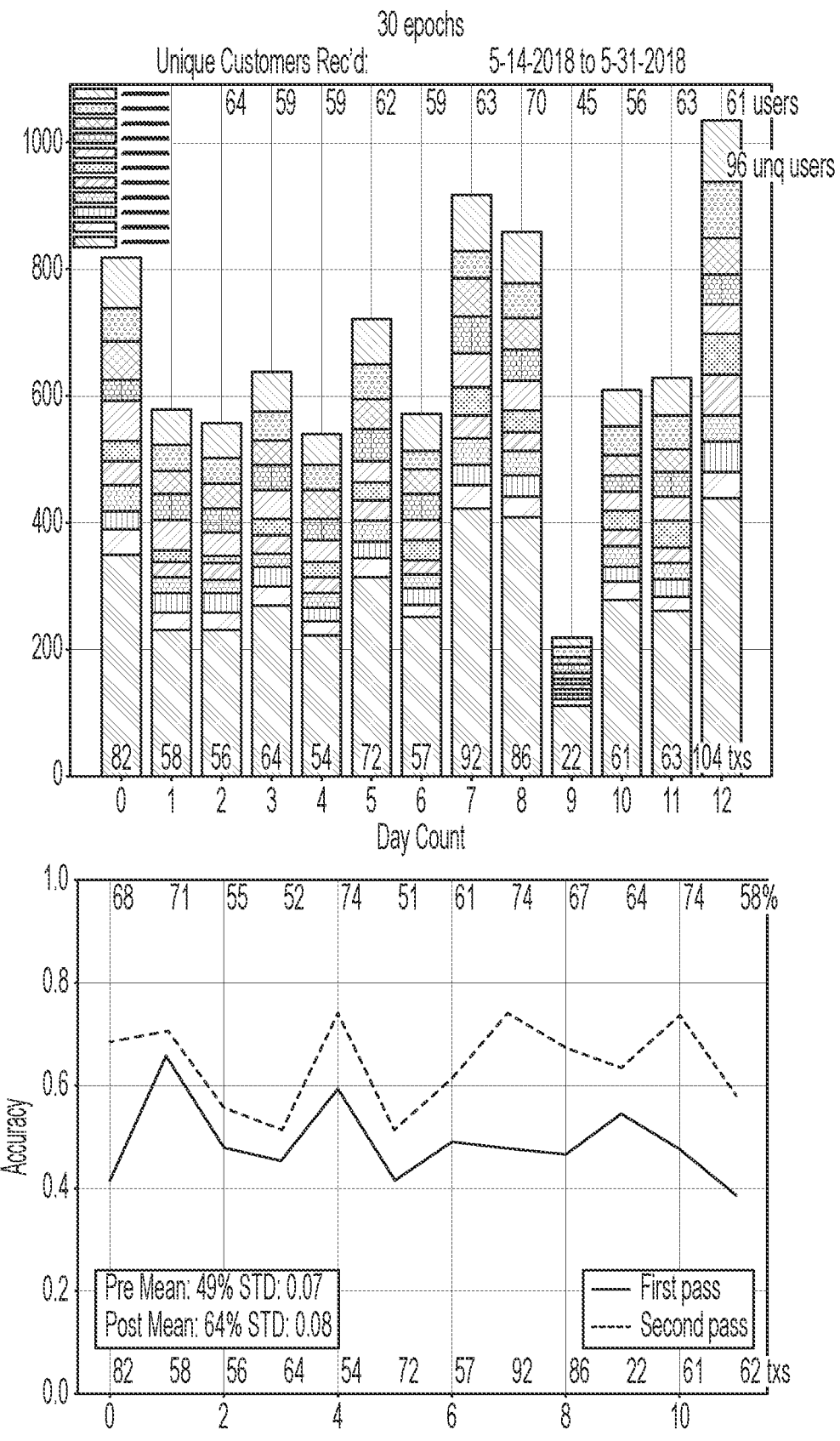
Figure 5C:
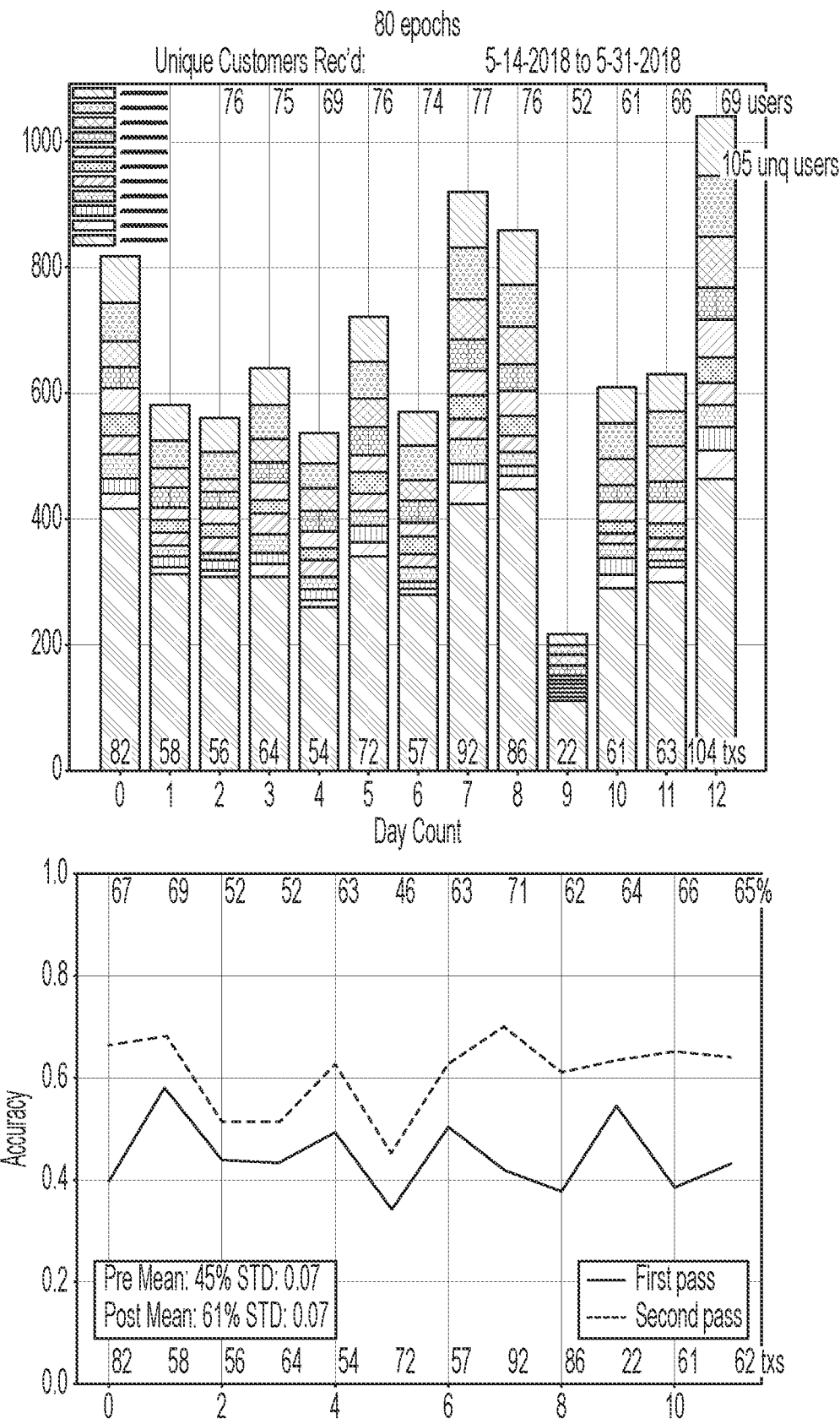

FIGS. 5A-5C shows exemplary statistics utilized for training exemplary predictive models.

FIG. 6 is a screenshot of an exemplary inventive specialized GUI of the present disclosure in a form of dashboard showing a state of the exemplary inventive liquidity cloud at a particular time.

FIG. 7 is a screenshot of an exemplary inventive specialized GUI of the present disclosure in a form of dashboard showing pre-trade intentions of a particular user (e.g., initiating user) of the exemplary inventive electronic execution-mediating platform of the present disclosure in the exemplary inventive liquidity cloud at a particular time.

Figure 8:
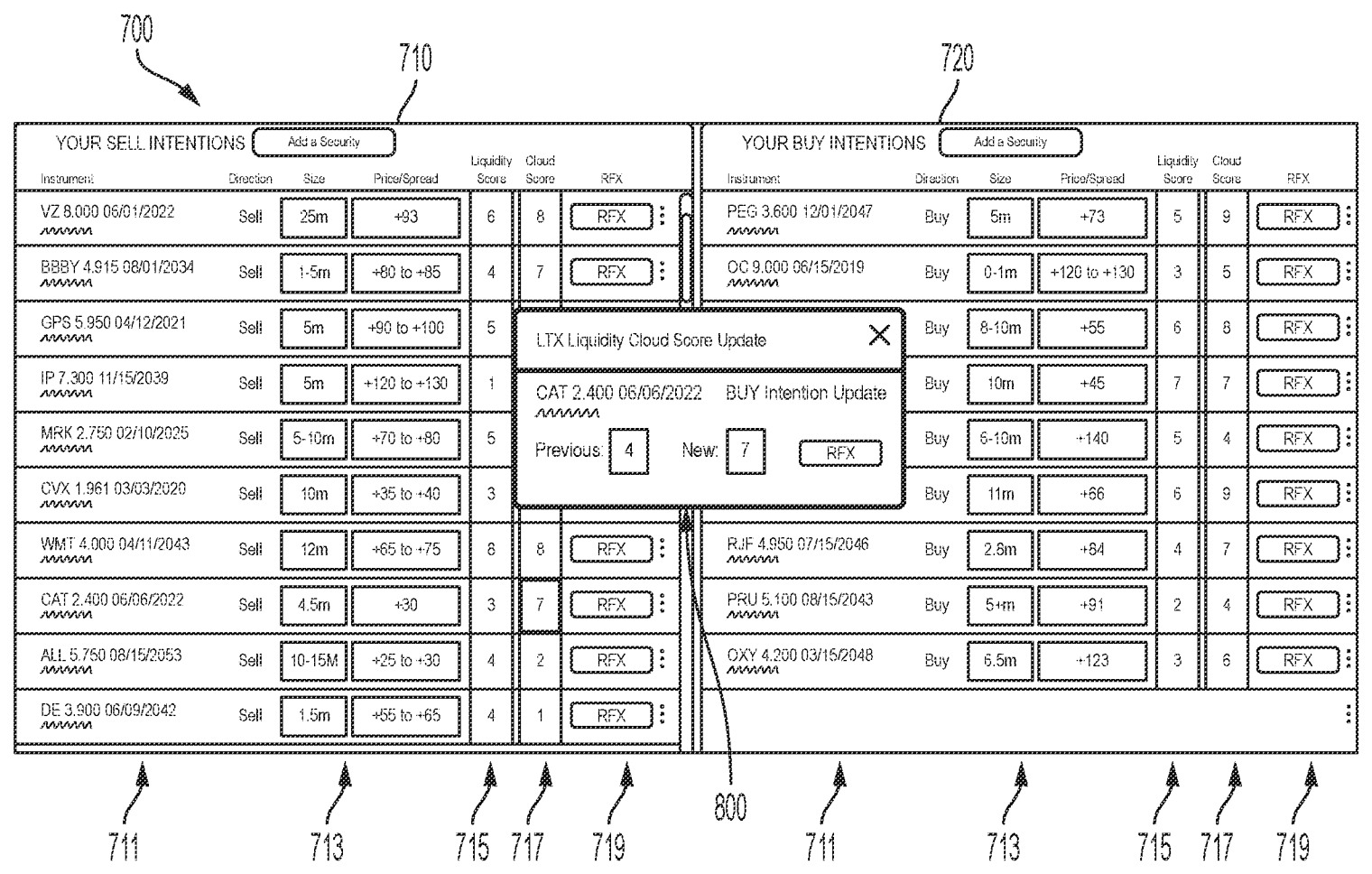

FIG. 8 is a screenshot of the exemplary inventive specialized GUI of FIG. 7 with a pop-up inventive specialized GUI showing historical data regarding a particular liquidity score.

Figure 9:
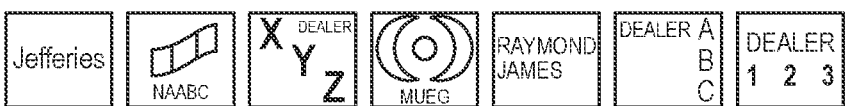
FIG. 9 is a screenshot of an exemplary inventive specialized GUI of the present disclosure that a particular initiating user can use to set-up parameters of a desired electronic communication session (e.g., target dealer(s), buy/sell indicator, corporate bond, amount, price, etc.)

FIG. 9 is a screenshot of an exemplary inventive specialized GUI of the present disclosure that a particular initiating user can use to set-up parameters of a desired electronic communication session (e.g., target dealer(s), buy/sell indicator, corporate bond, amount, price, etc.).

Figure 10:
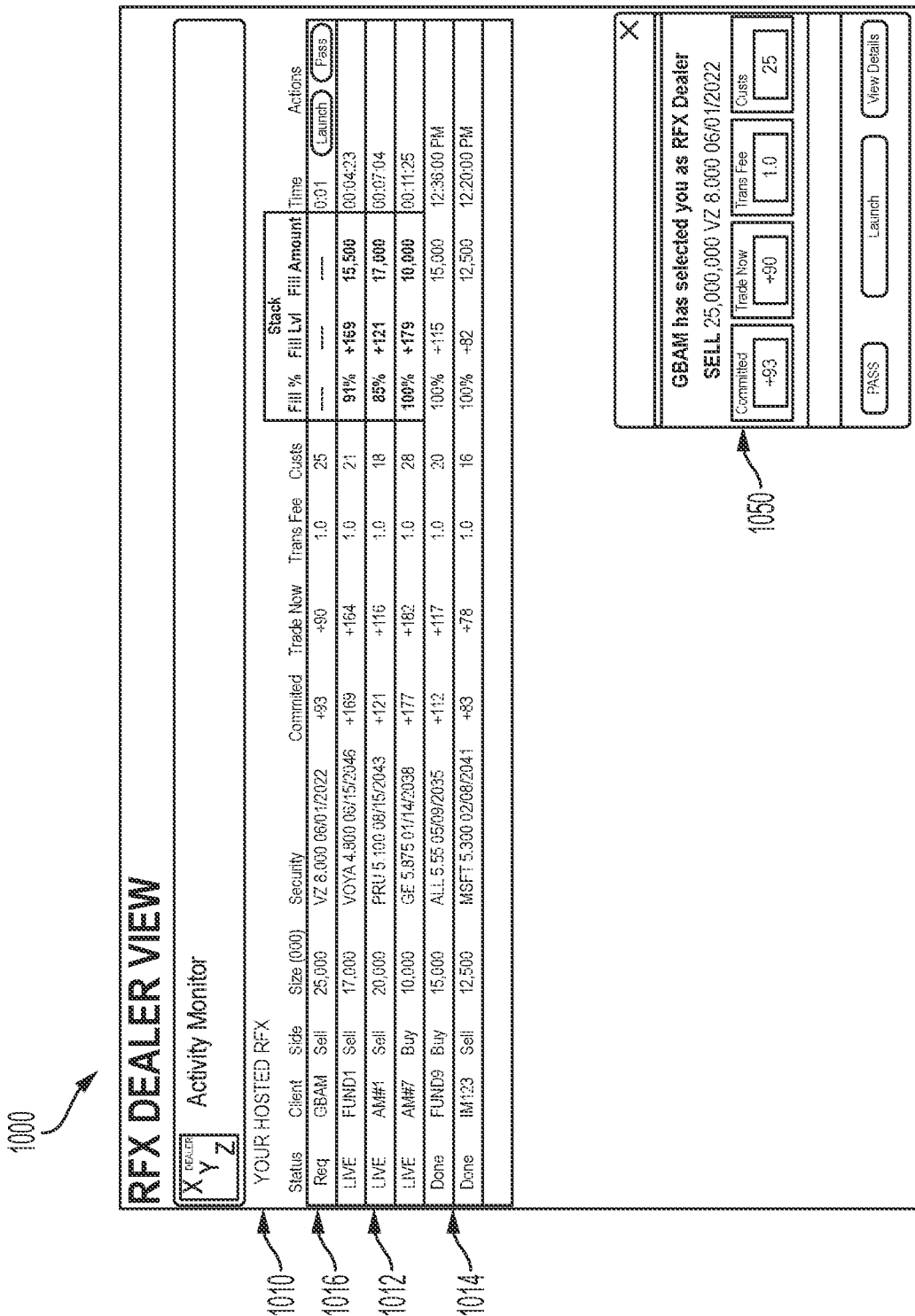
FIG. 10 is a screenshot of an exemplary inventive specialized GUI of the present disclosure that a particular dealer can use to track request to host electronic communication session(s)

FIG. 10 is a screenshot of an exemplary inventive specialized GUI of the present disclosure that a particular dealer can use to track request to host electronic communication session(s).

FIG. 11 is a screenshot of an exemplary inventive specialized GUI of the present disclosure that a particular invitee can use to make submission(s) in to a particular electronic communication session.

FIGS. 12-16 are screenshots of various states of exemplary inventive specialized stack GUIs of the present disclosure that are presented to the initiating user (Seller), the electronic communication dealer, and an invitee (Bidder) during a particular electronic communication session. As FIGS. 12-16 illustrate, for example, invitee's ability to perform certain activities and view certain information may be limited based on parameters of the electronic communication session (Locked, Open, etc.).

Figure 17:
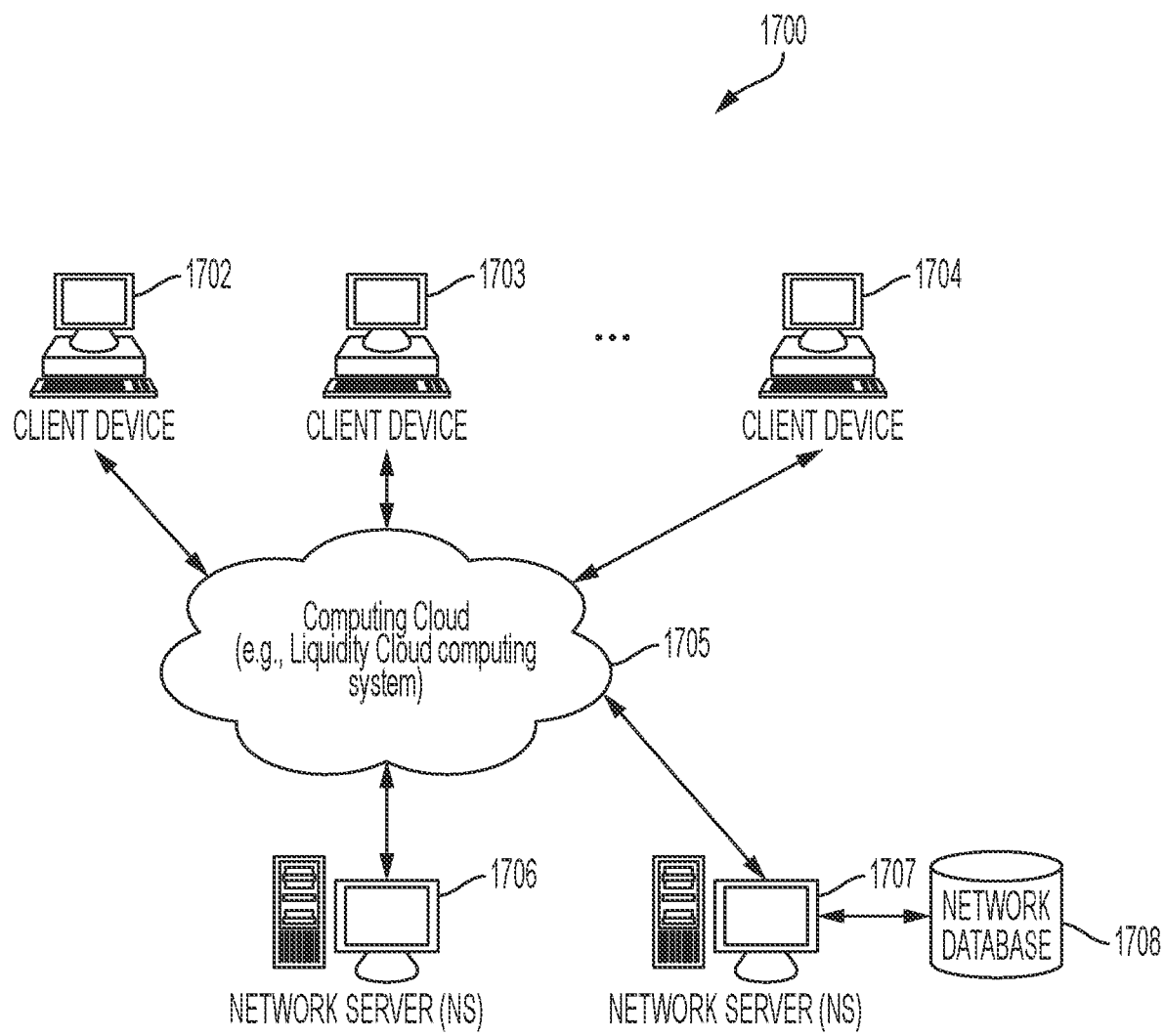

FIG. 17 illustrates one embodiment of an exemplary environment in which some embodiments of the exemplary inventive electronic execution-mediating platform of the present disclosure may operate. In some embodiments, exemplary inventive electronic execution-mediating platform of the present disclosure may host a large number of users (e.g., at least 1,000, at least 10,000; at least 100,000; at least 1,000,000) and/or is capable of conducting a large number of concurrent transactions such electronic communication sessions (e.g., at least 1,000; at least 10,000; at least 100,000; at least 1,000,000). In some embodiments, the exemplary inventive electronic execution-mediating platform of the present disclosure is based on a scalable computer and network architecture that incorporates varies strategies for assessing the data, caching, searching, and database connection pooling. An example of the scalable architecture is an architecture that is capable of operating multiple servers.

Referring to FIG. 17, another example computing environment 1700 (similar to computing environment 100 discussed above) is illustrated, in which the exemplary inventive electronic execution-mediating platform of the present disclosure may be implemented. The computing environment 1700 can include users utilizing computing devices 1702-1704 that are capable of interacting (e.g., receiving and sending electronic communications) to and from another computing devices and computing systems/architectures, such as Internet cloud 1705, servers 1706 and 1707, each other, and the like. In some embodiments, the set of such computing devices includes devices that connect using a wired communications medium such as personal computers, multiprocessor systems, microprocessor-based or programmable consumer electronics, network PCs, and the like. In some embodiments, the set of such computing devices also includes devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile device, and the like. In embodiments, each member device within member devices 1702-1704 may include a browser application that is configured to receive and to send web pages, and the like. In embodiments, the browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, JavaScript, and the like. In embodiments, the disclosure is programmed in either Java or .Net.

In some embodiments, the computing devices 1702-1704 may be further configured to receive a message from another computing device employing another mechanism, including, but not limited to email, Short Message Service (SMS), Multimedia Message Service (MMS), instant messaging (IM), internet relay chat (IRC), mIRC, Jabber, and the like.

In some embodiments, the exemplary network 1705 of the exemplary inventive electronic execution-mediating platform of the present disclosure may be configured to have a cloud computing architecture. For example, the exemplary inventive liquidity cloud architecture may have the exemplary Internet cloud architecture 1705 that may include servers 1706-1707, running and/or in electronic communication with one or more databases such as database 1708 (e.g., liquidity database).

Figure 18:
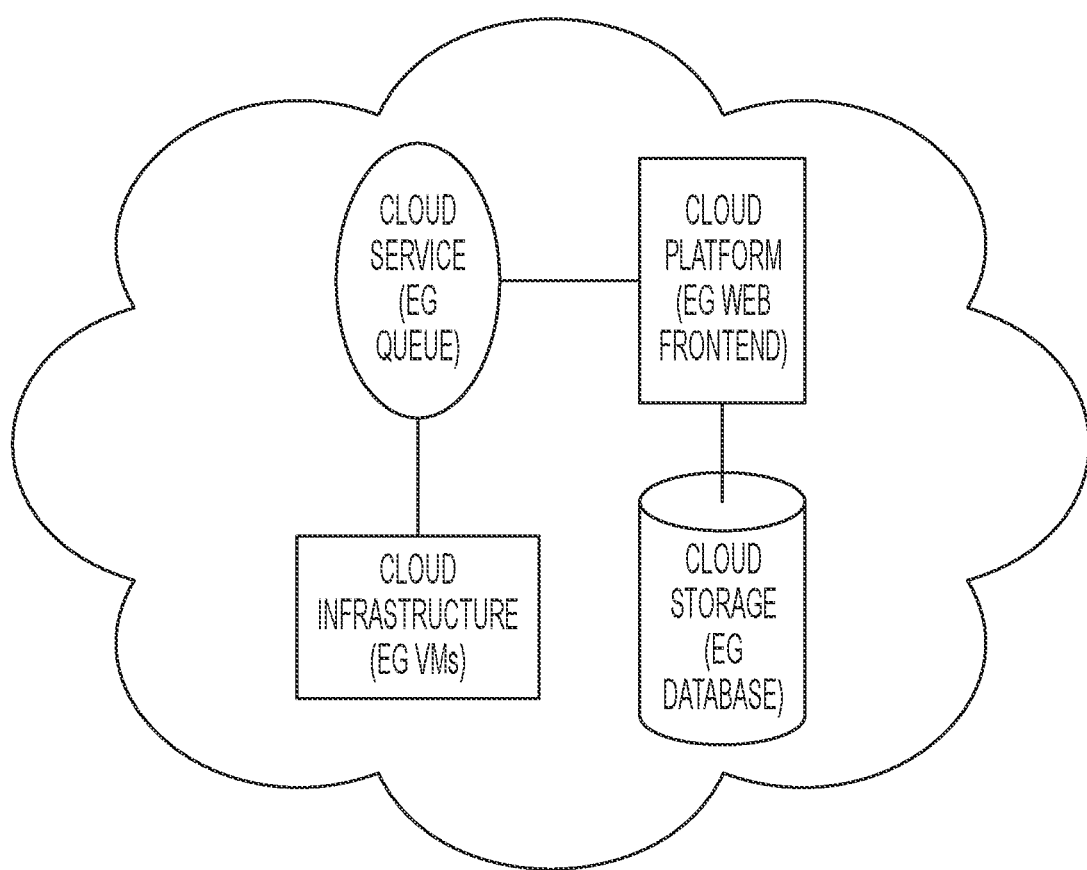
FIGS. 18 and 19 illustrate schematics of exemplary implementations of the cloud computing/architectures that the exemplary inventive electronic execution-mediating platform of the present disclosure may be configured as in accordance with at least some embodiments of the present disclosure.
Figure 19:
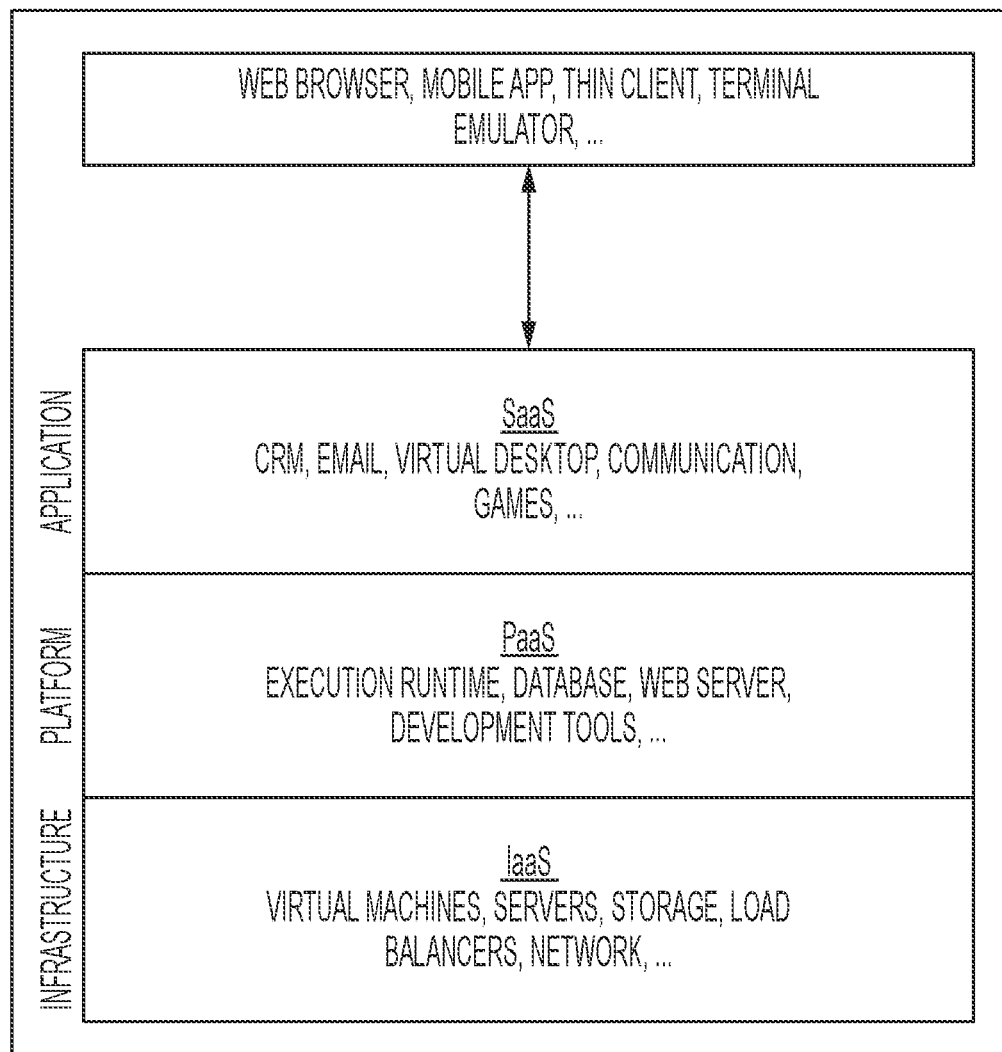

As used herein, the terms "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user). FIGS. 18 and 19 illustrate schematics of exemplary implementations of the cloud computing/architectures that the exemplary inventive electronic execution-mediating platform of the present disclosure may be configured as in accordance with at least some embodiments of the present disclosure. For example, the exemplary inventive electronic execution-mediating platform of the present disclosure may be configured as, but not limiting to: infrastructure a service (IaaS), platform as a service (PaaS), and software as a service (SaaS).

As briefly mentioned above, the electronic transaction platform of the present disclosure provides an RFX platform that provides users with a computer based market for the buying and selling of financial instruments (securities). The liquidity of financial instruments listed on the RFX platform can be increased at least in part due to the unique features of the electronic transaction platform itself. As noted above, these features include, but are not limited to, the RFX platform itself and its associated workflow, the scoring functionality for financial instruments to be traded, and the partner identification techniques that can identify the party(ies) most likely to result in a successful trade.

With particular reference to FIG. 6, an exemplary inventive specialized GUI 600 of the present disclosure is shown. The GI 600 can be presented to a user (e.g., user 120) upon the user logging into or otherwise accessing the electronic transaction platform with her/his associated computing device, e.g., computing device 104. The GUI 600 takes the form of a dashboard showing a state of the exemplary inventive liquidity cloud at a particular time and for a particular user. A Request Section 610 of the GUI 600 can display the current outstanding requests for trade of the particular user. A Response Section 612 of the GUI 600 can display the current outstanding responses of the particular user to other user's requests for trade. Finally, a Staged Order Section 630 can be provided in the GUI 600, which displays various securities and their associated potential trade parameters.

The Staged Order Section 630 can include, e.g., a Cloud Score 631, an identification of the security 633, the specificities 635 (Buy or Sell, Size/Quantity, Cost such as a spread, etc.) of a potential order, a Liquidity Score 637, and/or a Request Button 639. The Cloud Score 631 can take the form of any representation (a number, letter grade, percentage, etc.) that identifies a likelihood of a trade of the security based on based on expressed trading intentions by other users. Similarly, the Liquidity Score 637 can take the form of any representation (a number, letter grade, percentage, etc.) that identifies a likelihood of a trade of the security based on historical trading data of that security (and/or, of similar securities). In the illustrated example, the Cloud Score 631 and Liquidity Score 637 are integers between 0-9, although other representations could be used. The Request Button 639 can be a quick select button that permits the user to begin the RFX trading process for the specific security.

Now referring to FIG. 7, another exemplary inventive specialized GUI 600 of the present disclosure is shown. The GUI 700 can be presented to a user (e.g., user 120) upon the user logging into or otherwise accessing the electronic transaction platform with her/his associated computing device, e.g., computing device 104. The GUI 600 takes the form of a dashboard showing pre-trade intentions of a particular user (e.g., initiating user) of the exemplary inventive electronic execution-mediating platform of the present disclosure in the exemplary inventive liquidity cloud at a particular time. A Sell Intentions Section 710 of the GUI 700 can display the current trading intentions for sales of securities for the particular user, and a Buy Intentions Section 720 of the GUI 700 can display the current trading intentions for sales of securities for the particular user. Each of the Sell and Buy Intentions Sections 710, 720 can include e.g., an identification of the security 711, the specificities 713 (Buy or Sell, Size/Quantity, Cost such as a spread, etc.) of a potential order, a Liquidity Score 715, a Cloud Score 717, and/or a Request Button 639. As mentioned above, the Liquidity Score 715 can take the form of any representation (a number, letter grade, percentage, etc.) that identifies a likelihood of a trade of the security based on historical trading data of that security (and/or, of similar securities). The Cloud Score 717 can take the form of any representation (a number, letter grade, percentage, etc.) that identifies a likelihood of a trade of the security based on based on expressed trading intentions by other users. In the illustrated example, the Liquidity Score 715 and Cloud Score 717 are integers between 0-9, although other representations could be used. The Request Button 719 can be a quick select button that permits the user to begin the RFX trading process for the specific security.

A user can input her/his intention to trade a specific security, which is then uploaded and analysed by the Liquidity Cloud described herein. With further reference to FIG. 8, a user can also update, cancel, or otherwise modify a previously input trade intention, which will result in a notification 800, e.g., of the updated Cloud/Liquidity Score(s). The notification 800 can display to the user the change in the Cloud/Liquidity Score(s) based on the modified trade intentions. As discussed herein, the user intentions can be utilized by the electronic transaction platform of the present disclosure to determine the Liquidity Score 715 and/or Cloud Score 717 for a particular security, which can enhance the liquidity for the particular security.

With further reference to FIG. 9, another exemplary inventive specialized GUI 900 of the present disclosure is shown. The GUI 900 can be presented to a user (e.g., user 120) upon the user logging into or otherwise accessing the electronic transaction platform with her/his associated computing device, e.g., computing device 104. In some aspects, the GUI 900 can be presented to a particular user (e.g., an initiating user) upon selection of a Request Button 719 to begin an RFX trading process for a specific security. The GUI 900 permits an initiating user 120 to select the potential trade parameters (buy or sell, quantity, committed level, time, etc.) for an RFX communication session. Once the initiating user 120 has input the desired trade parameters, the user 120 can select the "Send RFX" button 910 that will begin the RFX trading process for the specific security, e.g., by sending the trade parameters to a dealer.

Now referring to FIG. 10, an example GUI 1000 of the present disclosure is shown. The GUI 1000 can be presented to a user (e.g., user 120) upon the user logging into or otherwise accessing the electronic transaction platform with her/his associated computing device, e.g., computing device 104. In some aspects, the GUI 1000 can be presented to a particular user who acts as an intermediate entity/dealer in the RFX platform. In some aspects, a matching process can be utilized to identify dealer(s) that are capable of acting as an intermediate entity for the RFX communication session. For example only, the capabilities of the potential dealers can be matched with the identity of the initiating user, the desired trade parameters, the ability to trade the security, etc. The GUI 1000 permits a dealer to view any RFX communication session(s) that the dealer is currently hosting in a dashboard 1010. The dashboard 1010 can include a listing of active RFX sessions 1012, recently completed RFX sessions 1014, and open invites to host an RFX session 1015. Furthermore, and as described herein, the GUI 1000 can include a notification 1050 of a request to host an electronic communication session (such as that corresponding to the open invite 1015), which may appear as an "alert" in a dedicated alert window.

Once a dealer has initiated an electronic communication session, the dealer can invite a plurality of other users (invitees) to participate. When a user participates in an electronic communication session, an example of a GUI 1100 (FIG. 11) can be presented to the user (e.g., user 120) upon the user logging into or otherwise accessing the electronic transaction platform with her/his associated computing device, e.g., computing device 104. The GUI 1100 permits an invitee user to input an offer to buy or sell by entering the trade parameters for the offer. The trade parameters can include, e.g., the quantity, spread, and fill type (all or none, or partial).

With reference to FIGS. 12-16, a plurality of GUIs are shown illustrating the various views with which an initiating user, an intermediate user (dealer), and an invitee user can be presented during an example electronic communication session. The GUIs can be presented to a user (e.g., user 120) upon the user logging into or otherwise accessing the electronic transaction platform with her/his associated computing device, e.g., computing device 104. In the illustrated examples, the initiating user is a seller of a corporate bond and the invitee user is bidding to purchase the corporate bond from a dealer. It should be appreciated that this merely an example and in other scenarios the initiating user can be a purchaser and the invitee(s) can be a seller of a security. For ease of description, however, the description of FIGS. 12-16 may refer to the various users as "seller user," "dealer user," and "bidder user."

Figure 12:
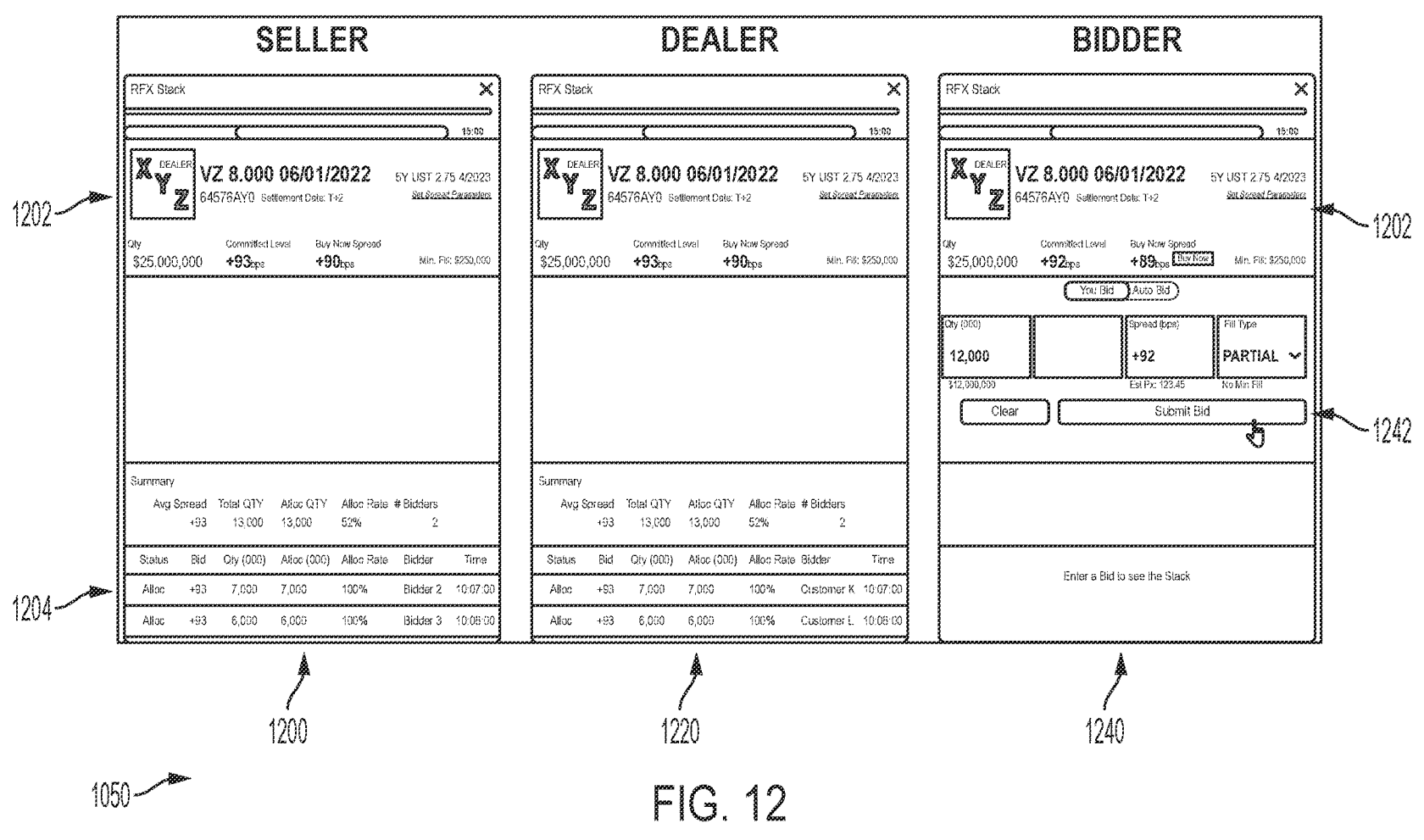

Referring now to FIG. 12, the initiating user can be presented with a GUI 1200 showing the current state of the electronic communication session. As described further herein, communications between the parties (dealers/intermediate entities, initiating users, and invitee users) will be coordinated during the electronic communication session, e.g., such that all parties may not be presented with the same information. The GUI 1200 can include a portion 1202 that identifies the trading parameters of the electronic communication session as agreed upon by the initiating user and the dealer. Furthermore, a portion 1204 can show the status of current bids in the electronic communication session. In some aspects, the GUI 1220 presented to the dealer can have the same (or similar components) as the initiating user. As shown in FIG. 12, however, the invitee user can be presented with a GUI 1240 that differs from GUIs 1200, 1220 depending on the configuration of the electronic communication session. An invitee user may be presented with a GUI 1240 that includes the portion 1202 that identifies the trading parameters of the electronic communication session as agreed upon by the initiating user and the dealer, as well as a submit bid section 1242. The submit bid section 1242 permits the invitee user to enter a specific bid in the electronic communication session.

Figure 14:
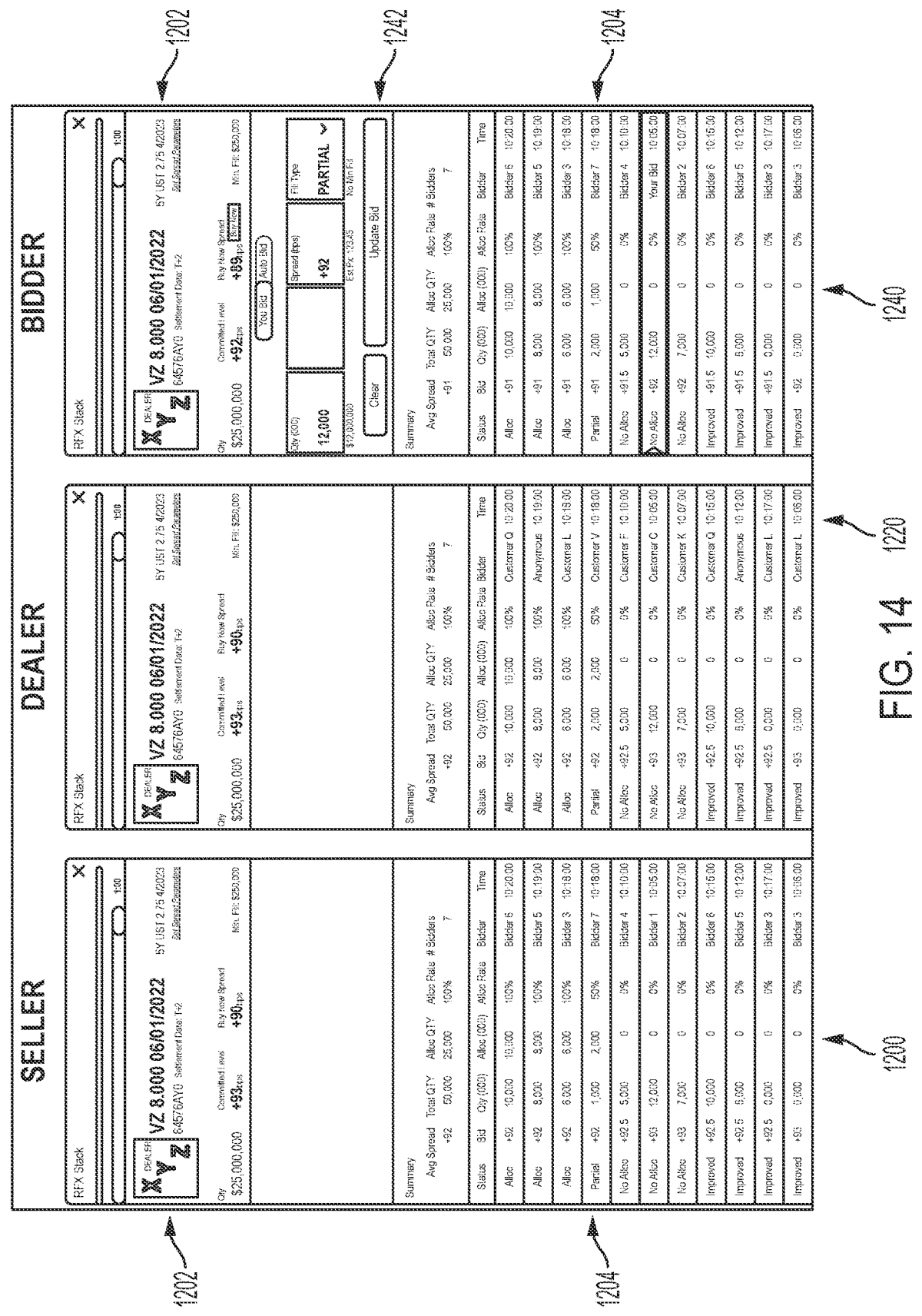

As mentioned herein, the electronic communication session may require that an invitee user meet a specific bid level in order to see the bids entered by other users. With additional reference to FIG. 13, the GUI 1240 is shown with the invitee user having access to the portion 1204 that shows the status of current bids in the electronic communication session. In the illustrated example of FIG. 13, the invitee user has submitted the best offer for the security and is in the "allocated" status of the electronic communication session. In FIG. 14, however, the invitee user has been outbid and is in the "not allocated" status. Nonetheless, in some implementations, the invitee user can still see the portion 1204 that shows the status of current bids in the electronic communication session.

Figure 15:
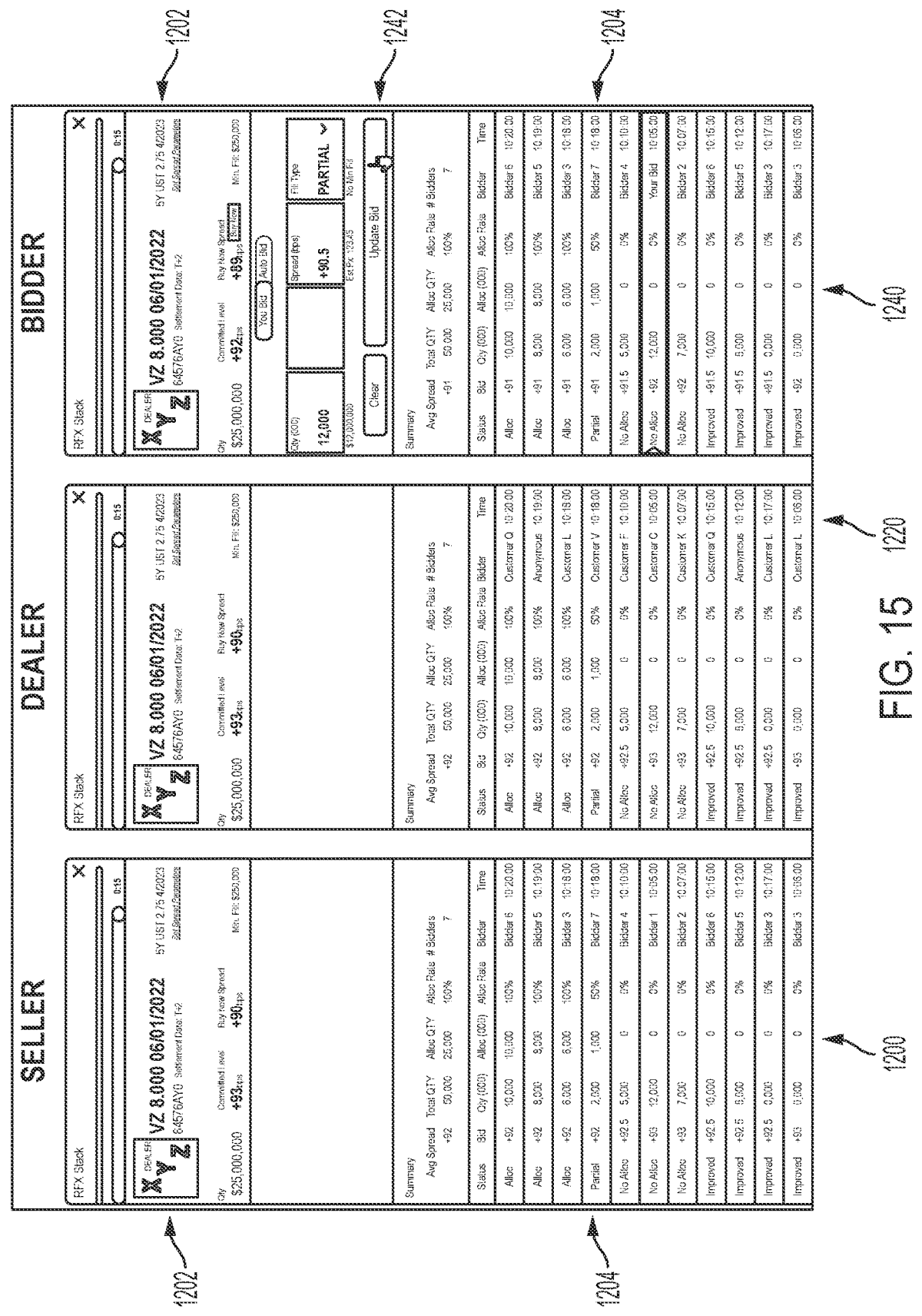
Figure 16:
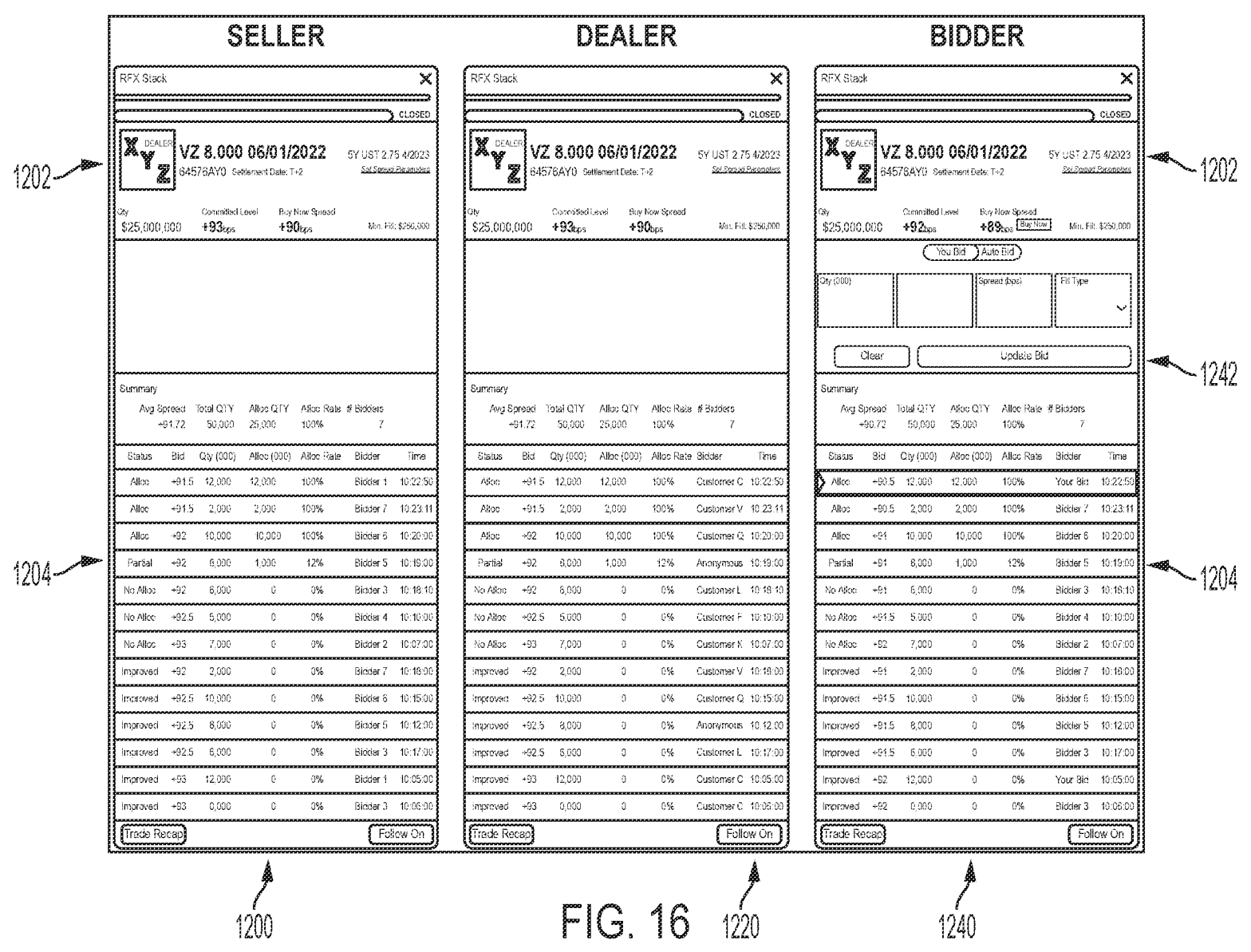

With reference to FIG. 15, the invitee user can update the previously submitted bide via the submit bid section 1242. As shown in FIG. 15, the invitee user has updated the bid from "+92" to "+90.5" in an effort to obtain the "allocated" status. Upon pressing the "Update Bid" button in the submit bid section 1242, the invitee user can update the bid to reflect the current pricing. As shown in FIG. 16, the invitee user has moved into the top position of the electronic communication session and has achieved "allocated" status. Furthermore, the electronic communication session has expired ("closed") as shown in the trading parameters portion 1202. Accordingly, the invitee user has been allocated the security at the price and in the quantity offered, thereby achieving a successful trading session.

As mentioned herein, the liquidity score (such as Liquidity Score 637/715) identifies a likelihood of a trade of the security based on historical trading data of that security and/or of similar securities. Essentially the liquidity score is a quantitative metric relating to the ability to trade a security at a reasonable price, within a reasonable amount of time, and in a given quantity. There can be various ways to calculate the liquidity score, as discussed more fully herein.

In some aspects, the liquidity score may be calculated based on the number of transactions and the volume of historical trades of securities. For example only, the liquidity score may comprise a combination of a count ratio and a volume ratio for a given security as compared to (all) other securities. In some implementations, a trace liquidity score can be determined based on the equation:

$$TLS_i = \beta_i + \eta_i$$

where $TLS_i$ the trace liquidity score for a security i; $\beta_i$ is count ratio for a security i; and $\eta_i$ is volume ratio for a security i. The count ratio $\beta_i$ can be determined based on the equation:

$$\beta_i = \frac{Count_i}{Max(Count)}$$

where $Count_i$ is the count of transactions for a security i; and $Max(Count)$ is the count of transactions for the security that had the maximum number of transactions. Similarly, the volume ratio $\eta_i$ can be determined based on the equation:

$$\eta_i = \frac{Volume_i}{Max(Volume)}$$

where $Volume_i$ is the volume transacted for a security i; and $Max(Volume)$ is the volume transacted for the security that had the maximum volume. A logarithmic transformation can be applied to the trace liquidity score in order to convert the distribution into a bell-shaped curve. Further, the trace liquidity score can be normalized, bucketed into a decile range, or otherwise converted to provide a relative score that is more easily understood.

In various alternative or additional implementations, the liquidity score can be calculated based on a specific dealer used trade the security. For example only, a security may have an increased chance of being traded by a particular dealer if that particular dealer has disproportionally traded the security compared to the global market. In order to capture the influence of a dealer that has historically traded the security more frequently than the global market, a dealer score can be calculated. The dealer score can be based on a local count ratio and local volume ratio. The local count ratio can be a measure of the number of transactions performed by a particular (local) dealer versus the total number of transactions, and the local volume ratio can be a measure of the volume transacted by a particular (local) dealer versus the total volume transacted. In some implementations, the dealer score can be determined based on the equation:

$$DS_i = \frac{\beta_{Li} + \eta_{Li}}{2}$$

where $DS_i$ the dealer score for a security i; $\beta_{Li}$ is the local count ratio for a security i; and $\eta_{Li}$ is the local volume ratio for a security i. The local count ratio $\beta_{Li}$ can be determined based on the equation:

$$\beta_{Li} = \frac{Count_{Li}}{Count_i}$$

where $Count_{Li}$ is the dealer (local) count of transactions for a security i; and $Count_i$ is the total count of transactions for the security. Similarly, the local volume ratio $\eta_{Li}$ can be determined based on the equation:

$$\eta_{Li} = \frac{Volume_{Li}}{Volume_i}$$

where Volume$_{L,i}$ is the dealer (local) volume transacted for a security i; and Volume$_i$ is the total volume transacted for the security. The dealer score can be combined with and/or used to augment the trace liquidity score to better capture a representation of the liquidity score of a security. For example only, in one aspect both the trace liquidity score and the dealer score can be calculated for a particular dealer, and the higher score will be provided to the dealer. In this manner, the general market liquidity for a security (trace liquidity score) will be presented to the dealer unless the dealer score indicates that the liquidity for trading the security by the particular dealer is greater than the general market (e.g., the dealer has been more successful than the market as a whole).

Alternatively or additionally, the liquidity score can be calculated based on the price at which a security is desired to be traded. The trace liquidity score and dealer liquidity score described above relate merely to the number and volume of completed transactions for a security. In order to capture the effect of price on the liquidity of a security, a pricing deviation score can be calculated. The pricing deviation score can be based on a reference pricing number (such as the end of day pricing for a security or real time pricing indication) for a recently completed trade, the completed trade pricing for the security, and the desired pricing of the security. In some implementations, the pricing deviation score can be determined based on the equation:

$$\Delta LS(F(P_i)) = \frac{REFP_i - IP_i}{STD_i * 0.5}$$

where $\Delta LS(F(P_i))$ is the pricing deviation score for a security i; $REFP_i$ is the reference price (end of day price or other price) for the security i; $STD_i$ is the average standard deviation of the reference price and trade price for the security i; and $IP_i$ is the input price for the security i at which the liquidity score is calculated. Similar to the dealer score, the pricing deviation score can be combined with and/or used to augment the trace liquidity score (with or without the dealer score or other augmentations) to better capture a representation of the liquidity score of a security. For example only, the pricing deviation score can be added/subtracted from the trace liquidity score or dealer score in order to determine the liquidity score for a security at a certain input price.

In further implementations, the liquidity score can be calculated/adjusted based on a specific trade party for the security. For example only, a security may have an increased chance of being traded with a particular party if that particular party has shown interest in trading the security in the past. In order to capture the influence of such previous transactions, a customer specific liquidity score can be calculated. The customer specific liquidity score can be based on historical trading data for that security and/or one or more other securities/financial instruments related to the security. In some implementations, a machine learning model can determine a customer value for each specific customer that is indicative of the probability that the specific customer will execute a trade for the security at the specified attributes. In some implementations, that customer value can be between 0 and 1. As mentioned above, in some embodiments, the customer value may be combined with any of the liquidity scores mentioned above (such as Liquidity Score 637/715) using the following formula: LSi=(LSmarket+10*(CACi/2), 10), where LSi is the customer specific liquidity score for customer i; LSmarket is the liquidity score that is being adjusted; and CACi is the customer value. As described in the example above, for bond/security X in which LSmarket=7 and CACi=0.367, LSi=7, the customer specific liquidity score LSi=(7+10*(0.367/2), 10)=8.84, which may be rounded to 9.

As mentioned herein, the cloud score (such as Cloud Score 631/717) identifies a likelihood of a trade of the security based on expressed trading intentions by other users. The cloud score is a quantitative metric relating to the ability to trade a security at a given price, in a given quantity, at a specific point in time, based on trading intentions expressed by users. Essentially, the cloud score reflects a degree of matching between an expressed trade interest of a user with contra-interest of other users (match buy with sell, sell with buy). There can be various ways to calculate the cloud score, as discussed more fully herein.

In some implementations, a matching score is determined for each of price and quantity for a security, e.g., on a 0 to 1 basis where 0 indicates no matching and 1 indicates a perfect match of the metric (price or quantity), for each particular party that has expressed a trading intention for the security. The matching score can be determined based on one or more features, such as historical information on trade volume, trade sizes, trade types, and the like, that are used as inputs to a model (e.g., a machine learning model). For example only, any combination of these features can be used as independent variable inputs into a model and compared to historical trade outcomes as a dependent variable, where the probability of a match is normalized to a value between zero and one. The matching scores for each of the price and quantity metrics can be combined to determine a combined matching score. For example only, the matching scores for each of the price and quantity metrics can be multiplied and the square root of their product can be the combined matching score. In this manner, the combined matching score can be determined for each particular party that has expressed a trading intention for the security. Further, in some aspects, the combined matching score can facilitate a ranked ordering of the parties.

Once the combined matching score is determined for each party, these combined matching scores can be aggregated, e.g., in a ranked ordering. In some implementations, the aggregation can be based on a subset of the highest combined matching scores. For example only, the subset can be based on: (i) a maximum number of parties (such as 5, 10, 15); (ii) a total volume expressed for trading for the parties (such as a multiple of the volume to be traded); or (iii) a combination thereof. In this manner, an aggregated cloud score can be determined that appropriately reflects the interest of parties in trading a security at the given price and in a specific quantity.

As one example of the above, if a party A desires to trade a quantity X of a security at a price Y, a matching score is determined for both quantity X and price Y for each particular party that has expressed a contra trading intention for the security (if party A wants to sell the security, the contra intention would be parties wanting to buy the security, and vice-versa). Once the matching scores for each contra party and each of quantity and price are determined, a combined matching score can be determined for each contra party. The combined matching scores for the contra parties can then be aggregated, e.g., based on a maximum number of contra parties and/or the quantity X. In some implementations, the maximum number of parties can be ten and the volume is limited to four times the quantity X. In this manner, a limited number of contra parties are identified from which the cloud score can be determined. Other aggregation techniques could be utilized.

In some aspects, the combined matching scores for the limited number of contra parties can be combined to determine an overall cloud score. For example only, the cloud score can be an average of the combined matching scores for the limited number of contra parties. Alternatively, the cloud score can be determined based on the equation:

$$CS_i = \text{product}(MatchScore[1:n])^{1/n}$$

where $CS_i$ is the cloud score for a security i; n is the number of contra parties as limited; and product(MatchScore[1:n]) is the product of the combined matching scores for each of the n limited parties. It should be appreciated that other techniques for combining the various scores can be utilized.

In some implementations, and with reference to FIGS. 12-16, the liquidity score, the cloud score, or the combination thereof can be utilized to rank securities/financial instruments in GUIs that are presented to an initiating user, an intermediate user (dealer), and an invitee user during an example electronic communication session. In some aspects, a ranked list of financial instruments can be generated based on the liquidity/cloud scores described herein. Furthermore, as further data is obtained which change the liquidity/cloud scores and the associated rankings for the financial instruments shown in the GUI, the computing device may rearrange the images in the GUI to re-order the displayed ranked list to reflect the updated ranking.

A measure of bond or other security similarity may also be employed in some implementations in order to assist in determining a liquidity score or similar measure of liquidity of a security. A machine learning algorithm can be utilized to model such security similarity. As mentioned above, in some embodiments, an exemplary inventive analytics module may determine a Bond Similarity. For example, the exemplary inventive analytics module may employ a K-means clustering model to establish groupings based mainly on security master attributes. For example, each bond's assigned cluster number becomes an input feature for the exemplary neural network of FIG. 3A. The description of Bond Similarity above can also be generally applicable to any type of financial instrument, including but not limited to bonds. In some implementations, the identification of financial instruments that are similar to a particular financial instrument can be based on a cluster analysis or other clustering process. For example only, the cluster analysis may utilize the characteristics of a financial instrument (described herein) to group, match, or otherwise identify similar financial instruments, e.g., those financial instruments that have characteristics that match the characteristics of the financial instrument being examined. Additional or alternative techniques for determining similar securities can also be used, as further described herein.

The determination of securities similarity can, e.g., be performed in an unsupervised manner as there may be no one specific, definitive way to measure the error between a model's predictions and its label. In some aspects, a feature space for securities can be determined to assist in the determination of security similarity. For example only, two bonds having the same issuer, rating, and industry may be more closely related than a bond from that issuer and a separate bond from an unrelated issuer. In order to determine such security similarity, a set of characteristics or features can be determined for comparison. The set of features can include any features considered to assist in determining a similarity between securities. For example only, an expected return can be utilized as one of the features to determine similarity between securities (financial instruments). The expected return of a financial instrument is a measurement of the anticipated profit or loss associated with the financial instrument and can be calculated or determined in various ways. In some aspects, the expected return for a bond as the financial instrument/security can be equal to the coupon rate, the current yield rate, the difference between the face value of the bond and the current price of the bond divided by the current price of the bond, or any combinations of these features. Furthermore, with respect to a bond as the security, the features can include one or more of the following: Bond Maturity Date, Bond Issue Date, Bond Rating, Coupon Rate, Industry, a Rule 144A Flag (indicating whether or not the bond falls under Rule 144A), whether the bond is callable or not, whether the bond is high yield or investment grade, the Issue Amount Outstanding, Coupon Type, Bond Ticker Name, Trade Datetime, Spread at Trade Time, Trade Amount, and Trade Counterparty. Various different types of machine learning algorithms for modelling security similarity can be utilized. For example only, a clustering algorithm, a nearest neighbour, a K-D Tree clustering model, a binary tree algorithm, or other form of unsupervised machine learning model for determining a similarity score or similar objects can be utilized to determine security similarity.

In some aspects, it may be beneficial to limit the number of securities that are compared to a particular security in order to determine a similar security. For example only, a security that is transacted relatively infrequently may be removed from the comparison process as such securities may not have a liquidity score that is representative for similar securities. Similarly, data related to trades by an infrequent or low volume customer may be removed, as such data may not be generally applicable and may, therefore, provide spurious results. In yet another example, data related to trades performed via specialized or not generally available trading partners or platforms may be removed. Such data may, in some cases, not be generally applicable to the market as a whole and, therefore, may not provide good candidates for determining similar securities. It should be appreciated that other forms of data filtering, as well as similarity scoring/determination can be used and still remain within the scope of the present disclosure.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

Among those benefits and improvements that have been disclosed, other objects and advantages of this present disclosure can become apparent from the following description taken in conjunction with the accompanying figures. Detailed embodiments of the present disclosure are disclosed herein; however, it is to be understood that the disclosed embodiments are merely illustrative of the present disclosure that may be embodied in various forms. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment"

and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments of the present disclosure may be readily combined, without departing from the scope or spirit of the present disclosure. Further, when a particular feature, structure, or characteristic is described in connection with an implementation, it is submitted that it is within the knowledge of one skilled in the art to affect such feature, structure, or characteristic in connection with other implementations whether or not explicitly described herein.

The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

At least some aspects of the present disclosure will now be described with reference to the following numbered clauses.

1. A method comprising:
   receiving, by at least one processor, a session request from an initiating user;
      wherein the session request comprises an electronic communication session over a cloud computing network for a transfer of a quantity of a position in at least one financial instrument from the initiating user to at least one session invitee;
   generating, by the at least one processor, a list of potential intermediate entities based at least in part on a respective dealer liquidity score associated with each potential intermediate entity of the potential intermediate entities
   receiving, by the at least one processor, a selection from the initiating user identifying a selected intermediate entity of the potential intermediate entities to mediate the electronic communication session;
   enabling, by the at least one processor, the initiating user and the selected intermediate entity to negotiate attributes of the electronic communication session;
   generating, by the at least one processor, based on the attributes of the electronic communication session, a stack software object controlling a plurality of participation levels in the electronic communication session for each selected invitee of a set of selected invitees;
      wherein the plurality of participation levels comprises:
         i) a locked stack participation level,
         ii) an unlocked stack participation level, and
         iii) an open stack participation level;
   receiving, by the at least one processor, an invitee selection from the selected intermediate entity indicating the set of selected invitees selected from a plurality of potential invitees;
   establishing, by the at least one processor, the electronic communication session, associated with an intermediary computing device of the selected intermediate entity;
      wherein the electronic communication session comprises the stack software object;
   preventing, by the at least one processor, a respective invitee computing device associated with each respective selected invitee from accessing activities in the electronic communication session unless the respective selected invitee satisfies at least one first predetermined parameter based on the locked stack participation level of the stack software object;
   enabling, by the at least one processor, an initiating computing device associated with the initiating user to access in the electronic communication setting at a reserve level while preventing each respective invitee computing device associated with each respective selected invitee from accessing the activities in the electronic communication session unless the respective selected invitee satisfies at least one second predetermined parameter based on the unlocked stack participation level of the stack software object; and
   enabling, by the at least one processor, the initiating computing device associated with the initiating user and each respective invitee computing device associated with each respective selected invitee to access the activities in the electronic communication session based on the open stack participation level of the stack software object.

2. The method of clause 1, wherein the dealer liquidity score comprises a calculated score assigned to each potential intermediate entity for the electronic communication session based at least in part on historical trading data of related financial instruments to the at least one financial instrument;

3. The method of clause 1, further comprising generating, by the at least one processor, an alert to a respective user computing associated with each respective selected invitee of the selected invitees to enable each respective selected invitee to join the electronic communication session according to the plurality of participation levels.

4. The method as recited in clause 1, wherein the dealer selection GUI further enables the selected intermediate entity to buy the at least a portion of the quantity of the position in the at least one financial instrument from the initiating user prior to the electronic communication session.

5. The method as recited in clause 1, wherein the stack software object provides options for each selected invitee of the set of selected invitees to submit respective trade parameters comprising a respective size and a respective level of a respective portion of the position in the at least one financial instrument.

6. The method as recited in clause 5, wherein the stack software object prevents each selected invitee of the set of selected invitees to submit respective trade parameters having lesser value than previously submitted trade parameters.

7. The method as recited in clause 1, wherein the stack software object is configured to anonymize each selected invitee in the electronic communication session 8. The method as recited in clause 1, wherein the electronic communication session remains active until the quantity of the position in the at least on financial instrument is fully allocated.

9. The method as recited in clause 1, wherein the plurality of potential invitees comprises potential invitees having concurrent activities below a threshold level of concurrent activity.

10. The method as recited in clause 1, further comprising:
    utilizing, by the at least one processor, a liquidity analytical model to predict a respective value indicative of a respective expected level of interest for each respective potential invitee of a plurality of potential invitees based on characteristics of the at least one financial instrument and transaction histories of each potential invitee;
       wherein each respective expected level of interest comprises a respective probability of each respective potential invitee to execute a trade of a financial instrument having common attributes to the at least one financial instrument; and ranking, by the at least one processor, the plurality of potential invitees according to each respective value indicative of the respective expected level of interest.

11. A system comprising:
at least one processor configured to:
receive a session request from an initiating user;
wherein the session request comprises an electronic communication session over a cloud computing network for a transfer of a quantity of a position in at least one financial instrument from the initiating user to at least one session invitee;
generate a list of potential intermediate entities based at least in part on a respective dealer liquidity score associated with each potential intermediate entity of the potential intermediate entities
receive a selection from the initiating user identifying a selected intermediate entity of the potential intermediate entities to mediate the electronic communication session;
enable the initiating user and the selected intermediate entity to negotiate attributes of the electronic communication session;
generate based on the attributes of the electronic communication session, a stack software object controlling a plurality of participation levels in the electronic communication session for each selected invitee of a set of selected invitees;
wherein the plurality of participation levels comprises:
i) a locked stack participation level,
ii) an unlocked stack participation level, and
iii) an open stack participation level;
receive an invitee selection from the selected intermediate entity indicating the set of selected invitees selected from a plurality of potential invitees;
establish the electronic communication session, associated with an intermediary computing device of the selected intermediate entity;
wherein the electronic communication session comprises the stack software object;
prevent a respective invitee computing device associated with each respective selected invitee from accessing activities in the electronic communication session unless the respective selected invitee satisfies at least one first predetermined parameter based on the locked stack participation level of the stack software object;
enable an initiating computing device associated with the initiating user to access in the electronic communication setting at a reserve level while preventing each respective invitee computing device associated with each respective selected invitee from accessing the activities in the electronic communication session unless the respective selected invitee satisfies at least one second predetermined parameter based on the unlocked stack participation level of the stack software object; and
enable the initiating computing device associated with the initiating user and each respective invitee computing device associated with each respective selected invitee to access the activities in the electronic communication session based on the open stack participation level of the stack software object.

12. The method of clause 11, wherein the dealer liquidity score comprises a calculated score assigned to each potential intermediate entity for the electronic communication session based at least in part on historical trading data of related financial instruments to the at least one financial instrument;

13. The system of clause 11, wherein the at least one processor is further configured to generate an alert to a respective user computing associated with each respective selected invitee of the selected invitees to enable each respective selected invitee to join the electronic communication session according to the plurality of participation levels.

14. The system as recited in clause 11, wherein the dealer selection GUI further enables the selected intermediate entity to buy the at least a portion of the quantity of the position in the at least one financial instrument from the initiating user prior to the electronic communication session.

15. The system as recited in clause 11, wherein the stack software object provides options for each selected invitee of the set of selected invitees to submit respective trade parameters comprising a respective size and a respective level of a respective portion of the position in the at least one financial instrument.

16. The system as recited in clause 15, wherein the stack software object prevents each selected invitee of the set of selected invitees to submit respective trade parameters having lesser value than previously submitted trade parameters.

17. The system as recited in clause 11, wherein the stack software object is configured to anonymize each selected invitee in the electronic communication session 18. The system as recited in clause 11, wherein the electronic communication session remains active until the quantity of the position in the at least on financial instrument is fully allocated.

19. The system as recited in clause 11, wherein the plurality of potential invitees comprises potential invitees having concurrent activities below a threshold level of concurrent activity.

20. The system as recited in clause 11, wherein the at least one processor is further configured to:
utilize a liquidity analytical model to predict a respective value indicative of a respective expected level of interest for each respective potential invitee of a plurality of potential invitees based on characteristics of the at least one financial instrument and transaction histories of each potential invitee;
wherein each respective expected level of interest comprises a respective probability of each respective potential invitee to execute a trade of a financial instrument having common attributes to the at least one financial instrument; and
rank the plurality of potential invitees according to each respective value indicative of the respective expected level of interest.

21. A computer-implemented method of hosting an electronic communication session for trading a financial instrument between an initiating user and one or more invitee users, comprising:
receiving, at a computing device having one or more processors, a request to begin the electronic communication session from an initiating user, the request identifying the financial instrument to be traded and various terms at which the initiating user is willing to trade the financial instrument;
identifying, at the computing device, one or more dealer users capable of acting as an intermediate entity for trading the financial instrument based on the request;

providing, from the computing device and to the initiating user, a list of the one or more identified dealer users;

receiving, at the computing device and from the initiating user, a selection of a particular dealer user based on the list of the one or more identified dealer users;

receiving, at the computing device and from the particular dealer user, a list of the one or more invitee users to participate in the electronic communication session;

transmitting, from the computing device and to each of the one or more invitee users, an invitation to participate in the electronic communication session;

establishing, at the computing device, the electronic communication session, wherein the electronic communication session permits each of the one or more invitee users to submit an offer to trade the financial instrument with the initiating user, each offer comprising an identification of its associated invitee user and trade parameters including a price and a quantity of the financial instrument; and selectively sharing, from the computing device, information regarding offers received during the electronic communication session with each of the initiating user, the dealer user, and the one or more invitee users, wherein the initiating user will receive the trade parameters for each received offer, the dealer user will receive the identification of the trade parameters for each received offer and its associated invitee user, and each particular invitee user will receive either: (i) the trade parameters for each received offer when the particular invitee user has submitted its own offer, or (ii) no information regarding the received offers when the particular invitee user has not yet submitted its own offer.

22. The computer-implemented method of clause 21, wherein the identifying the one or more dealer users capable of acting as the intermediate entity for trading the financial instrument comprises:

determining a liquidity score for the financial instrument based on historical trading data for one or more other financial instruments related to the financial instrument;

identifying historical dealers associated with the historical trading data.

23. The computer-implemented method of clause 22, wherein determining the liquidity score for the financial instrument is based on a machine learning model.

24. The computer-implemented method of clause 23, wherein the machine learning model determines the liquidity score based on a number of historical transactions and a volume of historical transactions for the financial instrument to be traded.

25. The computer-implemented method of clause 24, wherein the machine learning model determines the liquidity score based on a count ratio of the number of historical transactions for the financial instrument to be traded to a maximum number of historical transactions for any financial instrument observed.

26. The computer-implemented method of clause 25, wherein the machine learning model determines the liquidity score based on a volume ratio of the volume of historical transactions for the financial instrument to be traded to a maximum volume of historical transactions for any financial instrument observed.

27. The computer-implemented method of clause 26, wherein the machine learning model determines the liquidity score based on a combination of the count ratio and the volume ratio.

28. The computer-implemented method of clause 24, wherein the machine learning model determines the liquidity score based on a volume ratio of the volume of historical transactions for the financial instrument to be traded to a maximum volume of historical transactions for any financial instrument observed.

29. The computer-implemented method of clause 21, wherein the identifying the one or more dealer users capable of acting as the intermediate entity for trading the financial instrument comprises:

determining a dealer specific liquidity score for the financial instrument based on historical trading data for one or more other financial instruments related to the financial instrument;

identifying historical dealers associated with the historical trading data.

30. The computer-implemented method of clause 29, wherein determining the dealer specific liquidity score for the financial instrument is based on a machine learning model.

31. The computer-implemented method of clause 30, wherein the machine learning model determines the dealer specific liquidity score based on a number of historical transactions with a particular dealer and a volume of historical transactions for the financial instrument to be traded with the particular dealer.

32. The computer-implemented method of clause 31, wherein the machine learning model determines the dealer specific liquidity score based on a dealer specific count ratio of the number of historical transactions for the financial instrument to be traded with the particular dealer to a maximum number of historical transactions for any financial instrument observed with the particular dealer.

33. The computer-implemented method of clause 32, wherein the machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

34. The computer-implemented method of clause 33, wherein the machine learning model determines the dealer specific liquidity score based on a combination of the dealer specific count ratio and the dealer specific volume ratio.

35. The computer-implemented method of clause 31, wherein the machine learning model determines the dealer specific liquidity score based on a volume ratio of the volume of historical transactions for the financial instrument to be traded with the particular dealer to a maximum volume of historical transactions for any financial instrument observed with the particular dealer.

36. The computer-implemented method of clause 23, wherein the machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.

37. The computer-implemented method of clause 36, wherein the previous price at which the financial instrument was traded comprises an end of day price for the financial instrument.

38. The computer-implemented method of clause 37, wherein the pricing deviation score is based on the equation:

$$\Delta LS(F(P_i)) = \frac{REFP_i - IP_i}{\overline{STD_i} * 0.5}$$

where $\Delta LS(F(P_i))$ is the pricing deviation score for a financial instrument i; $REFP_i$ is the reference pricing of a recently completed trade for the financial instrument i; $\overline{STD_i}$ is an average standard deviation of the reference pricing and trade price for the financial instrument i; and $IP_i$ is the desired price for the financial instrument i.

39. The computer-implemented method of clause 21, wherein the identifying the one or more dealer users capable of acting as the intermediate entity for trading the financial instrument comprises:
determining a customer specific liquidity score for the financial instrument based on historical trading data for one or more other financial instruments related to the financial instrument;
identifying historical dealers associated with the historical trading data.

40. The computer-implemented method of clause 39, wherein determining the customer specific liquidity score for the financial instrument is based on a machine learning model.

41. The computer-implemented method of clause 40, wherein the machine learning model determines a customer value that is indicative of a probability that a specific customer will execute a trade for the security at the trade parameters, wherein the customer specific liquidity score for the financial instrument is based on the customer value.

42. The computer-implemented method of clause 41, wherein the machine learning model determines the customer specific liquidity score based on LSi=(LSmarket+ 10*(CACi/2), 10), where LSi is the customer specific liquidity score for customer i; LSmarket is a liquidity score for the financial instrument irrespective of customer; and CACi is the customer value.

43. The computer-implemented method of clause 21, wherein the identifying the one or more dealer users capable of acting as the intermediate entity for trading the financial instrument comprises:
determining a cloud score for the financial instrument based on trading intentions of the one or more invitee users and the various terms, wherein the cloud score is representative of a likelihood that the financial instrument will be traded at the various terms;
identifying at least one high likelihood invitee user of the one or more invitee users based on the cloud score, wherein the at least one high likelihood invitee user has expressed trading intentions compatible with successfully trading the financial instrument with the initiating user at the various terms; and
identifying the one or more dealer users having a previous trading relationship with the at least one high likelihood invitee user.

44. The computer-implemented method of clause 43, wherein determining the cloud score for the financial instrument is based on a machine learning model.

45. The computer-implemented method of clause 44, wherein the machine learning model determines the cloud score based on a degree of matching between the trading intentions of the one or more invitee users and the various terms.

46. The computer-implemented method of clause 45, wherein the degree of matching is based on a price matching score and a quantity matching score.

47. The computer-implemented method of clause 46, wherein the price matching score corresponds to a price degree of matching between a trading price of the trading intentions of the one or more invitee users and a desired price of the various terms.

48. The computer-implemented method of clause 47, wherein the quantity matching score corresponds to a quantity degree of matching between a trading quantity of the trading intentions of the one or more invitee users and a desired quantity of the various terms.

49. The computer-implemented method of clause 46, wherein the quantity matching score corresponds to a quantity degree of matching between a trading quantity of the trading intentions of the one or more invitee users and a desired quantity of the various terms.

50. The computer-implemented method of clause 45, wherein the degree of matching is expressed as a number between 0 and 1.

51. The computer-implemented method of clause 21, further comprising:
determining, at the computing device, a cloud score for the financial instrument based on trading intentions of a group of potential invitee users and the various terms, wherein the cloud score is representative of a likelihood that the financial instrument will be traded at the various terms;
ranking, at the computing device, the group of potential invitee users into a ranked list based on the cloud score to identify one or more high likelihood potential invitee users that have expressed trading intentions compatible with successfully trading the financial instrument with the initiating user at the various terms; and
providing, from the computing device and to the particular dealer user, the ranked list,
wherein the particular dealer user selects the list of the one or more invitee users to participate in the electronic communication session from the ranked list.

52. The computer-implemented method of clause 51, wherein the ranked list is limited to a predetermined number of potential invitee users.

53. The computer-implemented method of clause 51, wherein determining the cloud score for the financial instrument is based on a machine learning model.

54. The computer-implemented method of clause 53, wherein the machine learning model determines the cloud score based on a degree of matching between the trading intentions of the one or more invitee users and the various terms.

55. The computer-implemented method of clause 54, wherein the degree of matching is based on a price matching score and a quantity matching score.

56. The computer-implemented method of clause 55, wherein the price matching score corresponds to a price degree of matching between a trading price of the trading intentions of the one or more invitee users and a desired price of the various terms.

57. The computer-implemented method of clause 56, wherein the quantity matching score corresponds to a quantity degree of matching between a trading quantity of the trading intentions of the one or more invitee users and a desired quantity of the various terms.

58. The computer-implemented method of clause 55, wherein the quantity matching score corresponds to a quantity degree of matching between a trading quantity of the trading intentions of the one or more invitee users and a desired quantity of the various terms.

59. The computer-implemented method of clause 54, wherein the degree of matching is expressed as a number between 0 and 1.

60. A computing device for hosting an electronic communication session for trading a financial instrument between an initiating user and one or more invitee users, the computing device comprising:
one or more processors; and
a non-transitory computer-readable storage medium having a plurality of instructions stored thereon, which, when executed by the one or more processors, cause the one or more processors to perform operations comprising:
receiving a request to begin the electronic communication session from an initiating user, the request identifying the financial instrument to be traded and various terms at which the initiating user is willing to trade the financial instrument;
identifying one or more dealer users capable of acting as an intermediate entity for trading the financial instrument based on the request;
providing, to the initiating user, a list of the one or more identified dealer users;
receiving, from the initiating user, a selection of a particular dealer user based on the list of the one or more identified dealer users;
receiving, from the particular dealer user, a list of the one or more invitee users to participate in the electronic communication session;
transmitting, to each of the one or more invitee users, an invitation to participate in the electronic communication session;
establishing the electronic communication session, wherein the electronic communication session permits each of the one or more invitee users to submit an offer to trade the financial instrument with the initiating user, each offer comprising an identification of its associated invitee user and trade parameters including a price and a quantity of the financial instrument; and
selectively sharing information regarding offers received during the electronic communication session with each of the initiating user, the dealer user, and the one or more invitee users, wherein the initiating user will receive the trade parameters for each received offer, the dealer user will receive the identification of the trade parameters for each received offer and its associated invitee user, and each particular invitee user will receive either: (i) the trade parameters for each received offer when the particular invitee user has submitted its own offer, or (ii) no information regarding the received offers when the particular invitee user has not yet submitted its own offer.

61. The computing device of clause 60, wherein the identifying the one or more dealer users capable of acting as the intermediate entity for trading the financial instrument comprises:
determining a liquidity score for the financial instrument based on historical trading data for one or more other financial instruments related to the financial instrument;
identifying historical dealers associated with the historical trading data.

62. The computing device of clause 61, wherein determining the liquidity score for the financial instrument is based on a machine learning model.

63. The computing device of clause 62, wherein the machine learning model determines the liquidity score based on a number of historical transactions and a volume of historical transactions for the financial instrument to be traded.

64. The computing device of clause 63, wherein the machine learning model determines the liquidity score based on a count ratio of the number of historical transactions for the financial instrument to be traded to a maximum number of historical transactions for any financial instrument observed.

65. The computing device of clause 64, wherein the machine learning model determines the liquidity score based on a volume ratio of the volume of historical transactions for the financial instrument to be traded to a maximum volume of historical transactions for any financial instrument observed.

66. The computing device of clause 65, wherein the machine learning model determines the liquidity score based on a combination of the count ratio and the volume ratio.

67. The computing device of clause 63, wherein the machine learning model determines the liquidity score based on a volume ratio of the volume of historical transactions for the financial instrument to be traded to a maximum volume of historical transactions for any financial instrument observed.

68. The computing device of clause 60, wherein the identifying the one or more dealer users capable of acting as the intermediate entity for trading the financial instrument comprises:
determining a dealer specific liquidity score for the financial instrument based on historical trading data for one or more other financial instruments related to the financial instrument;
identifying historical dealers associated with the historical trading data.

69. The computing device of clause 68, wherein determining the dealer specific liquidity score for the financial instrument is based on a machine learning model.

70. The computing device of clause 69, wherein the machine learning model determines the dealer specific liquidity score based on a number of historical transactions with a particular dealer and a volume of historical transactions for the financial instrument to be traded with the particular dealer.

71. The computing device of clause 70, wherein the machine learning model determines the dealer specific liquidity score based on a dealer specific count ratio of the number of historical transactions for the financial instrument to be traded with the particular dealer to a maximum number of historical transactions for any financial instrument observed with the particular dealer.

72. The computing device of clause 71, wherein the machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

73. The computing device of clause 72, wherein the machine learning model determines the dealer specific liquidity score based on a combination of the dealer specific count ratio and the dealer specific volume ratio.

74. The computing device of clause 70, wherein the machine learning model determines the dealer specific liquidity score based on a volume ratio of the volume of historical transactions for the financial instrument to be traded with the particular dealer to a maximum volume of historical transactions for any financial instrument observed with the particular dealer.
75. The computing device of clause 62, wherein the machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.
76. The computing device of clause 75, wherein the previous price at which the financial instrument was traded comprises an end of day price for the financial instrument.
77. The computing device of clause 76, wherein the pricing deviation score is based on the equation:

$$\Delta LS(F(P_i)) = \frac{REFP_i - IP_i}{\overline{STD_i} * 0.5}$$

where $\Delta LS(F(P_i))$ is the pricing deviation score for a financial instrument i; $REFP_i$ is the reference pricing of a recently completed trade for the financial instrument i; $STD_i$ is an average standard deviation of the reference pricing and trade price for the financial instrument i; and $IP_i$ is the desired price for the financial instrument i.
78. The computing device of clause 60, wherein the identifying the one or more dealer users capable of acting as the intermediate entity for trading the financial instrument comprises:
  determining a customer specific liquidity score for the financial instrument based on historical trading data for one or more other financial instruments related to the financial instrument;
  identifying historical dealers associated with the historical trading data.
79. The computing device of clause 78, wherein determining the customer specific liquidity score for the financial instrument is based on a machine learning model.
80. The computing device of clause 79, wherein the machine learning model determines a customer value that is indicative of a probability that a specific customer will execute a trade for the security at the trade parameters, wherein the customer specific liquidity score for the financial instrument is based on the customer value.
81. The computing device of clause 80, wherein the machine learning model determines the customer specific liquidity score based on LSi=(LSmarket+10*(CACi/2), 10), where LSi is the customer specific liquidity score for customer i; LSmarket is a liquidity score for the financial instrument irrespective of customer; and CACi is the customer value.
82. The computing device of clause 60, wherein the identifying the one or more dealer users capable of acting as the intermediate entity for trading the financial instrument comprises:
  determining a cloud score for the financial instrument based on trading intentions of the one or more invitee users and the various terms, wherein the cloud score is representative of a likelihood that the financial instrument will be traded at the various terms;
  identifying at least one high likelihood invitee user of the one or more invitee users based on the cloud score, wherein the at least one high likelihood invitee user has expressed trading intentions compatible with successfully trading the financial instrument with the initiating user at the various terms; and
  identifying the one or more dealer users having a previous trading relationship with the at least one high likelihood invitee user.
83. The computing device of clause 82, wherein determining the cloud score for the financial instrument is based on a machine learning model.
84. The computing device of clause 83, wherein the machine learning model determines the cloud score based on a degree of matching between the trading intentions of the one or more invitee users and the various terms.
85. The computing device of clause 84, wherein the degree of matching is based on a price matching score and a quantity matching score.
86. The computing device of clause 85, wherein the price matching score corresponds to a price degree of matching between a trading price of the trading intentions of the one or more invitee users and a desired price of the various terms.
87. The computing device of clause 86, wherein the quantity matching score corresponds to a quantity degree of matching between a trading quantity of the trading intentions of the one or more invitee users and a desired quantity of the various terms.
88. The computing device of clause 85, wherein the quantity matching score corresponds to a quantity degree of matching between a trading quantity of the trading intentions of the one or more invitee users and a desired quantity of the various terms.
89. The computing device of clause 84, wherein the degree of matching is expressed as a number between 0 and 1.
90. The computing device of clause 60, wherein the operations further comprise:
  determining a cloud score for the financial instrument based on trading intentions of a group of potential invitee users and the various terms, wherein the cloud score is representative of a likelihood that the financial instrument will be traded at the various terms;
  ranking the group of potential invitee users into a ranked list based on the cloud score to identify one or more high likelihood potential invitee users that have expressed trading intentions compatible with successfully trading the financial instrument with the initiating user at the various terms; and
  providing, to the particular dealer user, the ranked list, wherein the particular dealer user selects the list of the one or more invitee users to participate in the electronic communication session from the ranked list.
91. The computing device of clause 90, wherein the ranked list is limited to a predetermined number of potential invitee users.
92. The computing device of clause 90, wherein determining the cloud score for the financial instrument is based on a machine learning model.
93. The computing device of clause 92, wherein the machine learning model determines the cloud score based on a degree of matching between the trading intentions of the one or more invitee users and the various terms.

94. The computing device of clause 93, wherein the degree of matching is based on a price matching score and a quantity matching score.
95. The computing device of clause 94, wherein the price matching score corresponds to a price degree of matching between a trading price of the trading intentions of the one or more invitee users and a desired price of the various terms.
96. The computing device of clause 95, wherein the quantity matching score corresponds to a quantity degree of matching between a trading quantity of the trading intentions of the one or more invitee users and a desired quantity of the various terms.
97. The computing device of clause 94, wherein the quantity matching score corresponds to a quantity degree of matching between a trading quantity of the trading intentions of the one or more invitee users and a desired quantity of the various terms.
98. The computing device of clause 93, wherein the degree of matching is expressed as a number between 0 and 1.
99. A computer-implemented method of determining a likelihood of successfully trading a particular financial instrument between an initiating user and one or more invitee users and at various terms during an electronic communication session, comprising:
receiving, at a computing device having one or more processors, historical trading data associated with previously executed trade transactions for a plurality of financial instruments, wherein each of the plurality of financial instruments has associated characteristics, the associated characteristics including at least an expected return, and the trade transactions identify at least a price and quantity traded;
storing, at the computing device, the historical trading data;
identifying, at the computing device, one or more of the plurality of financial instruments having associated characteristics similar to the particular financial instrument; and
determining, at the computing device and using a first machine learning model, a liquidity score for the particular financial instrument based on the historical trading data for the one or more of the plurality of financial instruments having associated characteristics similar to the particular financial instrument, the liquidity score being representative of a likelihood of successfully trading the particular financial instrument at the various terms.
100. The computer-implemented method of clause 99, wherein the first machine learning model determines the liquidity score based on a number of historical transactions and a volume of historical transactions for the financial instrument to be traded.
101. The computer-implemented method of clause 100, wherein the first machine learning model determines the liquidity score based on a count ratio of the number of historical transactions for the financial instrument to be traded to a maximum number of historical transactions for any financial instrument observed.
102. The computer-implemented method of clause 101, wherein the machine learning model determines the liquidity score based on a volume ratio of the volume of historical transactions for the financial instrument to be traded to a maximum volume of historical transactions for any financial instrument observed.
103. The computer-implemented method of clause 102, wherein the machine learning model determines the liquidity score based on a combination of the count ratio and the volume ratio.
104. The computer-implemented method of clause 100, wherein the machine learning model determines the liquidity score based on a volume ratio of the volume of historical transactions for the financial instrument to be traded to a maximum volume of historical transactions for any financial instrument observed.
105. The computer-implemented method of clause 99, wherein the liquidity score is based on a dealer specific liquidity score.
106. The computer-implemented method of clause 105, wherein the first machine learning model determines the dealer specific liquidity score based on a number of historical transactions with a particular dealer and a volume of historical transactions for the financial instrument to be traded with the particular dealer.
107. The computer-implemented method of clause 106, wherein the first machine learning model determines the dealer specific liquidity score based on a dealer specific count ratio of the number of historical transactions for the financial instrument to be traded with the particular dealer to a maximum number of historical transactions for any financial instrument observed with the particular dealer.
108. The computer-implemented method of clause 107, wherein the first machine learning model determines the dealer specific liquidity score based on a dealer specific volume ratio of the volume of historical transactions for the financial instrument to be traded with the particular dealer to a maximum volume of historical transactions for any financial instrument observed with the particular dealer.
109. The computer-implemented method of clause 108, wherein the first machine learning model determines the dealer specific liquidity score based on a combination of the dealer specific count ratio and the dealer specific volume ratio.
110. The computer-implemented method of clause 106, wherein the first machine learning model determines the dealer specific liquidity score based on a volume ratio of the volume of historical transactions for the financial instrument to be traded with the particular dealer to a maximum volume of historical transactions for any financial instrument observed with the particular dealer.
111. The computer-implemented method of clause 99, wherein the first machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.
112. The computer-implemented method of clause 111, wherein the previous price at which the financial instrument was traded comprises an end of day price for the financial instrument.
113. The computer-implemented method of clause 112, wherein the pricing deviation score is based on the equation:

$$\Delta LS(F(P_i)) = \frac{REFP_i - IP_i}{STD_i * 0.5}$$

where $\Delta LS(F(P_i))$ is the pricing deviation score for a financial instrument i; $REFP_i$ is the reference pricing of a recently completed trade for the financial instrument i; $STD_i$, is an average standard deviation of the reference pricing and trade price for the financial instrument i; and $IP_i$ is the desired price for the financial instrument i.

114. The computer-implemented method of clause 99, wherein the liquidity score is based on a customer specific liquidity score.

115. The computer-implemented method of clause 114, wherein the first machine learning model determines a customer value that is indicative of a probability that a specific customer will execute a trade for the security at the trade parameters, wherein the customer specific liquidity score for the financial instrument is based on the customer value.

116. The computer-implemented method of clause 115, wherein the machine learning model determines the customer specific liquidity score based on LSi=(LSmarket+ 10*(CACi/2), 10), where LSi is the customer specific liquidity score for customer i; LSmarket is a liquidity score for the financial instrument irrespective of customer; and CACi is the customer value.

117. The computer-implemented method of clause 99, further comprising:
 receiving, at the computing device, trading intentions from the one or more invitee users, each trading intention representing a price and a quantity at which its associated invitee user would trade an associated financial instrument, each associated financial instrument having associated characteristics, the associated characteristics including at least an expected return;
 storing, at the computing device, the trading intentions;
 identifying, at the computing device, one or more associated financial instruments similar to the particular financial instrument; and
 determining, at the computing device and using a second machine learning model, a cloud score for the particular financial instrument based on the trading intentions for the one or more associated financial instrument similar to the particular financial instrument, the cloud score being representative of a likelihood of successfully trading the particular financial instrument at the various terms.

118. The computer-implemented method of clause 117, wherein the second machine learning model determines the cloud score based on a degree of matching between the trading intentions of the one or more invitee users and the various terms.

119. The computer-implemented method of clause 118, wherein the degree of matching is based on a price matching score and a quantity matching score.

120. The computer-implemented method of clause 119, wherein the price matching score corresponds to a price degree of matching between a trading price of the trading intentions of the one or more invitee users and a desired price of the various terms.

121. The computer-implemented method of clause 120, wherein the quantity matching score corresponds to a quantity degree of matching between a trading quantity of the trading intentions of the one or more invitee users and a desired quantity of the various terms.

122. The computer-implemented method of clause 119, wherein the quantity matching score corresponds to a quantity degree of matching between a trading quantity of the trading intentions of the one or more invitee users and a desired quantity of the various terms.

123. The computer-implemented method of clause 118, wherein the degree of matching is expressed as a number between 0 and 1.

124. The computer-implemented method of clause 117, further comprising outputting, from the computing device and to an initiating user computing device associated with the initiating user, the liquidity score and the cloud score in a graphical user interface.

125. The computer-implemented method of clause 124, wherein outputting the liquidity score and the cloud score in the graphical user interface comprises outputting a single score representing a combination of the liquidity score and the cloud score.

126. A computing device for determining a likelihood of successfully trading a particular financial instrument between an initiating user and one or more invitee users and at various terms during an electronic communication session, comprising:
 one or more processors; and
 a non-transitory computer-readable storage medium having a plurality of instructions stored thereon, which, when executed by the one or more processors, cause the one or more processors to perform operations comprising:
 receiving historical trading data associated with previously executed trade transactions for a plurality of financial instruments, wherein each of the plurality of financial instruments has associated characteristics, the associated characteristics including at least an expected return, and the trade transactions identify at least a price and quantity traded;
 storing the historical trading data;
 identifying one or more of the plurality of financial instruments having associated characteristics similar to the particular financial instrument; and
 determining, using a first machine learning model, a liquidity score for the particular financial instrument based on the historical trading data for the one or more of the plurality of financial instruments having associated characteristics similar to the particular financial instrument, the liquidity score being representative of a likelihood of successfully trading the particular financial instrument at the various terms.

127. The computing device of clause 126, wherein the first machine learning model determines the liquidity score based on a number of historical transactions and a volume of historical transactions for the financial instrument to be traded.

128. The computing device of clause 127, wherein the first machine learning model determines the liquidity score based on a count ratio of the number of historical transactions for the financial instrument to be traded to a maximum number of historical transactions for any financial instrument observed.

129. The computing device of clause 128, wherein the machine learning model determines the liquidity score based on a volume ratio of the volume of historical transactions for the financial instrument to be traded to a maximum volume of historical transactions for any financial instrument observed.

130. The computing device of clause 129, wherein the machine learning model determines the liquidity score based on a combination of the count ratio and the volume ratio.

131. The computing device of clause 127, wherein the machine learning model determines the liquidity score based on a volume ratio of the volume of historical transactions for the financial instrument to be traded to a maximum volume of historical transactions for any financial instrument observed.

132. The computing device of clause 125, wherein the liquidity score is based on a dealer specific liquidity score.

133. The computing device of clause 132, wherein the first machine learning model determines the dealer specific liquidity score based on a number of historical transactions with a particular dealer and a volume of historical transactions for the financial instrument to be traded with the particular dealer.

134. The computing device of clause 133, wherein the first machine learning model determines the dealer specific liquidity score based on a dealer specific count ratio of the number of historical transactions for the financial instrument to be traded with the particular dealer to a maximum number of historical transactions for any financial instrument observed with the particular dealer.

135. The computing device of clause 134, wherein the first machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

136. The computing device of clause 135, wherein the first machine learning model determines the dealer specific liquidity score based on a combination of the dealer specific count ratio and the dealer specific volume ratio.

137. The computing device of clause 133, wherein the first machine learning model determines the dealer specific liquidity score based on a volume ratio of the volume of historical transactions for the financial instrument to be traded with the particular dealer to a maximum volume of historical transactions for any financial instrument observed with the particular dealer.

138. The computing device of clause 126, wherein the first machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.

139. The computing device of clause 138, wherein the previous price at which the financial instrument was traded comprises an end of day price for the financial instrument.

140. The computing device of clause 139, wherein the pricing deviation score is based on the equation:

$$\Delta LS(F(P_i)) = \frac{REFP_i - IP_i}{\overline{STD_i} * 0.5}$$

where $\Delta LS(F(P_i))$ is the pricing deviation score for a financial instrument i; $REFP_i$ is the reference pricing of a recently completed trade for the financial instrument i; $STD_i$ is an average standard deviation of the reference pricing and trade price for the financial instrument i; and $IP_i$ is the desired price for the financial instrument i.

141. The computing device of clause 126, wherein the liquidity score is based on a customer specific liquidity score.

142. The computing device of clause 141, wherein the first machine learning model determines a customer value that is indicative of a probability that a specific customer will execute a trade for the security at the trade parameters, wherein the customer specific liquidity score for the financial instrument is based on the customer value.

143. The computing device of clause 142, wherein the machine learning model determines the customer specific liquidity score based on LSi=(LSmarket+10*(CACi/2), 10), where LSi is the customer specific liquidity score for customer i; LSmarket is a liquidity score for the financial instrument irrespective of customer; and CACi is the customer value.

144. The computing device of clause 126, further comprising:
receiving, at the computing device, trading intentions from the one or more invitee users, each trading intention representing a price and a quantity at which its associated invitee user would trade an associated financial instrument, each associated financial instrument having associated characteristics, the associated characteristics including at least an expected return;
storing, at the computing device, the trading intentions;
identifying, at the computing device, one or more associated financial instruments similar to the particular financial instrument; and
determining, at the computing device and using a second machine learning model, a cloud score for the particular financial instrument based on the trading intentions for the one or more associated financial instrument similar to the particular financial instrument, the cloud score being representative of a likelihood of successfully trading the particular financial instrument at the various terms.

145. The computing device of clause 144, wherein the second machine learning model determines the cloud score based on a degree of matching between the trading intentions of the one or more invitee users and the various terms.

146. The computing device of clause 145, wherein the degree of matching is based on a price matching score and a quantity matching score.

147. The computing device of clause 146, wherein the price matching score corresponds to a price degree of matching between a trading price of the trading intentions of the one or more invitee users and a desired price of the various terms.

148. The computing device of clause 147, wherein the quantity matching score corresponds to a quantity degree of matching between a trading quantity of the trading intentions of the one or more invitee users and a desired quantity of the various terms.

149. The computing device of clause 146, wherein the quantity matching score corresponds to a quantity degree of matching between a trading quantity of the trading intentions of the one or more invitee users and a desired quantity of the various terms.

150. The computing device of clause 145, wherein the degree of matching is expressed as a number between 0 and 1.

151. The computing device of clause 144, further comprising outputting, from the computing device and to an initiating user computing device associated with the initiating user, the liquidity score and the cloud score in a graphical user interface.

152. The computer-implemented method of clause 151, wherein outputting the liquidity score and the cloud score in the graphical user interface comprises outputting a single score representing a combination of the liquidity score and the cloud score.

153. A computer-implemented method of determining a likelihood of successfully trading a particular financial instrument between an initiating user and one or more invitee users and at various terms during an electronic communication session, comprising
   receiving, at the computing device, trading intentions from the one or more invitee users, each trading intention representing a price and a quantity at which its associated invitee user would trade an associated financial instrument, each associated financial instrument having associated characteristics, the associated characteristics including at least an expected return;
   storing, at the computing device, the trading intentions;
   identifying, at the computing device, one or more associated financial instruments similar to the particular financial instrument; and
   determining, at the computing device and using a machine learning model, a cloud score for the particular financial instrument based on the trading intentions for the one or more associated financial instrument similar to the particular financial instrument, the cloud score being representative of a likelihood of successfully trading the particular financial instrument at the various terms.

154. The computer-implemented method of clause 153, wherein the machine learning model determines the cloud score based on a degree of matching between the trading intentions of the one or more invitee users and the various terms.

155. The computer-implemented method of clause 154, wherein the degree of matching is based on a price matching score and a quantity matching score.

156. The computer-implemented method of clause 155, wherein the price matching score corresponds to a price degree of matching between a trading price of the trading intentions of the one or more invitee users and a desired price of the various terms.

157. The computer-implemented method of clause 156, wherein the quantity matching score corresponds to a quantity degree of matching between a trading quantity of the trading intentions of the one or more invitee users and a desired quantity of the various terms.

158. The computer-implemented method of clause 155, wherein the quantity matching score corresponds to a quantity degree of matching between a trading quantity of the trading intentions of the one or more invitee users and a desired quantity of the various terms.

159. The computer-implemented method of clause 154, wherein the degree of matching is expressed as a number between 0 and 1.

160. The computer-implemented method of clause 153, further comprising outputting, from the computing device and to an initiating user computing device associated with the initiating user, the cloud score in a graphical user interface.

161. A computing device for determining a likelihood of successfully trading a particular financial instrument between an initiating user and one or more invitee users and at various terms during an electronic communication session, comprising:
   one or more processors; and
   a non-transitory computer-readable storage medium having a plurality of instructions stored thereon, which, when executed by the one or more processors, cause the one or more processors to perform operations comprising:
      receiving trading intentions from the one or more invitee users, each trading intention representing a price and a quantity at which its associated invitee user would trade an associated financial instrument, each associated financial instrument having associated characteristics, the associated characteristics including at least an expected return;
      storing the trading intentions;
      identifying one or more associated financial instruments similar to the particular financial instrument; and
      determining, using a machine learning model, a cloud score for the particular financial instrument based on the trading intentions for the one or more associated financial instrument similar to the particular financial instrument, the cloud score being representative of a likelihood of successfully trading the particular financial instrument at the various terms.

162. The computing device of clause 161, wherein the machine learning model determines the cloud score based on a degree of matching between the trading intentions of the one or more invitee users and the various terms.

163. The computing device of clause 162, wherein the degree of matching is based on a price matching score and a quantity matching score.

164. The computing device of clause 163, wherein the price matching score corresponds to a price degree of matching between a trading price of the trading intentions of the one or more invitee users and a desired price of the various terms.

165. The computing device of clause 164, wherein the quantity matching score corresponds to a quantity degree of matching between a trading quantity of the trading intentions of the one or more invitee users and a desired quantity of the various terms.

166. The computing device of clause 163, wherein the quantity matching score corresponds to a quantity degree of matching between a trading quantity of the trading intentions of the one or more invitee users and a desired quantity of the various terms.

167. The computing device of clause 162, wherein the degree of matching is expressed as a number between 0 and 1.

168. The computing device of clause 161, further comprising outputting, from the computing device and to an initiating user computing device associated with the initiating user, the cloud score in a graphical user interface.

169. A computer-implemented method, comprising:
   hosting, by a computing device having one or more processors, an electronic communication session for trading a financial instrument between an initiating user and one or more invitee users, wherein the hosting comprises:
      receiving, by the computing device, a request to begin the electronic communication session from an initiating user computing device associated with an initiating user, the request identifying the financial instrument to be traded and various terms at which the initiating user is willing to trade the financial instrument, matching, by the computing device, the request with capabilities of a plurality of dealer users to identify one or more dealer users capable of acting as an intermediate entity for trading the financial instrument, providing, by the computing device and to the initiating user computing device associated with the initiating user, a list of the one or more identified dealer users, receiving, by the computing device and from the initiating user computing device associated with the initiating user, a selection of a particular dealer user based on the list of the one or more identified dealer users, in response to receiving the selection of the particular dealer user, establishing, by the computing device, the electronic communication session, wherein the establishing comprises:

receiving, by the computing device and from a dealer user computing device associated with the particular dealer user, a list of the one or more invitee users to participate in the electronic communication session; and in response to receiving the list of the one or more invitee users, transmitting, by the computing device and to each invitee user computing device associated with each of the one or more invitee users, an invitation to participate in the electronic communication session;

coordinating, by the computing device, communications during the electronic communication session, wherein the electronic communication session permits each of the one or more invitee users to submit an offer to trade the financial instrument with the initiating user, each offer comprising an identification of its associated invitee user and trade parameters including a price and a quantity of the financial instrument, and wherein coordinating communications during the electronic communication session comprises selectively sharing, by the computing device, information regarding offers received during the electronic communication session with each of the initiating user, the dealer user, and the one or more invitee users, wherein the initiating user receives the trade parameters for each received offer, the dealer user receives the identification of the trade parameters for each received offer and its associated invitee user, and each particular invitee user receives: (i) the trade parameters for each received offer when the particular invitee user has submitted its own offer, and (ii) no information regarding the received offers when the particular invitee user has not yet submitted its own offer.

170. The computer-implemented method of claim 169, wherein the identifying the one or more dealer users capable of acting as the intermediate entity for trading the financial instrument comprises:

determining a liquidity score for the financial instrument based on historical trading data for one or more other financial instruments related to the financial instrument;

identifying historical dealers associated with the historical trading data.

171. The computer-implemented method of claim 170, wherein determining the liquidity score for the financial instrument is based on a liquidity score machine learning model.

172. The computer-implemented method of claim 171, wherein the liquidity score machine learning model determines the liquidity score based on a number of historical transactions and a volume of historical transactions for the financial instrument to be traded.

173. The computer-implemented method of claim 172, wherein the liquidity score machine learning model determines the liquidity score based on a count ratio of the number of historical transactions for the financial instrument to be traded to a maximum number of historical transactions for any financial instrument observed.

174. The computer-implemented method of claim 173, wherein the liquidity score machine learning model determines the liquidity score based on a volume ratio of the volume of historical transactions for the financial instrument to be traded to a maximum volume of historical transactions for any financial instrument observed.

175. The computer-implemented method of claim 174, wherein the liquidity score machine learning model determines the liquidity score based on a combination of the count ratio and the volume ratio.

176. The computer-implemented method of claim 172, wherein the liquidity score machine learning model determines the liquidity score based on a volume ratio of the volume of historical transactions for the financial instrument to be traded to a maximum volume of historical transactions for any financial instrument observed.

177. The computer-implemented method of claim 169, wherein the identifying the one or more dealer users capable of acting as the intermediate entity for trading the financial instrument comprises:

determining a dealer specific liquidity score for the financial instrument based on historical trading data for one or more other financial instruments related to the financial instrument;

identifying historical dealers associated with the historical trading data.

178. The computer-implemented method of claim 177, wherein determining the dealer specific liquidity score for the financial instrument is based on a liquidity score machine learning model.

179. The computer-implemented method of claim 178, wherein the liquidity score machine learning model determines the dealer specific liquidity score based on a number of historical transactions with a particular dealer and a volume of historical transactions for the financial instrument to be traded with the particular dealer.

180. The computer-implemented method of claim 179, wherein the liquidity score machine learning model determines the dealer specific liquidity score based on a dealer specific count ratio of the number of historical transactions for the financial instrument to be traded with the particular dealer to a maximum number of historical transactions for any financial instrument observed with the particular dealer.

181. The computer-implemented method of claim 180, wherein the liquidity score machine learning model determines the dealer specific liquidity score based on a dealer specific volume ratio of the volume of historical transactions for the financial instrument to be traded with the particular dealer to a maximum volume of historical transactions for any financial instrument observed with the particular dealer.

182. The computer-implemented method of claim 181, wherein the liquidity score machine learning model determines the dealer specific liquidity score based on a combination of the dealer specific count ratio and the dealer specific volume ratio.

183. The computer-implemented method of claim 179, wherein the liquidity score machine learning model determines the dealer specific liquidity score based on a volume ratio of the volume of historical transactions for the financial instrument to be traded with the particular dealer to a maximum volume of historical transactions for any financial instrument observed with the particular dealer.

184. The computer-implemented method of claim 181, wherein the liquidity score machine learning model determines the liquidity score based on a pricing deviation score corresponding to a difference between a traded pricing and a desired pricing for the financial instrument to be traded, the traded pricing comprising a previous price at which the financial instrument was traded and the desired pricing comprising a desired price at which the initiating user is willing to trade the financial instrument.

185. The computer-implemented method of claim 184, wherein the previous price at which the financial instrument was traded comprises an end of day price for the financial instrument.

186. The computer-implemented method of claim 185, wherein the pricing deviation score is based on the equation:

$$\Delta LS(F(P_i)) = \frac{REFP_i - IP_i}{STD_i * 0.5}$$

where $\Delta LS(F(P_i))$ is the pricing deviation score for a financial instrument i; $REFP_i$ is the reference pricing of a recently completed trade for the financial instrument i; $STD_i$ is an average standard deviation of the reference pricing and trade price for the financial instrument i; and $IP_i$ is the desired price for the financial instrument i.

187. The computer-implemented method of claim 169, wherein the identifying the one or more dealer users capable of acting as the intermediate entity for trading the financial instrument comprises:
determining a customer specific liquidity score for the financial instrument based on historical trading data for one or more other financial instruments related to the financial instrument;
identifying historical dealers associated with the historical trading data.

188. The computer-implemented method of claim 187, wherein determining the customer specific liquidity score for the financial instrument is based on a liquidity score machine learning model.

189. The computer-implemented method of claim 188, wherein the liquidity score machine learning model determines a customer value that is indicative of a probability that a specific customer will execute a trade for the security at the trade parameters, wherein the customer specific liquidity score for the financial instrument is based on the customer value.

190. The computer-implemented method of claim 189, wherein the liquidity score machine learning model determines the customer specific liquidity score based on $LSi=(LSmarket+10*(CACi/2), 10)$, where LSi is the customer specific liquidity score for customer i; LSmarket is a liquidity score for the financial instrument irrespective of customer; and CACi is the customer value.

191. The computer-implemented method of claim 169, wherein the identifying the one or more dealer users capable of acting as the intermediate entity for trading the financial instrument comprises:
determining a cloud score for the financial instrument based on trading intentions of the one or more invitee users and the various terms, wherein the cloud score is representative of a likelihood that the financial instrument will be traded at the various terms;
identifying at least one high likelihood invitee user of the one or more invitee users based on the cloud score, wherein the at least one high likelihood invitee user has expressed trading intentions compatible with successfully trading the financial instrument with the initiating user at the various terms; and
identifying the one or more dealer users having a previous trading relationship with the at least one high likelihood invitee user.

192. The computer-implemented method of claim 191, wherein determining the cloud score for the financial instrument is based on a cloud score machine learning model.

193. The computer-implemented method of claim 192, wherein the cloud score machine learning model determines the cloud score based on a degree of matching between the trading intentions of the one or more invitee users and the various terms.

194. The computer-implemented method of claim 193, wherein the degree of matching is based on a price matching score and a quantity matching score.

195. The computer-implemented method of claim 194, wherein the price matching score corresponds to a price degree of matching between a trading price of the trading intentions of the one or more invitee users and a desired price of the various terms.

196. The computer-implemented method of claim 195, wherein the quantity matching score corresponds to a quantity degree of matching between a trading quantity of the trading intentions of the one or more invitee users and a desired quantity of the various terms.

197. The computer-implemented method of claim 194, wherein the quantity matching score corresponds to a quantity degree of matching between a trading quantity of the trading intentions of the one or more invitee users and a desired quantity of the various terms.

198. The computer-implemented method of claim 193, wherein the degree of matching is expressed as a number between 0 and 1.

199. The computer-implemented method of claim 169, further comprising:
determining, by the computing device, a cloud score for the financial instrument based on trading intentions of a group of potential invitee users and the various terms, wherein the cloud score is representative of a likelihood that the financial instrument will be traded at the various terms;
ranking, by the computing device, the group of potential invitee users into a ranked list based on the cloud score to identify one or more high likelihood potential invitee users that have expressed trading intentions compatible with successfully trading the financial instrument with the initiating user at the various terms; and providing, by the computing device and to a particular dealer user computing device associated with the particular dealer user, the ranked list,
wherein the particular dealer user selects the list of the one or more invitee users to participate in the electronic communication session from the ranked list.

200. The computer-implemented method of claim 199, wherein the ranked list is limited to a predetermined number of potential invitee users.

201. The computer-implemented method of claim 199, wherein determining the cloud score for the financial instrument is based on a cloud score machine learning model.

202. The computer-implemented method of claim 201, wherein the cloud score machine learning model determines the cloud score based on a degree of matching between the trading intentions of the one or more invitee users and the various terms.

203. The computer-implemented method of claim 202, wherein the degree of matching is based on a price matching score and a quantity matching score.

204. The computer-implemented method of claim 203, wherein the price matching score corresponds to a price degree of matching between a trading price of the trading intentions of the one or more invitee users and a desired price of the various terms.

205. The computer-implemented method of claim 204, wherein the quantity matching score corresponds to a quantity degree of matching between a trading quantity of the trading intentions of the one or more invitee users and a desired quantity of the various terms.

206. The computer-implemented method of claim 203, wherein the quantity matching score corresponds to a quantity degree of matching between a trading quantity of the trading intentions of the one or more invitee users and a desired quantity of the various terms.

207. The computer-implemented method of claim 202, wherein the degree of matching is expressed as a number between 0 and 1.

208. A computer-implemented method, comprising:
determining, by a computing device having one or more processors, a likelihood of executing a trade of a particular financial instrument between an initiating user and one or more invitee users and at various terms during an electronic communication session, wherein the determining comprises:
receiving, by the computing device, historical trading data associated with previously executed trade transactions for a plurality of financial instruments, wherein each of the plurality of financial instruments has associated instrument characteristics, the associated instrument characteristics including at least an expected return, and the trade transactions identify at least a price and quantity traded,
performing, by the computing device, cluster analysis of the particular financial instrument and the plurality of financial instruments to identify one or more of the plurality of financial instruments having associated instrument characteristics that match instrument characteristics of the particular financial instrument, and
determining, by the computing device and using a liquidity score machine learning model, a liquidity score for the particular financial instrument based on the historical trading data for the one or more of the plurality of financial instruments having associated instrument characteristics that match the instrument characteristics of the particular financial instrument, the liquidity score being representative of a likelihood of executing a trade of the particular financial instrument at the various terms; and
ranking, by the computing device, the particular financial instrument and other financial instruments into a ranked list based on the liquidity score and other liquidity scores associated with the other financial instruments; and
presenting, by the computing device, the ranked list in a graphical user interface of an initiating user computing device associated with the initiating user.

209. The computer-implemented method of claim 208, wherein the liquidity score machine learning model determines the liquidity score based on a number of historical transactions and a volume of historical transactions for the particular financial instrument to be traded.

210. The computer-implemented method of claim 209, wherein the liquidity score machine learning model determines the liquidity score based on a count ratio of the number of historical transactions for the particular financial instrument to be traded to a maximum number of historical transactions for any financial instrument observed.

211. The computer-implemented method of claim 210, wherein the liquidity score machine learning model determines the liquidity score based on a volume ratio of the volume of historical transactions for the particular financial instrument to be traded to a maximum volume of historical transactions for any financial instrument observed.

212. The computer-implemented method of claim 211, wherein the liquidity score machine learning model determines the liquidity score based on a combination of the count ratio and the volume ratio.

213. The computer-implemented method of claim 209, wherein the liquidity score machine learning model determines the liquidity score based on a volume ratio of the volume of historical transactions for the particular financial instrument to be traded to a maximum volume of historical transactions for any financial instrument observed.

214. The computer-implemented method of claim 208, wherein the liquidity score is based on a dealer specific liquidity score.

215. The computer-implemented method of claim 214, wherein the liquidity score machine learning model determines the dealer specific liquidity score based on a number of historical transactions with a particular dealer and a volume of historical transactions for the particular financial instrument to be traded with the particular dealer.

216. The computer-implemented method of claim 215, wherein the liquidity score machine learning model determines the dealer specific liquidity score based on a dealer specific count ratio of the number of historical transactions for the particular financial instrument to be traded with the particular dealer to a maximum number of historical transactions for any financial instrument observed with the particular dealer.

217. The computer-implemented method of claim 216, wherein the liquidity score machine learning model determines the dealer specific liquidity score based on a dealer specific volume ratio of the volume of historical transactions for the particular financial instrument to be traded with the particular dealer to a maximum volume of historical transactions for any financial instrument observed with the particular dealer.

218. The computer-implemented method of claim 217, wherein the liquidity score machine learning model determines the dealer specific liquidity score based on a combination of the dealer specific count ratio and the dealer specific volume ratio.

219. The computer-implemented method of claim 215, wherein the liquidity score machine learning model determines the dealer specific liquidity score based on a volume ratio of the volume of historical transactions for the particular financial instrument to be traded with the particular dealer to a maximum volume of historical transactions for any financial instrument observed with the particular dealer.

220. The computer-implemented method of claim 208, wherein the liquidity score machine learning model determines the liquidity score based on a pricing deviation score corresponding to a difference between a traded pricing and a desired pricing for the particular financial instrument to be traded, the traded pricing comprising a previous price at which the particular financial instrument was traded and the desired pricing comprising a desired price at which the initiating user is willing to trade the particular financial instrument.

221. The computer-implemented method of claim 220, wherein the previous price at which the particular financial instrument was traded comprises an end of day price for the particular financial instrument.

222. The computer-implemented method of claim 220, wherein the pricing deviation score is based on the equation:

$$\Delta LS(F(P_i)) = \frac{REFP_i - IP_i}{\overline{STD_i} * 0.5}$$

where $\Delta LS(F(P_i))$ is the pricing deviation score for a financial instrument i; $REFP_i$ is the reference pricing of a recently completed trade for the financial instrument i; $\overline{STD_i}$ is an average standard deviation of the reference pricing and trade price for the financial instrument i; and $IP_i$ is the desired price for the financial instrument i.

223. The computer-implemented method of claim 208, wherein the liquidity score is based on a customer specific liquidity score.

224. The computer-implemented method of claim 223, wherein the liquidity score machine learning model determines a customer value that is indicative of a probability that a specific customer will execute the trade for the particular financial instrument at the trade parameters, wherein the customer specific liquidity score for the particular financial instrument is based on the customer value.

225. The computer-implemented method of claim 224, wherein the liquidity score machine learning model determines the customer specific liquidity score based on LSi=(LSmarket+10*(CACi/2), 10), where LSi is the customer specific liquidity score for customer i; LSmarket is a liquidity score for the particular financial instrument irrespective of customer; and CACi is the customer value.

226. The computer-implemented method of claim 208, further comprising:
receiving, by the computing device, trading intentions from one or more invitee user computing devices associated with the one or more invitee users, each trading intention representing a price and a quantity at which its associated invitee user would trade an associated financial instrument, each associated financial instrument having associated instrument characteristics, the associated instrument characteristics including at least an expected return;
performing, by the computing device, cluster analysis of the particular financial instrument and the associated financial instruments to identify one or more associated financial instruments having associated instrument characteristics that match instrument characteristics of the particular financial instrument;
determining, by the computing device and using a cloud score machine learning model, a cloud score for the particular financial instrument based on the trading intentions for the one or more associated financial instruments having associated instrument characteristics that match the instrument characteristics of the particular financial instrument, the cloud score being representative of a likelihood of executing the trade of the particular financial instrument at the various terms; and
outputting, by the computing device and to the initiating user computing device associated with the initiating user, the liquidity score and the cloud score in the graphical user interface.

227. The computer-implemented method of claim 226, wherein the cloud score machine learning model determines the cloud score based on a degree of matching between the trading intentions of the one or more invitee users and the various terms.

228. The computer-implemented method of claim 227, wherein the degree of matching is based on a price matching score and a quantity matching score.

229. The computer-implemented method of claim 228, wherein the price matching score corresponds to a price degree of matching between a trading price of the trading intentions of the one or more invitee users and a desired price of the various terms.

230. The computer-implemented method of claim 229, wherein the quantity matching score corresponds to a quantity degree of matching between a trading quantity of the trading intentions of the one or more invitee users and a desired quantity of the various terms.

231. The computer-implemented method of claim 228, wherein the quantity matching score corresponds to a quantity degree of matching between a trading quantity of the trading intentions of the one or more invitee users and a desired quantity of the various terms.

232. The computer-implemented method of claim 227, wherein the degree of matching is expressed as a number between 0 and 1.

233. The computer-implemented method of claim 226, wherein outputting the liquidity score and the cloud score in the graphical user interface comprises outputting a single score representing a combination of the liquidity score and the cloud score.

234. A computer-implemented method, comprising
determining, by a computing device having one or more processors, a likelihood of executing a trade of a particular financial instrument between an initiating user and one or more invitee users and at various terms during an electronic communication session, wherein the determining comprises:
receiving, by the computing device, trading intentions from one or more invitee user computing devices associated with the one or more invitee users, each trading intention representing a price and a quantity at which its associated invitee user would trade an associated financial instrument, each associated financial instrument having associated instrument characteristics, the associated instrument characteristics including at least an expected return, performing, by the computing device, cluster analysis of the particular financial instrument and the associated financial instruments to identify one or more associated financial instruments having associated instrument characteristics that match instrument characteristics of the particular financial instrument, and determining, by the computing device and using a cloud score machine learning model, a cloud score for the particular financial instrument based on the trading intentions for the one or more associated financial instruments having associated instrument characteristics that match the instrument characteristics of the particular financial instrument, the cloud score being representative of a likelihood of executing the trade of the particular financial instrument at the various terms;

ranking, by the computing device, the particular financial instrument and other financial instruments into a ranked list based on the cloud score and other cloud scores associated with the other financial instruments; and presenting, by the computing device, the ranked list in a graphical user interface of an initiating user computing device associated with the initiating user.

235. The computer-implemented method of claim 234, wherein the cloud score machine learning model determines the cloud score based on a degree of matching between the trading intentions of the one or more invitee users and the various terms.

236. The computer-implemented method of claim 235, wherein the degree of matching is based on a price matching score and a quantity matching score.

237. The computer-implemented method of claim 236, wherein the price matching score corresponds to a price degree of matching between a trading price of the trading intentions of the one or more invitee users and a desired price of the various terms.

238. The computer-implemented method of claim 237, wherein the quantity matching score corresponds to a quantity degree of matching between a trading quantity of the trading intentions of the one or more invitee users and a desired quantity of the various terms.

239. The computer-implemented method of claim 236, wherein the quantity matching score corresponds to a quantity degree of matching between a trading quantity of the trading intentions of the one or more invitee users and a desired quantity of the various terms.

240. The computer-implemented method of claim 235, wherein the degree of matching is expressed as a number between 0 and 1.

241. The computer-implemented method of claim 234, further comprising outputting, from the computing device and to the initiating user computing device associated with the initiating user, the cloud score in the graphical user interface.

242. The computer-implemented method of claim 234, wherein determining the likelihood of executing the trade of a particular financial instrument further comprises:

receiving, by the computing device, historical trading data associated with previously executed trade transactions for a plurality of historically traded financial instruments, wherein each of the plurality of historically traded financial instruments has associated historically traded instrument characteristics, the associated historically traded instrument characteristics including at least an expected return, and the trade transactions identify at least a price and quantity traded;

performing, by the computing device, cluster analysis of the particular financial instrument and the plurality of historically traded financial instruments to identify one or more of the plurality of historically traded financial instruments having associated historically traded instrument characteristics that match the instrument characteristics of the particular financial instrument; and determining, by the computing device and using a liquidity score machine learning model, a liquidity score for the particular financial instrument based on the historical trading data for the one or more of the plurality of historically traded financial instruments having associated historically traded instrument characteristics that match the instrument characteristics of the particular financial instrument, the liquidity score being representative of the likelihood of executing the trade of the particular financial instrument at the various terms, wherein the ranked list is further based on the liquidity score.

243. The computer-implemented method of claim 242, wherein the liquidity score machine learning model determines the liquidity score based on a number of historical transactions and a volume of historical transactions for the particular financial instrument to be traded.

244. The computer-implemented method of claim 243, wherein the liquidity score machine learning model determines the liquidity score based on a count ratio of the number of historical transactions for the particular financial instrument to be traded to a maximum number of historical transactions for any financial instrument observed.

245. The computer-implemented method of claim 244, wherein the liquidity score machine learning model determines the liquidity score based on a volume ratio of the volume of historical transactions for the particular financial instrument to be traded to a maximum volume of historical transactions for any financial instrument observed.

246. The computer-implemented method of claim 245, wherein the liquidity score machine learning model determines the liquidity score based on a combination of the count ratio and the volume ratio.

247. The computer-implemented method of claim 243, wherein the liquidity score machine learning model determines the liquidity score based on a volume ratio of the volume of historical transactions for the particular financial instrument to be traded to a maximum volume of historical transactions for any financial instrument observed.

248. The computer-implemented method of claim 234, wherein the liquidity score is based on a dealer specific liquidity score.

249. The computer-implemented method of claim 248, wherein the liquidity score machine learning model determines the dealer specific liquidity score based on a number of historical transactions with a particular dealer and a volume of historical transactions for the particular financial instrument to be traded with the particular dealer.

250. The computer-implemented method of claim 249, wherein the liquidity score machine learning model determines the dealer specific liquidity score based on a dealer specific count ratio of the number of historical transactions for the particular financial instrument to be traded with the particular dealer to a maximum number of historical transactions for any financial instrument observed with the particular dealer.

251. The computer-implemented method of claim 250, wherein the liquidity score machine learning model determines the dealer specific liquidity score based on a dealer specific volume ratio of the volume of historical transactions for the particular financial instrument to be traded with the particular dealer to a maximum volume of historical transactions for any financial instrument observed with the particular dealer.

252. The computer-implemented method of claim 251, wherein the liquidity score machine learning model determines the dealer specific liquidity score based on a combination of the dealer specific count ratio and the dealer specific volume ratio.

253. The computer-implemented method of claim 249, wherein the liquidity score machine learning model determines the dealer specific liquidity score based on a volume ratio of the volume of historical transactions for the particular financial instrument to be traded with the particular dealer to a maximum volume of historical transactions for any financial instrument observed with the particular dealer.

While a number of embodiments of the present disclosure have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added, and/or any desired steps may be eliminated).

What is claimed is:

1. A computing device for hosting an electronic communication session for trading a financial instrument between an initiating user and one or more dealer users, the computing device comprising:
   one or more processors; and
   a non-transitory computer-readable storage medium having a plurality of instructions stored thereon, which, when executed by the one or more processors, cause the one or more processors to perform operations comprising:
      hosting an electronic communication session for the initiating user to select a target financial instrument to trade, wherein the hosting comprises:
         receiving a request to begin the electronic communication session from an initiating user computing device associated with the initiating user, the request identifying at least one preferred instrument feature of the initiating user relating to the target financial instrument to be traded;
         receiving a plurality of instrument feature data items relating to a plurality of characteristics of a plurality of financial instruments available to trade;
         clustering, using at least one clustering machine learning model, the plurality of financial instruments into a plurality of instrument feature groups based at least in part on at least one characteristic of the plurality of characteristics of the plurality of instrument feature data items;
         classifying, using the at least one clustering machine learning model, the target financial instrument into at least one instrument feature group of the plurality of instrument feature groups based at least in part on the at least one preferred instrument feature and the plurality of characteristics of the plurality of instrument feature data items;
            wherein the at least one instrument feature group defines one or more similar financial instruments to the target financial instrument;
         identifying one or more dealer users for acting as an intermediate entity for trading the one or more similar financial instruments based at least in part on the one or more similar financial instruments; and
         instructing the initiating user computing device to display a graphical user interface ("GUI"), wherein the GUI comprises:
            a list of the one or more similar financial instruments and
            one or more active links to connect with the one or more dealer users; and
         wherein each of the one or more similar financial instruments is presented in association with a similarity measure representing a degree of similarity between the at least one preferred instrument feature and the plurality of characteristics of each similar financial instrument of the one or more similar financial instruments.

2. The computing device of claim 1, wherein the hosting further comprises providing an alert to one or more computing devices associated with the one or more dealer users, wherein the alert is presented in a GUI containing an active link to connect with the initiating user.

3. The computing device of claim 2, wherein the hosting further comprises receiving, from the initiating user computing device associated with the initiating user, a selection of a particular dealer user using the active link, wherein the initiating user is permitted to submit an offer to trade a selected financial instrument with the particular dealer.

4. The computing device of claim 3, wherein the hosting further comprises automatically submitting an offer for the initiating user to trade the financial instrument with the particular dealer by transmitting a trade authorization communication, wherein the trade authorization communication comprises an automated price and an automated quantity at which the initiating user is willing to trade the financial instrument with the selected dealer.

5. The computing device of claim 1, wherein the at least one preferred instrument feature relates to a coupon type.

6. The computing device of claim 1, wherein the preferred at least one preferred instrument feature relates to a coupon rate.

7. The computing device of claim 6, wherein the coupon rate is a floating rate.

8. The computing device of claim 1, wherein the preferred at least one preferred instrument feature relates to a coupon frequency.

9. The computing device of claim 1, wherein the preferred at least one preferred instrument feature relates to a maturity date.

10. A computer-implemented method of hosting an electronic communication session for trading a financial instrument between an initiating user and one or more dealer users, comprising:

hosting, by a computing device having one or more processors, an electronic communication session for the initiating user to select a target financial instrument to trade, wherein the hosting comprises:
  receiving a request to begin the electronic communication session from an initiating user computing device associated with the initiating user, the request identifying at least one preferred instrument feature of the initiating user relating to the target financial instrument to be traded;
  receiving a plurality of instrument feature data items relating to a plurality of characteristics of a plurality of financial instruments available to trade;
  clustering, using at least one clustering machine learning model, the plurality of financial instruments into a plurality of instrument feature groups based at least in part on at least one characteristic of the plurality of characteristics of the plurality of instrument feature data items;
  classifying, using the at least one clustering machine learning model, the target financial instrument into at least one instrument feature group of the plurality of instrument feature groups based at least in part on the at least one preferred instrument feature and the plurality of characteristics of the plurality of instrument feature data items;
    wherein the at least one instrument feature group defines one or more similar financial instruments to the target financial instrument;
  identifying one or more dealer users for acting as an intermediate entity for trading the one or more similar financial instruments based at least in part on the one or more similar financial instruments; and
  instructing the initiating user computing device to display a graphical user interface ("GUI"), wherein the GUI comprises:
    a list of the one or more similar financial instruments and
    one or more active links to connect with the one or more dealer users; and
  wherein each of the one or more similar financial instruments is presented in association with a similarity measure representing a degree of similarity between the at least one preferred instrument feature and the plurality of characteristics of each similar financial instrument of the one or more similar financial instruments.

11. The computer-implemented method of claim 10, further comprising providing an alert to one or more computing devices associated with the one or more identified dealer users, wherein the alert is presented in a GUI containing an active link to connect with the initiating user.

12. The computer-implemented method of claim 11, further comprising receiving, from the initiating user computing device associated with the initiating user, a selection of a particular dealer user using the active link, wherein the initiating user is permitted to submit an offer to trade a selected financial instrument with the particular dealer.

13. The computer-implemented method of claim 12, further comprising automatically submitting an offer for the initiating user to trade the financial instrument with the particular dealer by transmitting a trade authorization communication, wherein the trade authorization communication comprises an automated price and an automated quantity at which the initiating user is willing to trade the financial instrument with the selected dealer.

14. The computer-implemented method of claim 10, wherein the preferred instrument feature relates to a coupon type.

15. The computer-implemented method of claim 10, wherein the preferred instrument feature relates to a coupon rate.

16. The computer-implemented method of claim 15, wherein the coupon rate is a floating rate.

17. The computer-implemented method of claim 10, wherein the preferred instrument feature relates to a coupon frequency.

18. The computer-implemented method of claim 10, wherein the preferred instrument feature relates to a maturity date.

* * * * *